US007481935B2

(12) United States Patent
Olivier

(10) Patent No.: US 7,481,935 B2
(45) Date of Patent: Jan. 27, 2009

(54) WASTE WATER TREATMENT PROCESS

(76) Inventor: Laurent Olivier, 2616 Quay Dock Rd., Vero Beach, FL (US) 32967

( * ) Notice: Subject to any disclaimer, the term of this patent is extended or adjusted under 35 U.S.C. 154(b) by 269 days.

(21) Appl. No.: 10/956,041

(22) Filed: Oct. 4, 2004

(65) Prior Publication Data

US 2005/0109697 A1    May 26, 2005

Related U.S. Application Data

(60) Provisional application No. 60/507,956, filed on Oct. 3, 2003.

(51) Int. Cl.
*C02F 3/00* (2006.01)
(52) U.S. Cl. .................. 210/620; 210/621; 210/622; 210/623; 210/624; 210/626; 210/629; 210/630; 210/631
(58) Field of Classification Search .......... 210/620–631
See application file for complete search history.

(56) References Cited

U.S. PATENT DOCUMENTS

| | | |
|---|---|---|
| 1,157,092 A | 10/1915 | Du Rell |
| 1,526,179 A | 2/1925 | Parr et al. |
| 3,271,304 A | 9/1966 | Valdespino et al. |
| 3,847,375 A | 11/1974 | Kuerten et al. |
| 4,019,983 A | 4/1977 | Mandt |
| 4,097,026 A | 6/1978 | Haindl |
| 4,210,534 A | 7/1980 | Molvar |
| 4,281,592 A | 8/1981 | Maxson et al. |
| 4,333,263 A | 6/1982 | Adey |
| 4,351,729 A * | 9/1982 | Witt ............................ 210/603 |
| 4,537,682 A | 8/1985 | Wong-Chong |
| 4,820,052 A | 4/1989 | Krysel |
| 4,858,519 A | 8/1989 | Meckler |
| 4,995,980 A | 2/1991 | Jaubert |
| 5,081,954 A | 1/1992 | Monus |
| 5,171,090 A | 12/1992 | Wiemers |
| 5,253,677 A | 10/1993 | Sand |
| 5,322,222 A | 6/1994 | Lott |

(Continued)

FOREIGN PATENT DOCUMENTS

JP          63-267424        11/1988

(Continued)

OTHER PUBLICATIONS

Bulletin No. 491A, Model 46550 Tank Mixing Eductors for Improved In-tank Solution Circulation and Agitation, Spraying Systems Co.®, pp. 1-6, 2000.

(Continued)

*Primary Examiner*—Chester T Barry
(74) *Attorney, Agent, or Firm*—Finnegan, Henderson, Farabow, Garrett & Dunner, L.L.P.

(57) ABSTRACT

The present invention describes improved methods and systems for treating waste water and solid waste, which may include the addition of catholyte and anolyte. The methods and systems of the present invention may be used to treat waste water and solid waste from animal farms, such as for example, hog farms, dairy farms, and cattle and sheep ranches. The methods and systems of the present invention may also be used to treat waste water from other sources, such as human waste or farm runoff from irrigation.

61 Claims, 36 Drawing Sheets

U.S. PATENT DOCUMENTS

| | | | |
|---|---|---|---|
| 5,403,522 | A | 4/1995 | Von Berg |
| 5,545,325 | A | 8/1996 | Hsu et al. |
| 5,591,341 | A | 1/1997 | Jensen |
| 5,647,983 | A | 7/1997 | Limcaco |
| 5,664,733 | A | 9/1997 | Lott |
| 5,705,072 | A | 1/1998 | Haase |
| 5,766,454 | A | 6/1998 | Cox et al. |
| 5,775,443 | A | 7/1998 | Lott |
| 5,778,823 | A | 7/1998 | Adey et al. |
| 5,851,398 | A | 12/1998 | Adey |
| 5,857,773 | A | 1/1999 | Tammelin |
| 5,862,829 | A | 1/1999 | Sand |
| 5,863,128 | A | 1/1999 | Mazzei |
| 5,894,995 | A | 4/1999 | Mazzei |
| 5,927,338 | A | 7/1999 | Boticki et al. |
| 5,932,171 | A * | 8/1999 | Malchesky ............... 422/29 |
| 5,951,922 | A | 9/1999 | Mazzei |
| 5,961,831 | A | 10/1999 | Lee et al. |
| 5,965,016 | A | 10/1999 | Suchowski et al. |
| 5,976,378 | A | 11/1999 | Sumino et al. |
| 6,123,841 | A | 9/2000 | Gotoh |
| 6,146,531 | A | 11/2000 | Matheson |
| 6,159,364 | A | 12/2000 | Hirane |
| 6,196,269 | B1 | 3/2001 | Michael et al. |
| 6,297,033 | B1 | 10/2001 | Van Rijn et al. |
| 6,331,300 | B1 | 12/2001 | Dybas et al. |
| 6,471,489 | B2 | 10/2002 | Hua |
| 6,523,991 | B1 | 2/2003 | Maklad |
| 6,958,121 | B2 * | 10/2005 | Leskow .................. 210/623 |
| 2002/0166593 | A1 | 11/2002 | Oliver |
| 2003/0094411 | A1 | 5/2003 | Takada |
| 2004/0035770 | A1 | 2/2004 | Edwards et al. |
| 2004/0178132 | A1 | 9/2004 | Nakhla et al. |

FOREIGN PATENT DOCUMENTS

| | | |
|---|---|---|
| WO | WO/96/04784 | 2/1996 |

OTHER PUBLICATIONS

Alkalinity Requirements and the Possibility of Simultaneous Heterotrophic Denitrification During Sulfure-utilizing Autotrophic Denitrification, pp. 1-2, 2000. Website Printout, Source: http://www.iwaponline.com/wst/04203/wst042030233.htm.

Anoxygenic Photosynthetic Bacteria, Edited by R. E. Blankenship et al., pp. 1-3. Website Printout, Source: http://photoscience.la.asu.edu/photosyn/books/anoxybk.html.

Aquariums, pp. 1-3. Website Printout, Source: http://www.aquazoo.co.uk/page.cfm/type=systems/action=build/stage=2c.

Soler, Christophe, "Nitrates Elimination by Autotrophic Denitration on Sulfur," Translated by Nicolas Will, Reefex.

Langouet, Marc, "The Autotrophic Denitration on Sulfur—What's the Status?," Translated by Nicolas Will, Reefex, last update: Dec. 1, 1999.

Darbi, A., et al., "Batch Studies on Nitrate Removal from Potable Water," Water SA, vol. 28, No. 3, Jul. 3, 2002, pp. 319-322.

Biogeochemical Cycles, Soil Microbiology, BIOL/CSES 4684, Virginia Polytechnic Institute and State University, pp. 1-5. Website Printout, Source: http://soils1.cses.vt.edu/ch/biol_4684/Cycles/Soxidat.html.

Degassers, pp. 1-2. Website Printout, Source: http://www.aquasystems.co.uk/files/degassers/degasser.htm.

Lampe, D. G., et al., "Evaluation of Sulfur-Based Autotrophic Denitrification," Proceedings of the HSRC/WERC Joint Conference on the Environment, pp. 444-458, Albuquerque, NM, May 21-23, 1996.

Gijs Kuenen, J. et al., The Genera Thiobacillus, Thiomicrospira, and Thiosphaera, (Excerpts from Chapter 138 of "The Prokaryotes," Edited by A. Balows et al., vol. III, 2nd Edition, 1992), pp. 1-6. Website Printout, Source: http://www.spaceship-earth.org/REM/THIOBAC.htm.

MCB 229 Autotrophic Life, MCB 229 Lecture Notes, UConn., pp. 1-6. Website Printout, Source: http://www.sp.uconn.edu/~terry/229sp02/lectures/Lect13.html.

The Mineral Aragonite, Website Printout, Source: http://mineral.galleries.com/Minerals/Carbonat/ARAGONIT/ARAGONIT.htm.

The Mineral CALCITE, Website Printout, Source: http://mineral.galleries.com/minerals/carbonat/calcite/calcite.htm.

Dolomite, Website Printout, Source: http://mineral.galleries.com/minerals/carbonat/dolomite/dolomite.htm.

Denitrator. Website Printout, Source: http://www.aquavie.fr/english/produits/denitrateur.htm.

Internal Denitrificator I 600, pp. 1-2. Website Printout, Source: http://www.aquavie.fr/english/produits/i600.htm.

Sulphur Denitrator on Cornice G300S, pp. 1-2. Website Printout, Source: http://www.aquavie.fr/english/produits/g300s.htm.

Gallery Denitrificator G 300, pp. 1-2. Website Printout, Source: http://www.aquavie.fr/english/produits/g300.htm.

External Denitrification F1000, pp. 1-2. Website Printout, Source: http://www.aquavie.fr/english/produits/f1000.htm.

Sulphur Denitrificator F1000S, pp. 1-2. Website Printout, Source: http://www.aquavie.fr/english/produits/f1000s.htm.

Removal of Nitrate-Nitrogen and Control of Nitrous Oxide by Sulfur Denitrification, pp. 1-4. Website Printout, Source: http://www.env.t.u-tokyo.ac.jp/~kiyo/column-batch-E.html.

Saltwater Aquariums, About Air Driven Counter-Current Skimmers, pp. 1-3. Website Printout, Souce: http://saltaquarium.about.com/library/weekly/aa101701.htm.

Nitrates & How to Control Them, pp. 1-2. Website Printout, Source: http://saltaquarium.about.com/nitratecontrol/a/aa072999.htm.

Nitrates & How to Control Them, p. 2—Reduction Methods, Using Mangrove Plants, p. 1. Website Printout, Source: http://saltaquarium.about.com/cs/nitratecontrol/a/aa072999-2.htm.

Nitrates & How to Control Them, p. 3—Reduction Methods, Using Denitrifying Filters, pp. 1-2. Website Printout, Source: http://saltaquarium.about.com/cs/nitratecontrol/a/aa072999-3.htm.

Nitrates & How to Control Them, p. 4—Reduction Methods, Using Denitrator Coils, pp. 1-2. Website Printout, Source: http://saltaquarium.about.com/cs/nitratecontrol/a/aa072999-4.htm.

Nitrates & How to Control Them, p. 5—Reduction Methods, A Multiple Step Water Change Procedure, pp. 1-2. Website Printout, Source: http://saltaquarium.about.com/cs/nitratecontrol/a/aa072999-5.htm.

Carner, D., Protein Skimmers—Part 1, A Layperson's Guide to Protein Skimming, or How To Get the Gunk Out, What is Protein Skimming and How Does It Work?, pp. 1-2. Website Printout, Source: http://saltaquarium.about.com/cs/proteinskimmers/a/aa052200.htm.

Carner, D., Protein Skimmers—Part 1 (Continued), A Layperson's Guide to Protein Skimming, or How To Get the Gunk Out, Co-Current Skimming, pp. 1-2. Website Printout, Source: http://saltaquarium.about.com/cs/proteinskimmers/a/aa052200b.htm.

Carner, D., Protein Skimmers—Part 1 (Continued), A Layperson's Guide to Protein Skimming, pp. 1-2. Website Printout, Source: http://saltaquarium.about.com/cs/proteinskimmers/a/aa052200c.htm.

Saltware Aquariums, Protein Skimming—What Is It and How Does It Work?, pp. 1-3. Website Printout, Source: http://saltaquarium.about.com/cs/library/weekly1/a/aa111097skim.htm.

Ozone Solutions, Inc., Sulfate and Hydrogen Sulfide in Water, pp. 1-3. Website Printout, Source: http://www.ozoneapplications.com/info/sulfur.htm.

Sulfate Reducing Bacteria (SRB), pp. 1-2. Website Printout, Souce: http://www.corrosion-doctors.org/Microbial/srb.htm.

Sulphur Bacteria, pp. 1-3. Website Printout, Source: http://www.reef.edu.au/asp_pages/secb.asp?FormNo=2.

Sulfur Denitrification, pp. 1-2. Website Printout, Source: http://www.env.t.u-tokyo.ac.jp/~kiyo/sulfur-E.html.

Drawing of 175 Gallon 60° Cone Bottom Poly Tank 32D×68H, Product #0135-055, American Tank Company, 2002. Website Printout, Source: http://www.watertanks.com/images/documents/0135-055.gif.

Geol 299—Earth System Science Lecture 28, Nov. 12, 1997, pp. 1-4. Website Printout, Source: http://www.sdsmt.edu/online-courses/geology/geol299/lect28.htm.

Delaparte, S., et al., Denitrification Based on Sulfur at the Aquarium of MAAO, Sea Scope, vol. 17, Fall 2000, pp. 1-3. Website Printout, Source: http://216.168.47.67/cis-fishnet/seascope/00SS1711.htm.
Nitrification Denitrification at USFilter, p. 1, Mar. 26, 2004. Website Printout, Source: http://www.usfilter.com/h2o/nitrification_denitrification.htm.
Sequencing Batch Reactor, pp. 1-2, Mar. 26, 2004. Website Printout, Source: http://www.usfilter.com/water/ProductDescription.asp?WID=25&PID=216.
Biological Wastewater Treatment at USFilter, pp. 1-2, Mar. 26, 2004. Website Printout, Source: http://www.usfilter.com/h2o/biological_wastewater_treatment.htm.
Water Aeration at USFilter, pp. 1-2, Mar. 26, 2004. Website Printout, Source: http://www.usfilter.com/h2o/water_aeration.htm.
Groundwater Treatment at USFilter, p. 1, Mar. 26, 2004. Website Printout, Source: http://www.usfilter.com/h2o/groundwater_treatment.htm.
Biogeochemical Cycles; Soil Microbiology (BIOL/CSES 4684), pp. 1-2, Mar. 26, 2004. Website Printout, Source: http://soils1.cses.vt.edu/ch/biol_4684/Cycles/cycles.html.
Biogeochemical Cycles; Soil Microbiology (BIOL/CSES 4684), pp. 1-2, Mar. 26, 2004. The Sulfur Cycle. Website Printout, Source: http://soils1.cses.vt.edu/ch/biol_4684/Cycles/Scycle.html.
The Soil Environment; Soil Microbiology (BIOL/CSES 4684), pp. 1-2, Mar. 26, 2004. Website Printout, Source: http://soils1.cses.vt.edu/ch/biol_4684/soils.html.
The Microbes; Soil Microbiology (BIOL/CSES 4684), pp. 1-3, Mar. 26, 2004. Website Printout, Source: http://soils1.cses.vt.edu/ch/biol_4684/Microbes/Microbes.html.
Microbial Applications; Soil Microbiology (BIOL/CSES 4684), p. 1, Mar. 26, 2004. Website Printout, Source: http://soils1.cses.vt.edu/ch/biol_4684/Topics.html.
Engel, A.S., et al., Metabolic and Isotopic Diversity of Chemoautotrophic sulfur-oxidizing bacteria from Lower Kane Cave, Wyoming, p. 1, Mar. 26, 2004. Website Printout, Source: http://www.geo.utexas.edu/chemhydro/Annette/Kane/NSS202_abs.htm.
Edwards, V.A., et al., Hydrogen Sulfide (H2S)—The Relationship of Bacteria to its Formation, Prevention, and Elimination, pp. 1-2, Mar. 26, 2004. Website Printout, Source: http://www.alken-murray.com/H2SREM2.htm.
Sulfur Compounds Causing Odor and Corrosion, pp. 1-3, Mar. 26, 2004. Website Printout, Source: http://www.alken-murray.com/H2SREM3.htm.
The Nature of Sulfur Compounds and Their Formation, pp. 1-3, Mar. 26, 2004. Website Printout, Source: http://www.alken-murray.com/H2SREM4.htm.
Solving the Hydrogen Sulfide Odor Problem, pp. 1-2, Mar. 26, 2004. Website Printout, Source: http://www.alken-murray.com/H2SREM5.htm.
Bacterial Solutions to Hydrogen Sulfide (H2S) Odors, pp. 1-4, Mar. 26, 2004. Website Printout, Source: http://www.alken-murray.com/H2SREM6.htm.
Edwards, Jr., K.J., The Sulfur Cycle, pp. 1-2, Mar. 26, 2004. Website Printout, Source: http://www.alken-murray.com/H2SREM7.htm.
Hydrogen Sulfide Hazards in Municipal and Industrial Accounts, pp. 1-3, Mar. 26, 2004. Website Printout, Source: http://www.alken-murray.com/H2SREM8.htm.
Toxicity of Hydrogen Sulfide Gas, pp. 1-2, Mar. 26, 2004. Website Printout, Source: http://www.alken-murray.com/H2SREM9.htm.
Hydrogen Sulfide Treatise References, pp. 1-2, Mar. 26, 2004. Website Printout, Source: http://www.alken-murray.com/H2Sref.htm.
Nitrates Elimination by Autotrophic Denitratation on Sulfur, pp. 1-2, Mar. 26, 2004. Website Printout, Source: http://mars.reefkeepers.net/USHomePage/USArticles/Soler/DenitratorSoufre.html.
Chromatiaceae, pp. 1-2, Mar. 26, 2004. Website Printout, Source: http://www.sciencenet.com.au/frames/profiles/negative/families/chromati/family.htm.
Treating $H_2S$ Wells With Centaur® HSL Catalytic Carbon, pp. 1-2, Mar. 26, 2004. Website Printout, Source: http://www.tfn.net/DEnvironmental/centaur.html.
McClinton, L., Hog Farm Converts Manure to Electricity, National Hog Farmer, Sep. 15, 2003m pp. 1-3. Website Printout, Source: http://nationalhogfarmer.com/magazinearticle.asp?magazinearticleid+182996&magazine articleid...
"Effluent to Asset," Nutrient Management Technologies Ltd., 49 pages, Mar. 17, 2004. Website Printout, Source: http://www.nutientmtl.com.
Biofiltration Media, p. 1, Feb. 28, 2002. Website Printout, Source: http://www.w-m-t.com/biofilt.asp.
Aragonite Sand vs. Crushed Coral, pp. 1-2, Jul. 28, 2003. Website Printout, Source: http://www.geocites.com/CapeCanaveral/Hangar/6279/LetterAragoniteVsCrushedCoral.h...
Green Sulfur Bacteria, Soil Microbiology (BIOL/CSES 4684), pp. 1-3, Mar. 26, 2004. Website Printout, Source: http://soils1.cses.vt.edu/ch/biol_4684/Microbes/greensul.html.
Burnette, R., Purple Sulfur Bacteria, Soil Microbiology (BIOL/CSES 4684), pp. 1-3, Mar. 26, 2004. Website Printout, Source: http://soils1.cses.vt.edu/ch/biol_4684/Microbes/purprnb.html.
Wentzel, E., Thiobacillus, Soil Microbiology (BIOL/CSES 4684), pp. 1-4, Mar. 26, 2004. Website Printout, Source: http://soils1.cses.vt.edu/ch/biol_4684/Microbes/Thiobacillus.html.
Lichtenfels, M., Thermococcus, Soil Microbiology (BIOL/CSES 4684), pp. 1-4, Mar. 26, 2004. Website Printout, Source: http://soils1.cses.vt.edu/ch/biol_4684/Microbes/thermococcus.html.
Biogeochemical Cycles, Soil Microbiology (BIOL/CSES 4684), Sulfur Oxidation, pp. 1-5, Nov. 23, 2004. Website Printout, Source: http://soils1.cses.vt.edu/ch/biol_4684/Cycles/Soxidat.html.
CPL Carbon Link, The Active Force in Carbon, Activated Carbon from CPL Carbon Link: Activated Carbon Properties, pp. 1-2. Website Printout, Source: http://www.activated-carbon.com/1-3.html.
Chemviron Carbon, What is Activated Carbon?, pp. 1-2. Website Printout, Source: http://www.chemvironcarbon.com/carbon/definition.whatis.htm.
Chemviron Carbon, Adsorption, pp. 1-3. Website Printout, Source: http://www.chemvironcarbon.com/carbon/definition/adsorption.htm.
Activated Carbon in the Aquarium, pp. 1-3.
Ultralife Neutralizer Automatic Denitrator, pp. 1-2. Website Printout, Source: http://www.ultralifedirect.com/denitrators.htm.
WMT MBB, Moving Bed BioFilter, p. 1.
Mazzei Injector Corporation, Mazzei AirJection® System, pp. 1-2, Jul. 21, 2003. Website Printout, Source: http://www.mazzei.net/industrial/wastewater_aeration.htm.
Mazzei Injector Corporation, Mazzei® Injectors, pp. 1-2, Nov. 23, 2004. Website Printout, Source: http://www.mazzei.net/industrial/index.htm.
Mazzei Injector Corporation, Mixing Eductors, pp. 1-2, Jul. 21, 2003. Website Printout, Source: http://www.mazzei.net/industrial/Tmixer.htm.
Mazzei Injector Corporation, Ozone Contacting, p. 1, Jul. 21, 2003. Website Printout, Source: http://www.mazzei.net/inductrial/ozone.htm.
Vortex Ventures, Radial Eductor II, pp. 1-4.
TeeJet® Eductor Nozzle, p. 78.
TM, TurboMix™ Plastic Mixing Nozzles, p. 106.

* cited by examiner

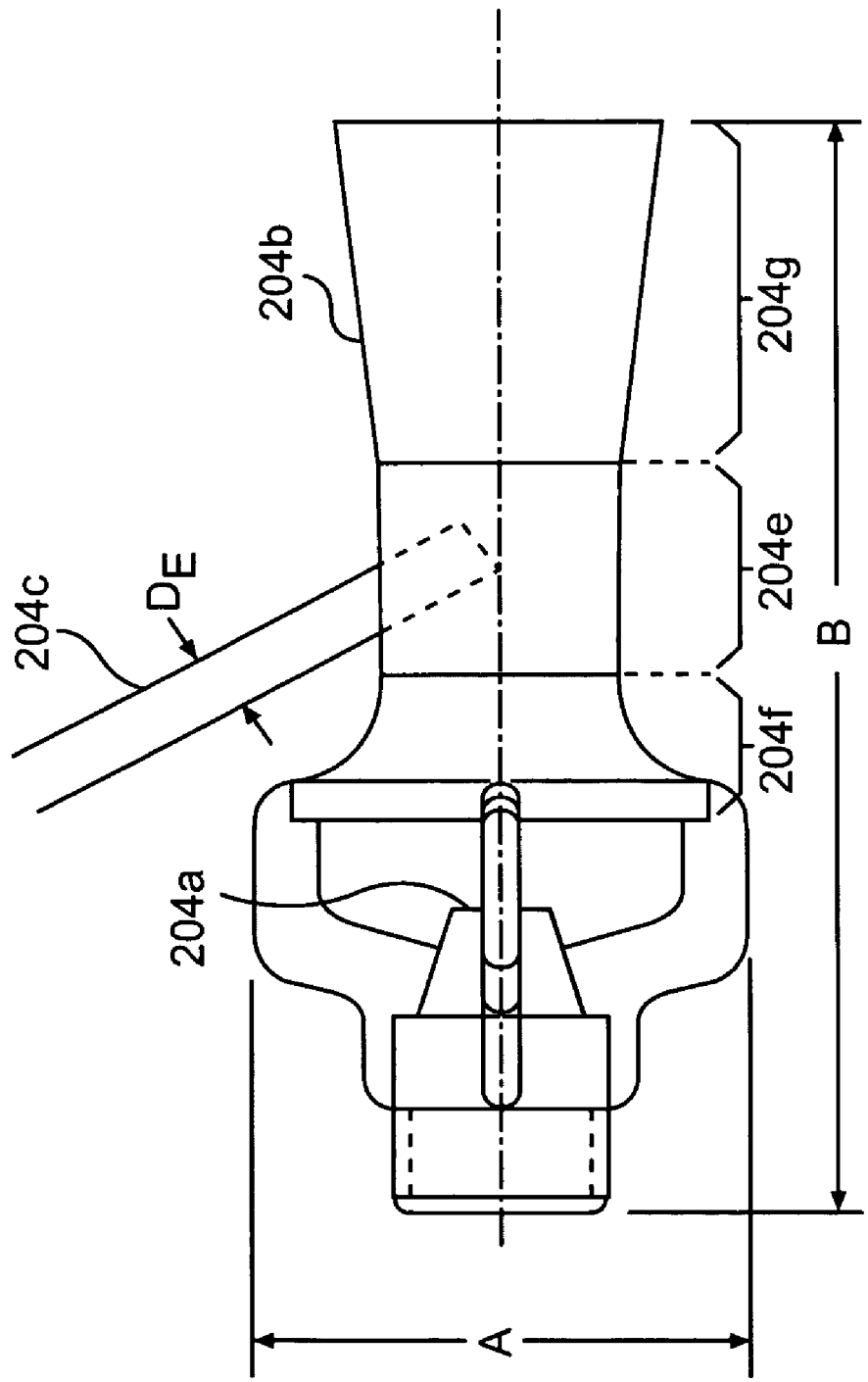

WASTE WATER TREATMENT PROCESS

RELATED APPLICATIONS

This non-provisional application is related to and claims priority to Provisional Application No. 60/507,956 filed on Oct. 3, 2003 in the name of Laurent OLIVIER, entitled WASTE WATER TREATMENT SYSTEM AND PROCESS FOR ANIMAL FARMS, the contents of which is fully incorporated herein by reference.

FIELD OF THE INVENTION

The present invention relates to a system and processes for treating waste water and solid waste from animal farms, such as pig farms, and cattle and sheep ranches, and includes the use of anolyte and catholyte solutions.

BACKGROUND

Waste water runoff from animal farms, such as pig farms, cattle ranches, and sheep ranches currently poses a threat to the environment due to the effects the farm runoff can have on aquifers, rivers, pools, lakes, and other water sources. Farm runoff contains high levels of contaminants, such as total ammonia nitrogen (TAN), nitrites, and nitrates, which are noxious to aquatic life and damage the ecological systems of fresh water streams and lakes. These contaminants and other contaminants exist in the solid waste produced by the farm animals, and can also poison or otherwise injure humans and animals by being transmitted by touch or through the air. Accordingly, waste water and solid waste from animal farms must be controlled and treated in order to remove the contaminants in the waste and provide environmentally safe conditions.

Waste water from animal farms is often treated using open air lagoons, where the waste water is allowed to sit until the animal waste is biologically broken down and the water is made environmentally safe. However, these lagoons can overflow when it rains, thereby polluting the nearby fresh water lakes and streams. Additionally, gas fumes from the lagoons pollute the atmosphere and cause an undesirable smell. Finally, the lagoons themselves take up large amounts of land which could be used for other, more productive purposes.

At least one state, North Carolina, has recognized the problems caused by the waste water lagoons used for treating runoff from pig farms, and has enacted legislation to severely limit the number of lagoons within the state. Consequently, the number of pigs that farmers can produce is limited by the number of lagoons they are allowed by law. Other states have passed similar types of legislation.

Therefore, a need exists for an improved system and process for treating waste water runoff from animal farms.

Similarly, solid waste from farm animals is often used as fertilizer. To be effective as fertilizer, however, the waste must be allowed to decompose, which typically takes between 3 weeks and 8 weeks. Before this time, the ammonia in the waste is toxic to plants. After the decomposition period, the ammonia in the waste is transformed into a nitrogen compound that is beneficial to plants. Having a large pile of waste exposed for such a long time is dangerous, as the bacteria inside the waste can be spread by touch or through the air. Additionally, transporting the waste is difficult, and is often done in completely sealed trucks. This is both expensive and dangerous, due to the possibility of transmitting viruses and bacteria in the waste. Therefore, a need exists for an improved method of treating solid waste from animal farms.

SUMMARY OF THE INVENTION

It is an object of the present invention to provide improved methods and systems for treating waste water and solid waste. For example, the methods and systems of the present invention may be used to treat waste water and solid waste from animal farms, such as for example, hog farms, dairy farms, and cattle and sheep ranches. The methods and systems of the present invention may also be used to treat waste water from other sources, such as human waste or farm runoff from irrigation.

The present invention includes novel systems for treating waste water runoff from animal farms. Certain methods and systems of the present invention utilize the process of flowing the waste water through a series of chambers. The chambers remove contaminants from the water by using an aerobic process, which efficiently removes or breaks down the organic matter in the waste water and controls odors; and an anaerobic denitration system, to control nitrate concentrations. The system minimizes the release of water into the environment and reduces the amount of total ammonia nitrogen (TAN) and other contaminants released into the environment. In addition, the processes of the present invention clean the water so that it may be recycled for use in cleaning the animal farms, thus significantly reducing the amount of water necessary for maintaining clean animal farms over time. Because the water may be recycled, animal enclosures may be cleaned more frequently while still conserving water use when compared with traditional animal farm waste water treatment practices. More frequent cleaning may result in healthier environments for the animals and help to reduce odors.

In certain embodiments, the systems of the present invention may be used in combination with lagoons, such as the lagoons of a previously existing hog farm. When used in conjunction with such lagoons, the systems of the present invention can help reduce contaminants in the lagoons to produce clean fresh water ponds and/or allow an increase in the number of animals, such as hogs, which can be produced per lagoon. Additionally, the present invention can help reduce odors and water runoff pollution produced from existing lagoons.

In certain other embodiments, the systems of the present invention are designed to be used in conjunction with a closed chamber or container, rather than an open air lagoon, for holding water and other materials. Preferably, the system is a system where the water used to clean the animal waste and carry the waste to be treated flows through a closed system, including a closed chamber or container. The use of such closed chambers or containers, rather than lagoons, may decrease the amount of contaminants released into the environment, as well as help to alleviate the odor problems associated with animal farms having open air lagoons. In addition, the use of closed systems, with closed chambers or containers, can provide waste water treatment for a variety of animals, including humans, in a given environment.

One embodiment of the present invention is directed to the use of catholyte and anolyte within the novel system for treating waste water runoff. Anolyte and catholyte are activated solutions produced by a known process called electrochemical activation. In the present invention, anolyte serves as a very powerful disinfectant against bacteria, viruses, and algae. As explained in more detail below, anolyte can be effective in both the liquid and aerosol form.

Catholyte is often considered to be a bi-product of the process for making anolyte. It is generally recognized as not having any disinfectant properties. In the application of the present invention, however, catholyte provides several benefits. Catholyte is useful for flocculation (e.g. of heavy metals), coagulation, washing, and extraction. Catholyte can also promote the health and growth of organisms used in the treating processes of the present invention.

An acidic or neutral anolyte, preferably having a pH ranging from 2.5 to 6.5 or from 6.5 to 8.5, respectively, and an alkaline catholyte, preferably having a pH ranging from 8 to 13, are used according to the embodiments of the present invention. In treating the waste water runoff, the anolyte is useful for disinfecting the water used to flush the enclosure containing the animal waste, and for eliminating odor and contaminants on the animals and equipment in the enclosure. The neutral anolyte may be preferable for use where it is not desirable to lower the pH of the water being disinfected, or where contact with an acid may damage equipment or be harmful to animals. The catholyte assists in separating the solid matter from the liquid matter, and also promotes healthy bacteria and algae which increases the efficiency of the water treatment process.

In addition, it is believed that spraying down the animal, as well as the animal enclosures, with catholyte will provide some health benefits to the animals. For example, the negative ions may be absorbed into the bloodstream and help the animals process food more efficiently. As a result, it is thought that the animals may have improved health, may realize faster growth, and/or may need less food to remain healthy. Additionally, it is theorized that spraying the animals and their enclosure with anolyte will help improve the health of the animals. The anolyte may help disinfect the floor of the pens and sterilize the air inside the pens, thereby reducing ammonia odors emitted from the pig pens. As a result, the animals will inhale less of the harmful fumes, which will lead to less instances of lung disease.

Another embodiment of the present invention is directed to a system for treating solid waste produced on animal farms. The solid waste is mixed with a catholyte solution which promotes more rapid decomposition of the ammonia in the waste. The solid may also be sprayed with anolyte to eliminate odors and prevent further spreading of contaminating elements. This system allows for safer conditions for creating fertilizer from solid waste, and for transferring such solid waste.

These and other embodiments of the invention will be discussed more fully in the detailed description of the embodiments.

BRIEF DESCRIPTION OF THE DRAWINGS

The accompanying drawings, which are incorporated in and constitute a part of this specification, illustrate exemplary embodiments of the invention and, together with the written description, serve to explain the principles of the invention.

In the drawings:

FIGS. 3a-3d are diagrammatic representations of jet mixers used in the FFS according to certain embodiments of the present invention.

DETAILED DESCRIPTION OF THE INVENTION

In the following description, reference is made to the accompanying drawings, which show by way of illustration specific exemplary embodiments in which the invention may be practiced. These embodiments are described in sufficient detail to enable those skilled in the art to practice the invention, and it is to be understood that other embodiments may be utilized and that changes may be made without departing from the scope of the present invention. The following description is, therefore, not to be taken in a limited sense. Wherever possible, the same reference numbers are used throughout the drawings to refer to the same or like parts.

Figure 1:
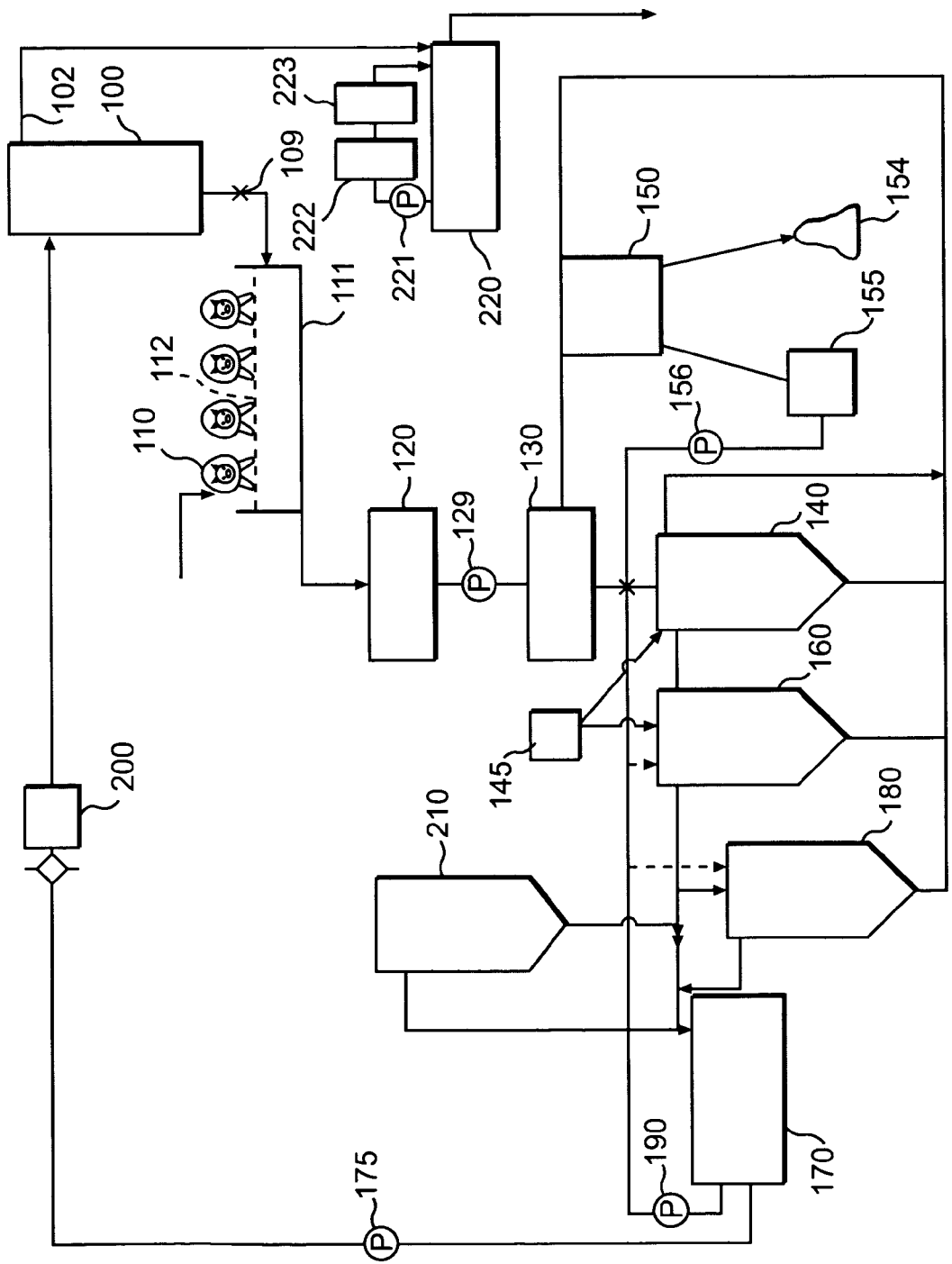
FIG. 1 is a process flow diagram representing the flow of the various process steps which may be used to treat waste water, according to one embodiment of the present invention.

The general processes of the present invention will now be discussed in connection with a preferred embodiment of a system for treating waste water. This system may be applied for use with previously existing lagoons or newly constructed lagoons, or may be applied without the use of lagoons, as will be discussed in greater detail. An example of a preferred process for treating animal farm runoff using a generally closed system is illustrated in FIG. 1. This system utilizes an aerobic process which quickly removes or breaks down the organic matter in the waste water and controls odors. An anaerobic denitration system is used to control nitrate concentrations. The system also minimizes the release of water into the environment. Additionally, the amount of total ammonia nitrogen (TAN) and other contaminants released into the environment is greatly reduced, if not fully prevented.

As illustrated in FIG. 1, animals are kept in an enclosure 110, such as a pen, that must be periodically cleaned to remove the manure and urine. The floor of the enclosure defines a water tight waste retainer 111 made, for example, of concrete. A grating 112 is placed over the retainer for the animals to stand on. The animals produce waste products, such as feces and urine, which fall through the spaces in the grating and into the retainer.

In one embodiment, an above ground flushing tank 100 stores water which is used to clean the retainer 111 and dilute the waste products. A valve 109 is used to control the flow of water from the flushing tank. When the valve is opened, water from tank 100 flushes away the animal waste products in the retainer 111. In practice, some volume of water in tank 100 is released into the waste retainer in a short amount of time, in order to effectively flush the waste from the retainer.

In another embodiment, water from tank 100 is applied through hoses that spray the grating and waste retainer. A pump could be used to apply a spray of water more forcefully. In one embodiment, a timer is used to automatically open valve 109 and clean the retainer at periodic intervals. The length of period between cleanings may be as long or as short as desired. More frequent cleanings, such as, for example, 3 times per hour to one cleaning every four hours, may serve to reduce the amount of odor caused by ammonia gas released into the atmosphere by the fresh feces and urine.

Figure 24:
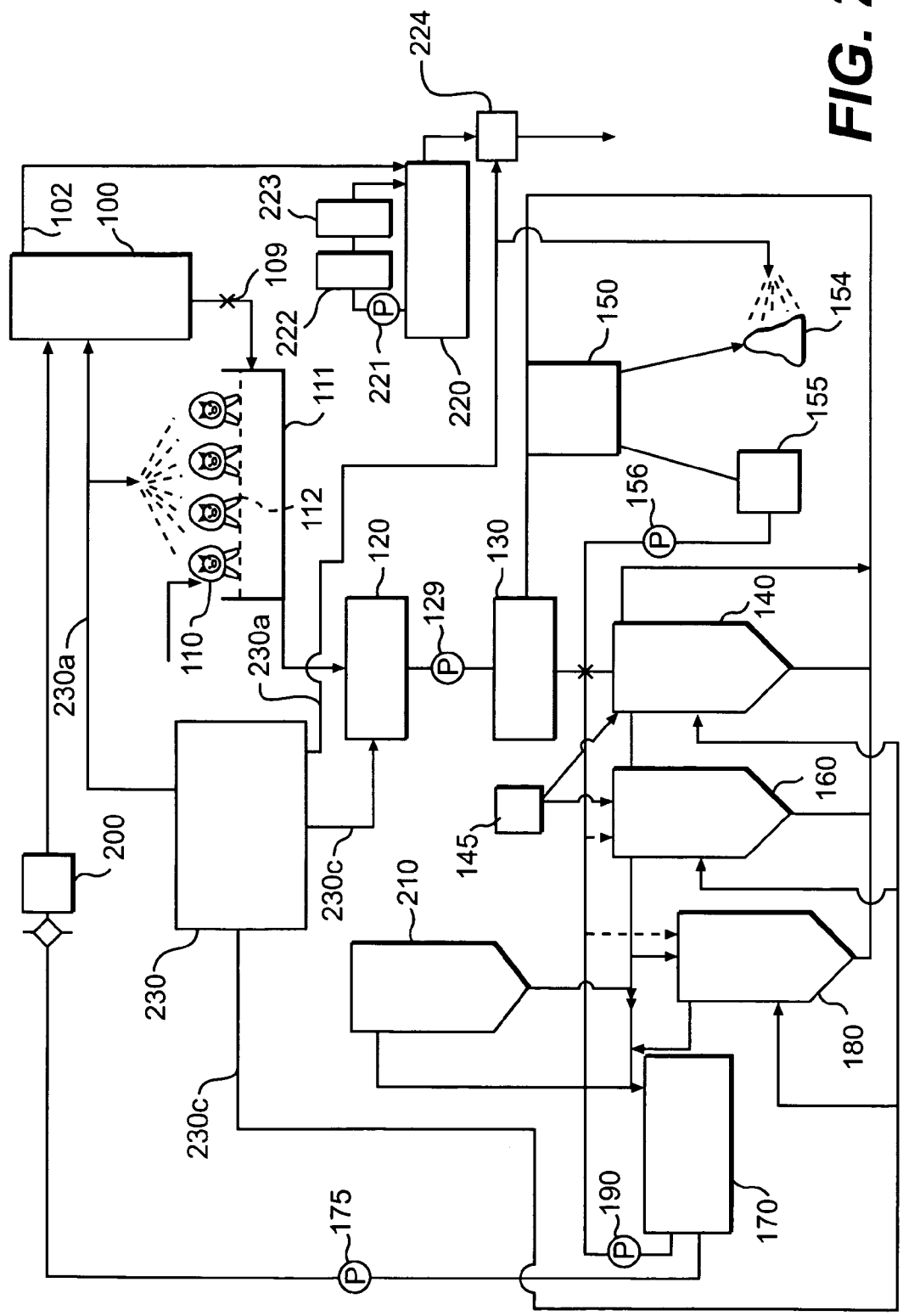
FIG. 24 is a process flow diagram representing the flow of the various process steps which may be used to treat waste water using anolyte and catholyte, according to an embodiment of the present invention.

As discussed above, anolyte and catholyte may be used in certain embodiments of the present invention. FIG. 24 is a flow diagram illustrating the flow of anolyte 230a and catholyte 230c from a supply source 230 to a number of points in the system of the present invention where anolyte and catholyte may optionally be introduced. In one embodiment, anolyte and catholyte are employed at all of the illustrated points, while in certain other embodiments, anolyte and catholyte are employed at only one or some of the points illustrated. The supply source 230 may be a machine for generating anolyte and catholyte on-site, or alternatively, may be a storage device for storing anolyte and catholyte generated at some other location.

In one embodiment of the invention, as illustrated in FIG. 24, anolyte is used to clean, disinfect, and deodorize the animal enclosure 110. The anolyte can also be used to disinfect equipment inside the enclosure, as well as the animals themselves. In one embodiment, an aerosol form of anolyte is sprayed into the air inside the enclosure to reduce odor and to sanitize the enclosure itself, the animals, and the equipment inside the enclosure.

In a preferred embodiment, an aerosol form of 100% neutral anolyte is released into the enclosure 110. The anolyte will help reduce the ammonia odors in the enclosure and will clean the air that is inhaled by the pigs. This cleaner air will result in pigs with less instances of lung disease, thereby providing healthier pigs.

As discussed above, anolyte and catholyte may be produced on site in a machine 230. In one embodiment, machine 230 creates catholyte and anolyte from water in an electrochemical process which is known in the art. The supply of freshly produced anolyte and/or catholyte may be applied directly from the machine or a holding tank (not shown) to the system. For example, the anolyte may be applied directly to the enclosure 110, or alternatively, the anolyte may be added to the water in tank 100, which is then used to clean and disinfect enclosure 110.

Referring back to FIG. 1, the volume of flushing tank 100 may be chosen to be any desired volume, and may depend on the type and weight of the animals in enclosure 110. For example, if the animals are pigs, the volume of tank 100 is preferably between 0.10 to 0.20 liters per Kg of pigs kept in enclosure 110.

The resultant diluted animal waste flows from the retainer 111 into a holding area. The holding area must be large enough to hold the water released from flushing tank 100 to clean the animal waste. In one embodiment, the holding area is mixing tank 120, which may be placed either above or below the ground. The mixing tank 120 includes a mixing device for mixing the water and waste products. The volume of tank 120 must be sufficient to hold the waste water generated when the retainer 111 is cleaned. Preferably, the volume is at least 1.5 to 2 times that of the flushing tank. If a mixing tank is not used, a storage tank without a mixing device may be used to hold the water used to clean retainer 111 while it is waiting to be processed.

In an embodiment including a mixing tank, the animal waste and water are mixed to give the waste water a relatively homogenous consistency and to reduce the size of the feces particles in the mixture, which will make the later processing steps more efficient. The mixing tank may incorporate any type of mixing apparatus known in the art. For example, one or more propellers may be used.

Optionally, an oxygen-containing gas, such as air, oxygen gas, ozone, or mixtures thereof, may be introduced into the mixing tank. The gas may be added, for example, by injectors located in the tank. In one embodiment, the gas is added through a mixing eductor designed for this application, as explained below. Adding an oxygen-containing gas will help the aerobic bacteria begin to break down the mixture by, for example, reducing ammonia to nitrites and nitrites to nitrates.

In a preferred embodiment, alkaline catholyte is added to the mixing tank. The catholyte will start the flocculation process and help precipitate heavy metals in the waste. Adding catholyte at this stage will allow for improved separation of the solid and water waste, and make the entire treatment process more efficient. Active catholyte from any source can be added to the mixing tank in any manner that promotes prompt and efficient mixing of the catholyte with the animal waste within the mixing tank. In the preferred embodiment, the catholyte is produced on site in a machine that creates catholyte and anolyte from water in an electrochemical process. A supply of freshly produced catholyte is applied from the machine or a holding tank to the mixing tank, as shown generally in the block diagram at FIG. 24. For example, the catholyte may be added directly to tank 120 or may be added upstream of the tank to the stream of waste water flowing into the tank. The amount of catholyte added may be chosen based on the desired amount of flocculation of contaminants, such as heavy metals, in the mixing chamber, as well as to promote the desired degree of bacterial growth in the chamber. For example, the catholyte may be added to achieve a concentration ranging from about 1 to about 30 percent of the total volume of waste water in the mixing tank.

Figure 14:
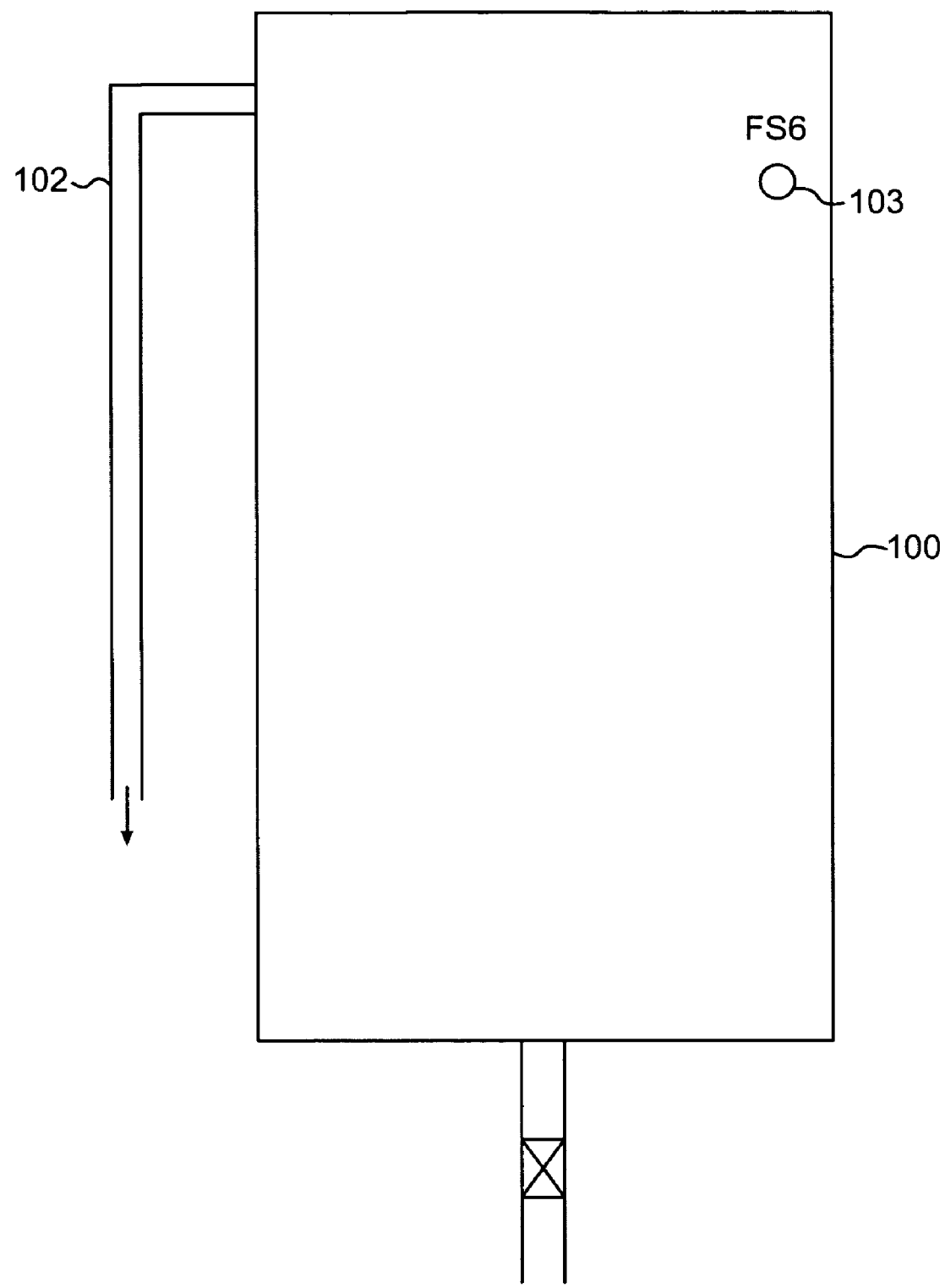
FIGS. 14, 15 and 16 are diagrammatic representations of chambers used in the various process steps which may be used treat waste water, according to an embodiment of the present invention.

An example of a flushing tank and mixing tank which may be used for automatically controlling the cleaning of retainer 111 will now be described in connection with FIGS. 14 and 15. FIG. 14 illustrates one example of a flushing tank 100 which may be used if automatic cleaning is desired. The tank includes a floating switch 103, which indicates the level of water in the tank. An overflow 102 is provided to direct the flow of water from the flushing tank when the water reaches a maximum desired level in the tank. The tank illustrated in FIG. 14 is for example only, and any container known in the art which is suitable for holding a sufficient supply of water may be used with the present invention.

Figure 15:
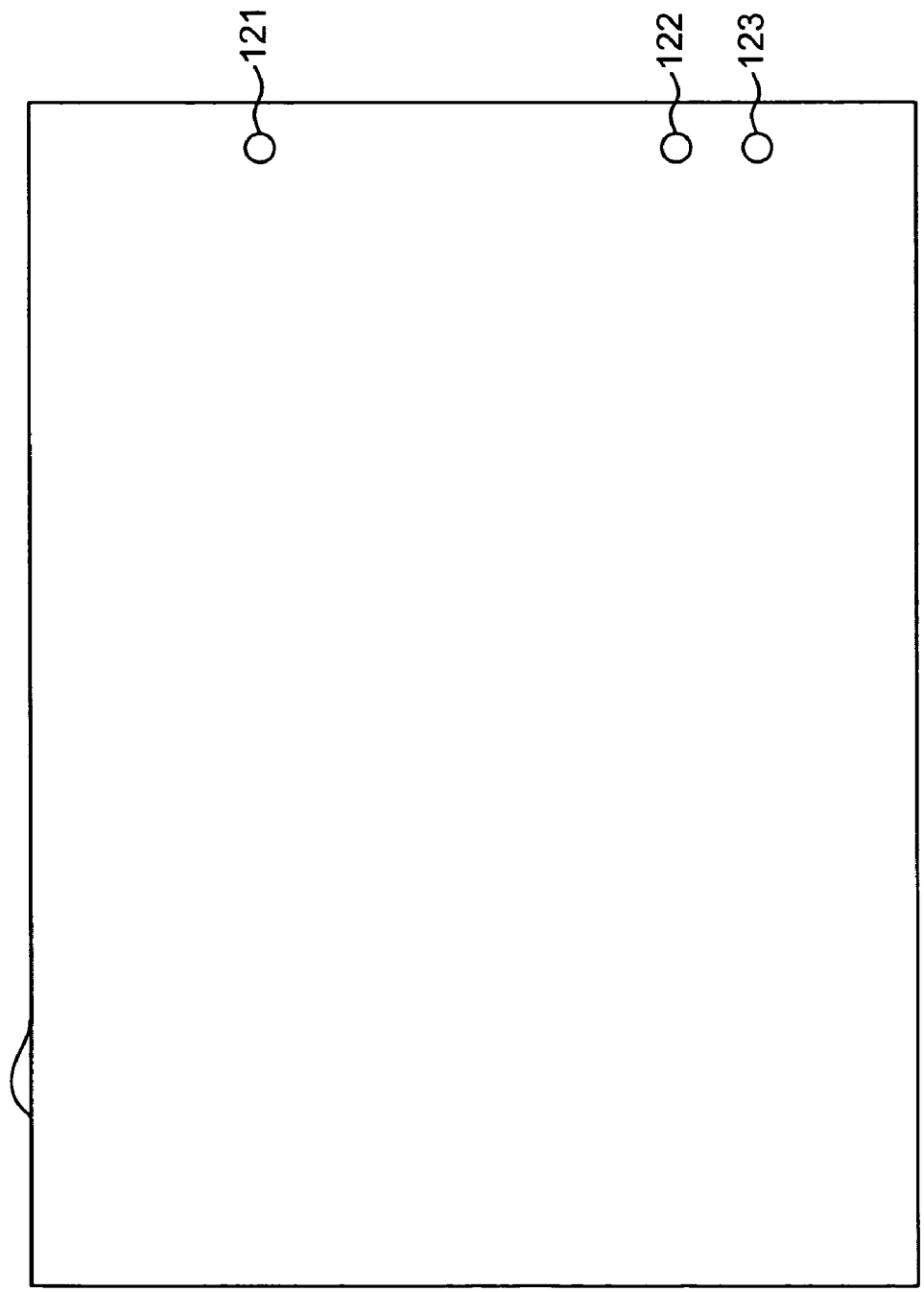

FIG. 15 illustrates one example of a mixing tank 120 which may be used if automatic cleaning is desired. The tank includes floating switches 121, 122, and 123. Floating switch 121 determines when a desired maximum level of water is reached in the tank, and when flushing valve 109 should be closed. A switch 122 is used to determine the level in mixing tank 120 when the flushing valve 109 will be opened to allow more waste water to flow through retainer 111 and into mixing tank 120. Switch 123 is used to determine when a minimum level of water has been reached in mixing tank 120, so that the flow from mixing tank 120 to the rest of the treatment system will be stopped.

In one embodiment, switches 121 and 122 work in combination with switch 103 in flushing tank 100 to signal when the flushing valve 109 may be opened or closed. The signals from the switches may be received by a valve control means (not shown), which will open and close valve 109. For example, valve 109 may remain closed until the flushing tank is sufficiently full to provide water necessary to clean the retainer 111, and the mixing tank is sufficiently empty to receive the incoming waste water, at which point both switches 122 and 103 will switch on, signaling the valve control means to open flushing valve 109 to clean retainer 111. However, if switch 122 is on and switch 103 is off, or vice versa, the flushing valve will remain closed. If the water in the mixing tank reaches a desired maximum level, switch 121 will switch on, and valve 109 will close.

The valve control means for opening and closing valve 109 may be any means known in the art, and may include, for example, an electric motor for driving the valve and a microprocessor or electro contactor for processing the signals from the switches.

In another embodiment, a timer is added to the system to control the time periods between flushing. The timer works in combination with switches 121, 122 and 103, so that once the desired time between cleanings has elapsed, valve 109 will open to clean the retainer, but only if the flushing tank is sufficiently full to provide water necessary to clean the retainer 111, and the mixing tank is sufficiently empty to receive the incoming waste water.

Referring again to FIG. 1, after the manure and water are well mixed within mixing tank 120, the mixture is then pumped to the solid separator using pump 129. Pump 129 may be, for example, a screw pump, which can effectively move the solid containing material to the solid separator 130. Other types of pumps known in the art may also be used. The pump is sized appropriately to meet the demands of the waste water treatment system, which will depend on the flow rate of waste water through the system. Preferably, the size of the pump may be chosen to provide a flow rate of at least 0.15 to 3.0 liters per Kg of animals per hour. In one embodiment, signals from switches 121 and 123 in mixing tank 120 control pump 129 to maintain a minimum amount of waste water in mixing tank 120, such as, for example, 20% of the volume of tank 120. If waste water in tank 120 is reduced to this minimum level, switch 123 will signal pump 129 to stop. Similarly, switch 123 will signal pump 129 to begin pumping if the level of water increases above the desired minimum level in mixing tank 120.

The solid separation step 130 may be performed using any type of solid/liquid separation system known in the art. Examples of systems which are known in the art include gravity screen, disk screen, drum, belt, screw press screen, and filter systems. The type of separation system used will depend on the cost of the system, the percentage of solids which are desired to be removed from the mixture, and the desired moisture content of the solids which are removed. The separation system must have the capacity to process a flow of waste water which is greater than that provided by pump 129, in order to insure that the separation system can process the flow of waste water. Preferably, the separation system is designed to process a flow rate which is 20% greater than the maximum flow from pump 129.

The solids separated from the manure and water mixture are collected in a waste collector 150, as illustrated in FIG. 1, where it may be further processed to separate any remaining liquid from the solid waste, if desired. If additional separation is employed, the remaining liquid could optionally be pumped back to the Foam Fractionator Separator (FFS) by pump 156. The concentration of toxic contaminants, such as heavy metals, for example, in the dry waste in collector 150 should be analyzed. If the level of contaminants is safe, the solid waste 154 from collector 150 may be used as fertilizer or sold for ethanol production. If the level of contaminants is unsafe, the solid waste should be sent to a special waste treatment plant, as known in the art. In one embodiment, as shown in FIG. 24, the solid waste 154 may be treated with anolyte by, for example, spraying the anolyte onto the waste in order to help disinfect and deodorize the waste.

Referring again to FIG. 1, the waste water separated from the manure and water mixture flows to the FFS 140, which introduces air, oxygen gas, and/or ozone bubbles into the water to trap contaminants, such as dissolved organic compounds (DOC), grease, phenol, particulates and protein, and separates them from the water. The FFS also increases the level of dissolved oxygen in the water, as well as degasses the water. The FFS will help to remove DOC, TAN and odors. Ozone is preferably used in the process, as it aids in dissolving and collecting organic matter and kills undesirable bacteria, viruses, and other organisms. The contaminants trapped by the bubbles are collected in a foam, which forms on the water's surface at the top of the FFS. Other heavier matter may settle to the bottom, where it is collected and removed from the FFS through drain valve 206.

In one embodiment, catholyte is added to the FFS during processing. The presence of catholyte as the waste flows through the FFS will allow the FFS to operate more efficiently. Catholyte will aid in the flocculation of heavy metals and the ionization of fine waste particles and improve the separation of such particles from the water by sinking and floating. The catholyte may be added directly to the FFS tank or may be added upstream of the FFS to the stream of waste water flowing into the FFS. The catholyte may be added by any means known in the art, such as by dripping, flowing, spraying or use of a jet mixing eductor. In one preferred embodiment, the catholyte is introduced through the eductors in the FFS, as will be described in greater detail below. The amount of catholyte added may be chosen to optimize the amount of separation of contaminants in the FFS. For example, the catholyte may be added to achieve a concentration ranging from about 1 to about 30 percent of the total volume of waste water in the FFS.

The size of the FFS 140 will depend, in part, on the amount of solids which remain in the waste water after the solid separation step 130. The less solids which remain, the smaller the FFS may be. Thus, it may be cost effective to choose a mechanical solid separator which removes a relatively high percentage of solids from the waste water. The FFS 140 may be any desired size, but preferably has the capacity to treat waste water at a flow rate greater than the flow supplied by pump 129, in order to allow water to be recirculated back through the system from pump 190. For example, in one preferred embodiment, FFS 140 has the capacity to treat waste water at a flow rate at least 6 times greater than the flow supplied by pump 129. The FFS will be described in greater detail below.

In one embodiment, a filter is used in conjunction with the FFS to filter additional solids from the water. Any type of filter known in the art may be used, including a mechanical filter, such as a screen. The filter may be placed before or after the FFS, or both before and after the FFS.

Figure 5:
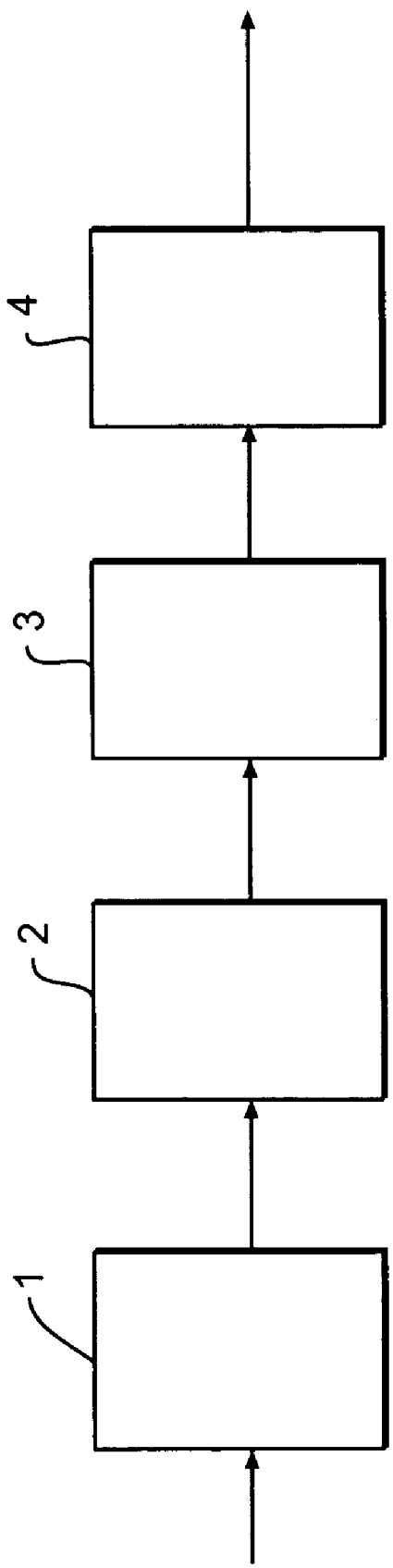
FIG. 5 is a process flow diagram representing the various process steps used for denitration of the waste water, according to certain embodiments of the present invention.

The efficiency of the system may be increased by employing multiple FFS systems in-line, as illustrated in FIG. 5. For example, two, three, four or five FFS or more may be employed. The number may depend on whether catholyte is used during this step of the process, since fewer systems may be sufficient when the catholyte aids in the removal of particles. In certain embodiments, ozone gas may be added to the gas mixture of one or more of the in-line FFS systems to further improve efficiency. In one embodiment, ozone gas is added to one or more of the in-line FFS systems, but not added to the last FFS, in order to allow the ozone to be degassed from the water before leaving the in-line FFS system.

Figure 2A:
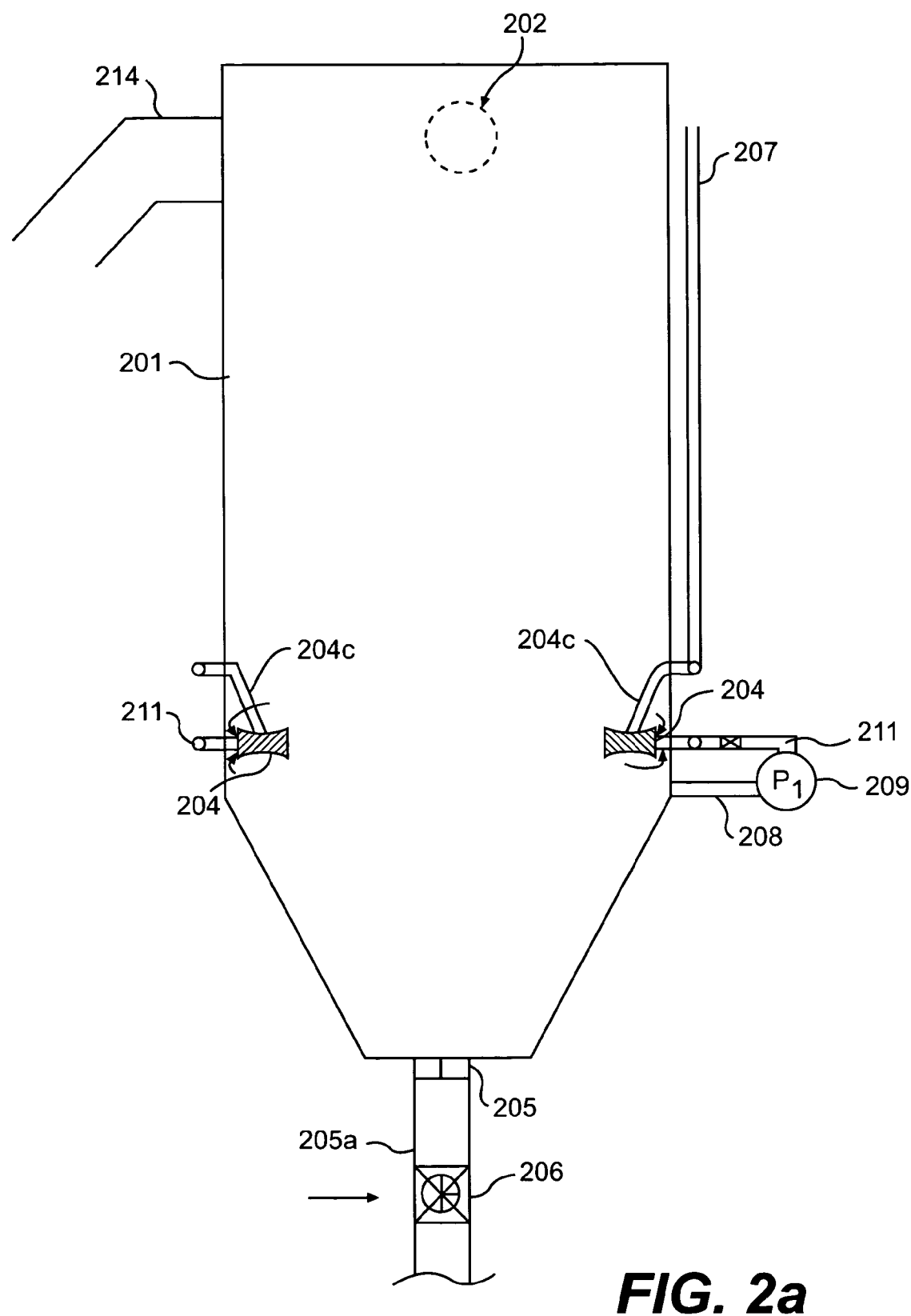
FIGS. 2a-2m are diagrammatic representations of foam fractionator separator (FFS) systems used for further treatment of the waste water, according to certain embodiments of the present invention.
Figure 2B:
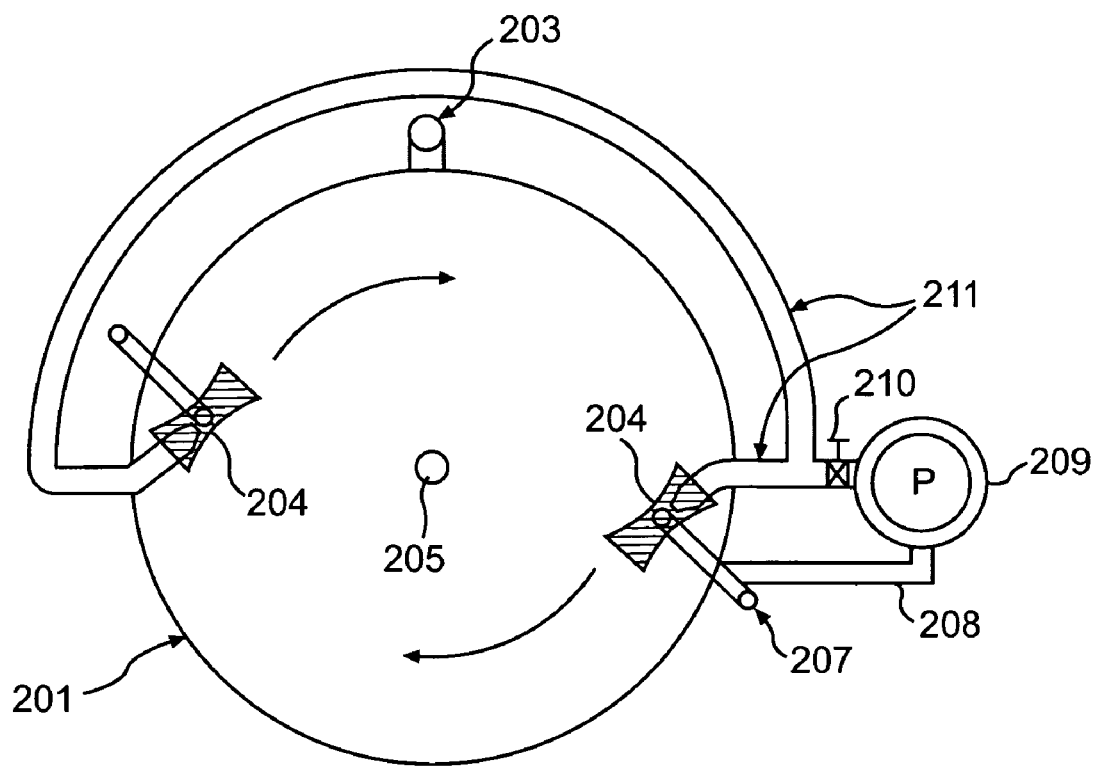
Figure 2C:
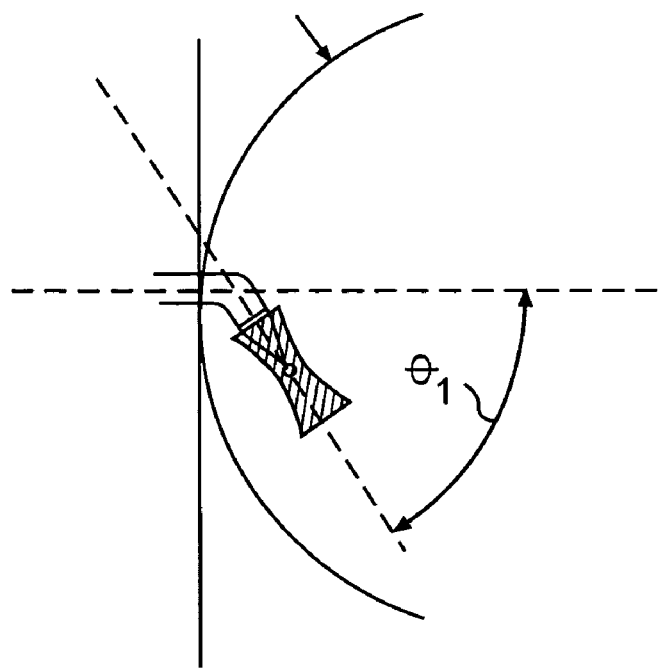
Figure 2D:
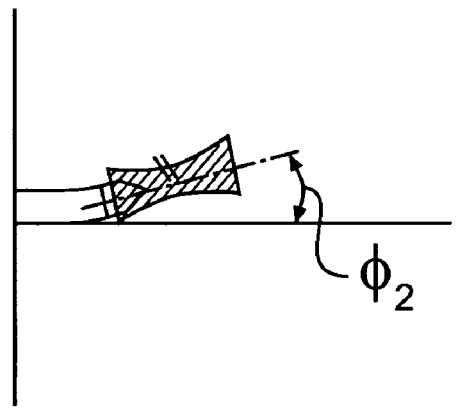
Figure 2E:
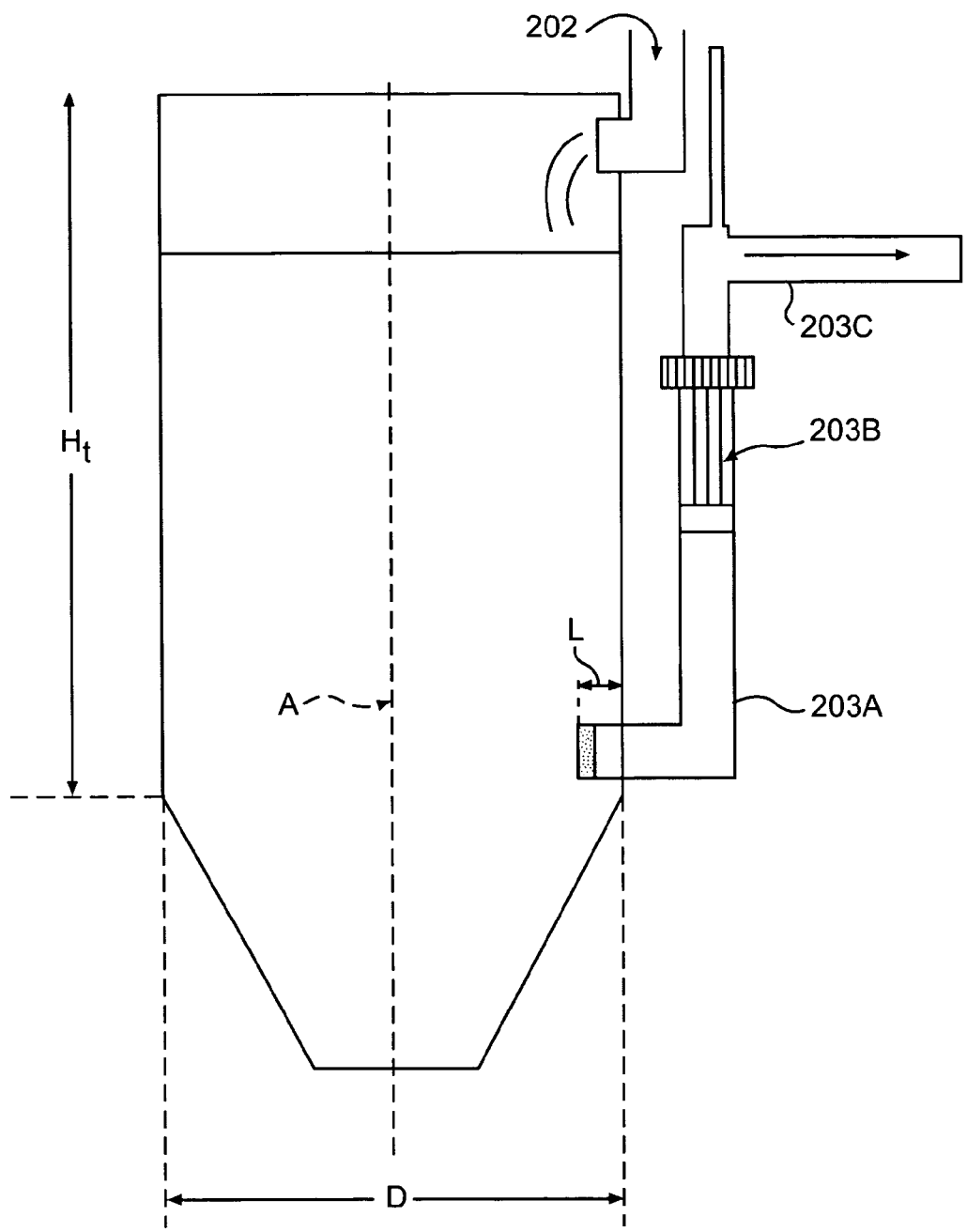
Figure 2F:
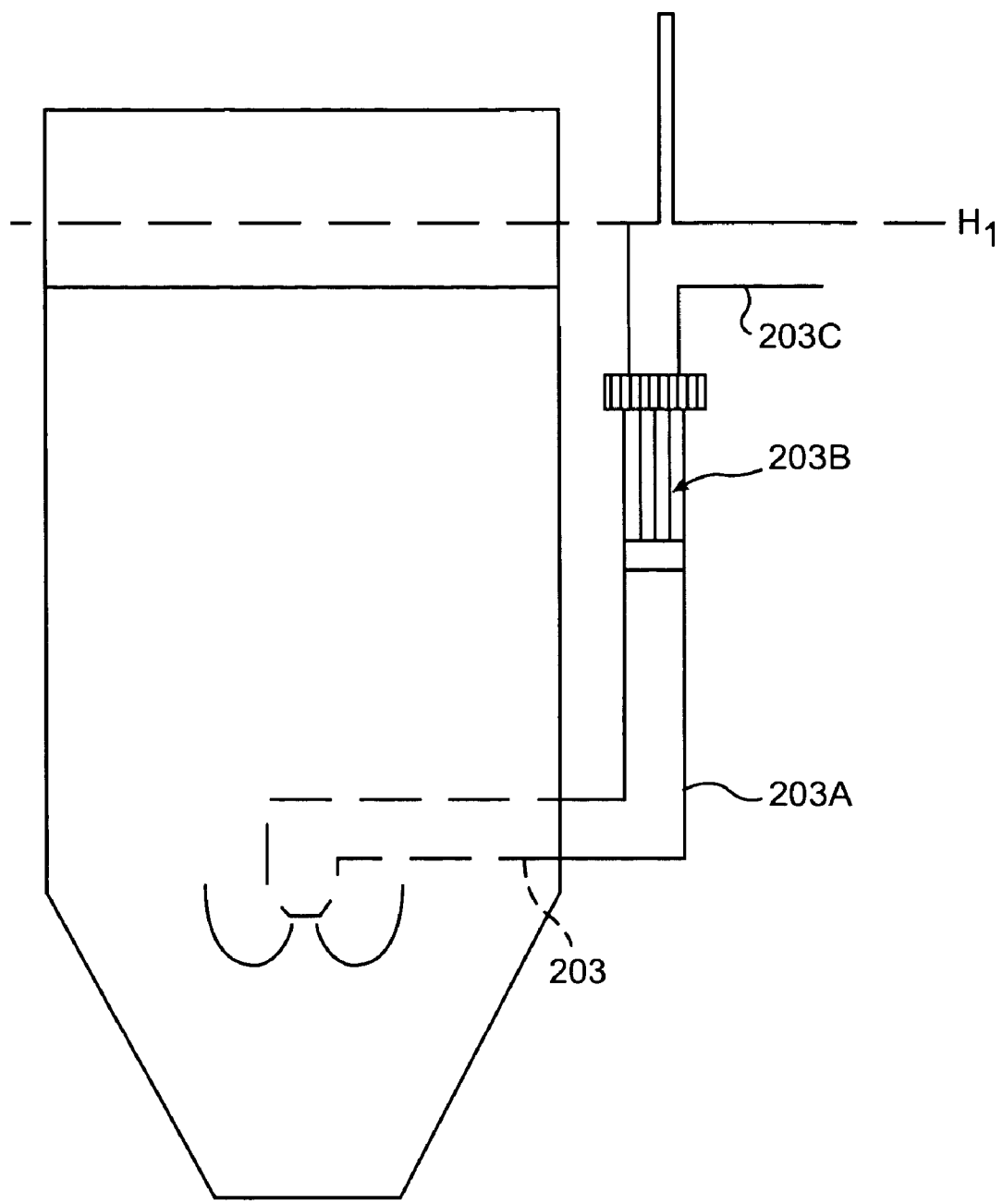
Figure 2H:
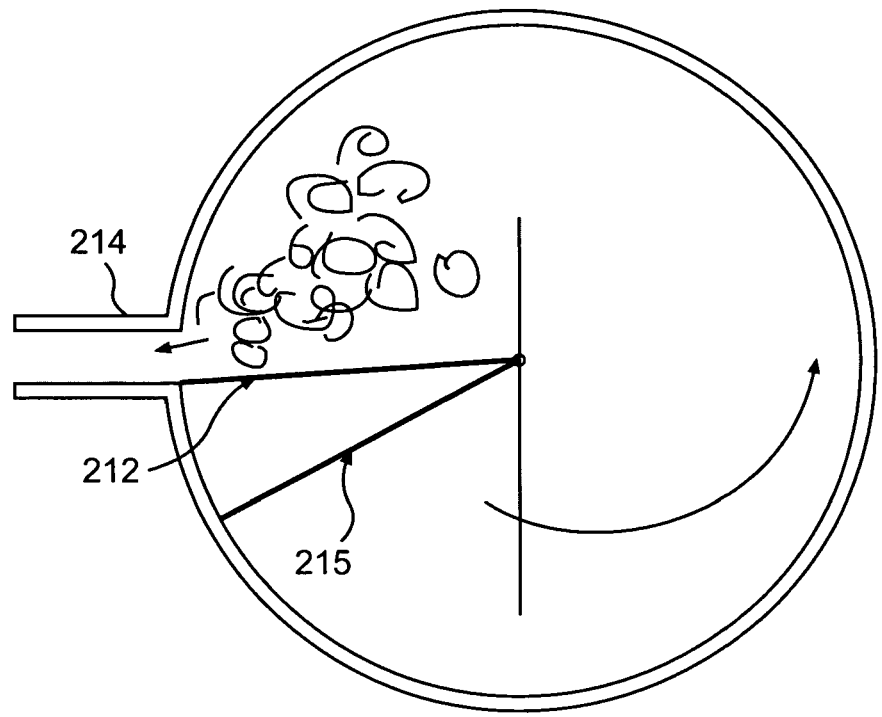
Figure 21:
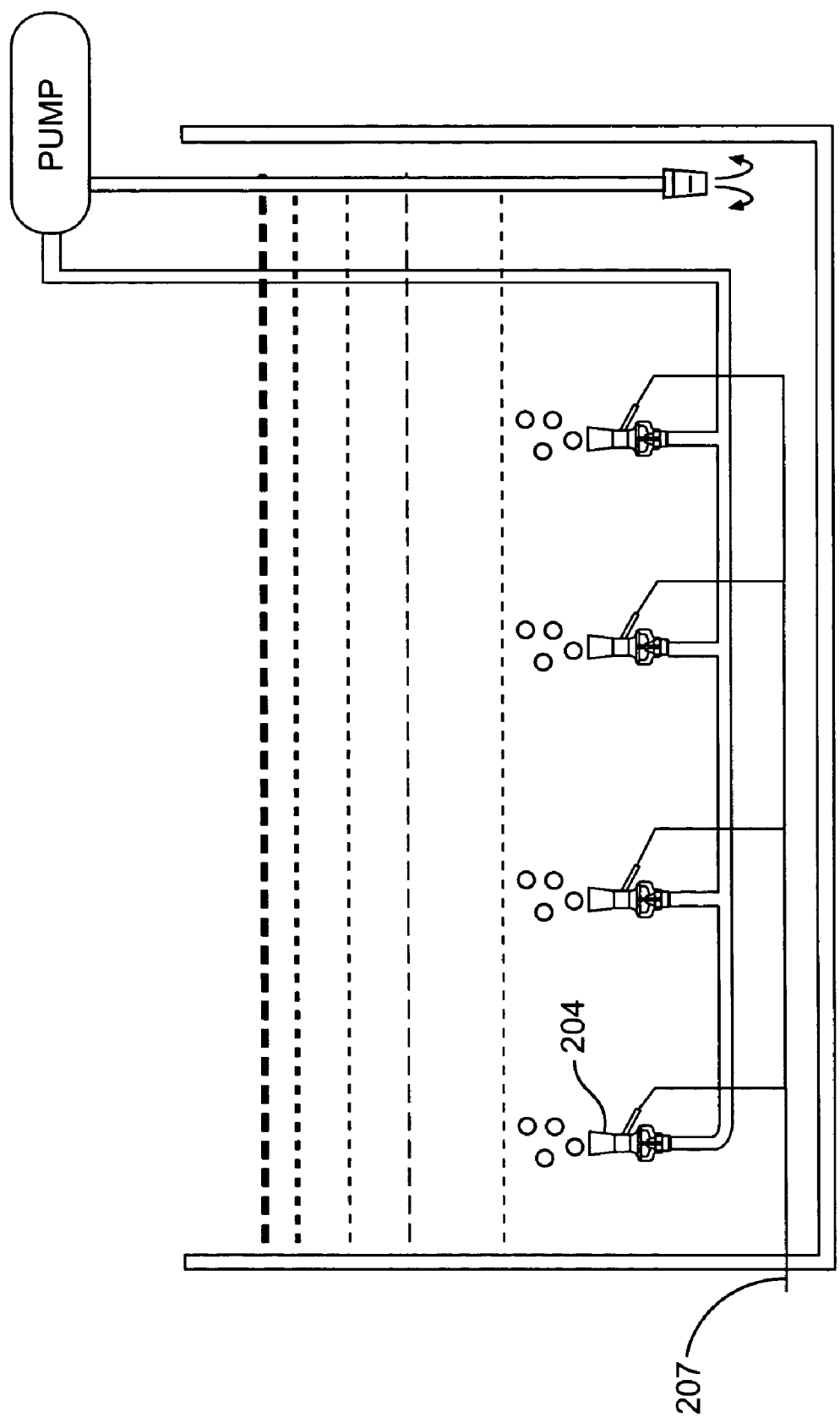
FIG. 21 is a diagrammatic representation of a system for aerating lagoons, according to one embodiment of the present invention.

Any means known in the art for forcing the flow of water from one FFS to another in a multiple FFS system may be used. In one embodiment, as illustrated in FIG. 21, multiple FFS having different sizes may be placed in-line in order from largest to smallest, which allows water from each FFS to run by force of gravity to each succeeding FFS. In another embodiment, as illustrated in FIG. 2m, multiple FFS of the same or similar sizes may be placed in-line at different heights in order from highest to lowest, which also allows water from each FFS to run by force of gravity to each succeeding FFS. These in-line FFS system embodiments may be designed to remove up to 50% or more of the dissolved matter from the water in a single pass, where one pass is the amount of time it takes for about 99% of the water to pass through the in-line system, as follows:

$$\text{one pass (in hours)} = \frac{(9.2)(\text{Total volume of all in-line } FFS \text{ in gallons})}{(\text{Flow rate in gallons/hour})}$$

For example, in a system having three in-line FFS, where each FFS has a volume of 300 gallons, and given a flow rate of 1800 gallons per hour through the system, $$\text{one pass} = \frac{(9.2)(900 \text{ gallons})}{1800 \text{ gallons/hour}}$$
$$= 4.6 \text{ hours}$$

The FFS systems of the present application may be capable of removing certain dissolved or undissolved organic and inorganic matter in both fresh and salt water. Examples of matter which may be removed from the water by the FFS include organic or inorganic matter comprising one or more of the following: organic nitrogen containing compounds, inorganic nitrogen containing compounds, organic phosphorus containing compounds, inorganic phosphorus containing compounds, organic potassium containing compounds, inorganic potassium containing compounds, organic sulfur containing compounds, inorganic sulfur containing compounds, boron, zinc, manganese, iron, copper, calcium, magnesium, and aluminum. In certain embodiments, sodium dissolved in the water is not removed.

Referring again to FIG. 1, the solids collected from the bottom of the FFS are transferred to waste matter collector 150, where they are stored and processed similar to the solids removed from the solid separator 130, as described above.

The foam waste in the FFS is collected in a separate tank. The gas introduced into the FFS pushes the foam out of the FFS and into the separate tank where it is stored. The tank containing the foam is preferably fitted with an exhaust system containing activated carbon to remove any harmful emissions released from the foam. The foam is allowed to sit for a period of time such that the foam settles, by gravity, and returns to a liquid form. The resulting liquid is dried, and treated similarly to the solids removed from the solid separator 130, as described above.

Referring again to FIG. 1, the clean water stream from the FFS flows to a bio-filter 160. The bio-filter uses aerobic bacteria processing to reduce total ammonia nitrogen (TAN) to nitrates. The water to be treated is flowed through a chamber which contains a support media that preferably has a large surface area on which the aerobic bacteria may colonize. An oxygen-containing gas is introduced into the chamber to improve the efficiency of the aerobic bacteria process.

In one embodiment, the media in the chamber of the bio-filter 160 is mixed with the water in the tank using a water or gas mixing jet. If a gas mixing jet is used, an oxygen-containing gas is introduced into tank 160, which will increase the efficiency of the aerobic bacteria in reducing TAN. The gas may be supplied from a gas supply source 145, which may include, for example, outside air from the surrounding atmosphere.

The aerobic bacteria exist and thrive in the water and will colonize on the media within the chamber as the system is operated. The type of aerobic bacteria utilized in step 2 may include, for example, *nitrosomonas* and *nitrobacter* bacteria. These naturally occurring bacteria break down ammonia and nitrites in the waste water and form nitrates. In a preferred embodiment, sufficient catholyte is added so that catholyte will exist in the bio-filter and will aid in removing ammonia and nitrates from the water. For example, the catholyte may be added to achieve a concentration ranging from about 1 to about 20 percent of the total volume of waste water in the bio-filter tank. The catholyte will improve the health and growth of the bacteria, which will in turn provide for a much more effective filtering process. The catholyte may be added directly to tank 160 or may be added upstream of the tank to the stream of waste water flowing into the tank. The catholyte may be added by any means known in the art, such as by dripping, spraying, flowing, or use of a jet. In a preferred embodiment, the catholyte is added through an eductor, as will be described in greater detail below.

The bottom of the tank 160 is preferably conically shaped to allow efficient collection of waste matter which settles to the bottom. A flushing valve located at the bottom of the tank allows for periodic removal of the collected waste matter, which then flows to the collector 150, as shown in FIG. 1, where it is processed as discussed above. Bio-filter 160 may be any desired size, but preferably has the capacity to treat waste water at a flow rate greater than the flow supplied by pump 129, in order to allow water to be recirculated back through the system by pump 190. In one preferred embodiment, bio-filter 160 has the capacity to treat waste water at a flow rate at least 6 times greater than the flow supplied by pump 129. While any bio-filter known in the art may be used in the process of the present invention, an example of a novel and preferred bio-filter will be discussed in greater detail further below.

In the system of FIG. 1, a portion of the water from the bio-filter 160 flows to a retention tank 170, and the remaining portion flows to a denitration system 180 for reduction of nitrate levels, before going to the retention tank. The amount of flow to the denitration system may be chosen according to the desired reduction in nitrate levels. For example, about 5 to about 20 percent of the volume of water flowing from the bio-filter may flow to the denitration system. The water may flow to the denitration system from the bio-filter by force of gravity, in order to decrease energy costs. Alternatively, the water may be pumped to the denitration system. In another embodiment, the water in the retention tank 170 can be pumped into the denitration system 180 using, for example, pump 190.

Denitration system 180 allows nitrate levels in the closed system of FIG. 1 to be maintained at desired levels. The nitrates are formed in the waste water from bacterial break down of the animal waste, such as occurs in the bio-filtration step. As discussed above, nitrates pose a serious problem to the environment. In order to manage nitrate levels in the water, any denitration system known in the art may be employed.

One type of preferred denitration system for removing nitrates, known as a Nitrafix system, is described in co-pending application Ser. No. 10/673,634, filed on Sep. 30, 2003, and entitled AUTOTROFIC SULFUR DENITRATION CHAMBER AND CALCIUM REACTOR, and in Continuation-In-Part Application, filed on Sep. 30, 2004, and entitled AUTOTROFIC SULFUR DENITRATION CHAMBER AND CALCIUM REACTOR, both of which are herein incorporated by reference in their entirety. One particularly preferred Nitrafix system will be described in greater detail further below. While Nitrafix systems are preferred, any system known in the art for removing nitrates may be used.

Any waste matter collected in the denitration system 180 flows to collector 150, if desired, where it is further processed, as discussed above. In the preferred embodiment, a supply of catholyte is added, directly or indirectly, to the denitration system as is also described in the above co-pending Continuation-In-Part application, filed on Sep. 30, 2004, and entitled AUTOTROFIC SULFUR DENITRATION CHAMBER AND CALCIUM REACTOR. The catholyte will improve the health and the growth of the bacteria, which will help remove nitrates in the denitration system. The amount of catholyte added may be chosen to provide optimum nitrate removal from the waste water. For example, for waste water treatment, the concentration added may range from about 1 to about 20 percent or more of the volume of water flowing through the denitration system.

Referring again to FIG. 1, water flows from the denitration system 180 to the retention tank 170, which may be located above or below ground. The retention tank may be any container for holding water. For example, it may be a lagoon, pond, or above ground tank or underground tank. The lagoon may be a lagoon which was previously used to hold waste water, but to which the system of the present invention has been added to clean, by, for example, pumping the water from the lagoon to the FFS using pump 190. The tank may be open or closed, but is preferably closed to control gas emissions. Preferably, the flow of water and products carried by the water flows in a closed system to and from the location where the animals are located and thus produce feces and urine.

The volume of retention tank 170 may be chosen to be any desired size which will meet the needs of the system. In one embodiment, the volume of tank 170 ranges from 1.5 to 6 times the volume of tank 100, and more preferably is 2 times the volume of tank 100. Lagoons or ponds of any size may also be used as tank 170.

Figure 16:
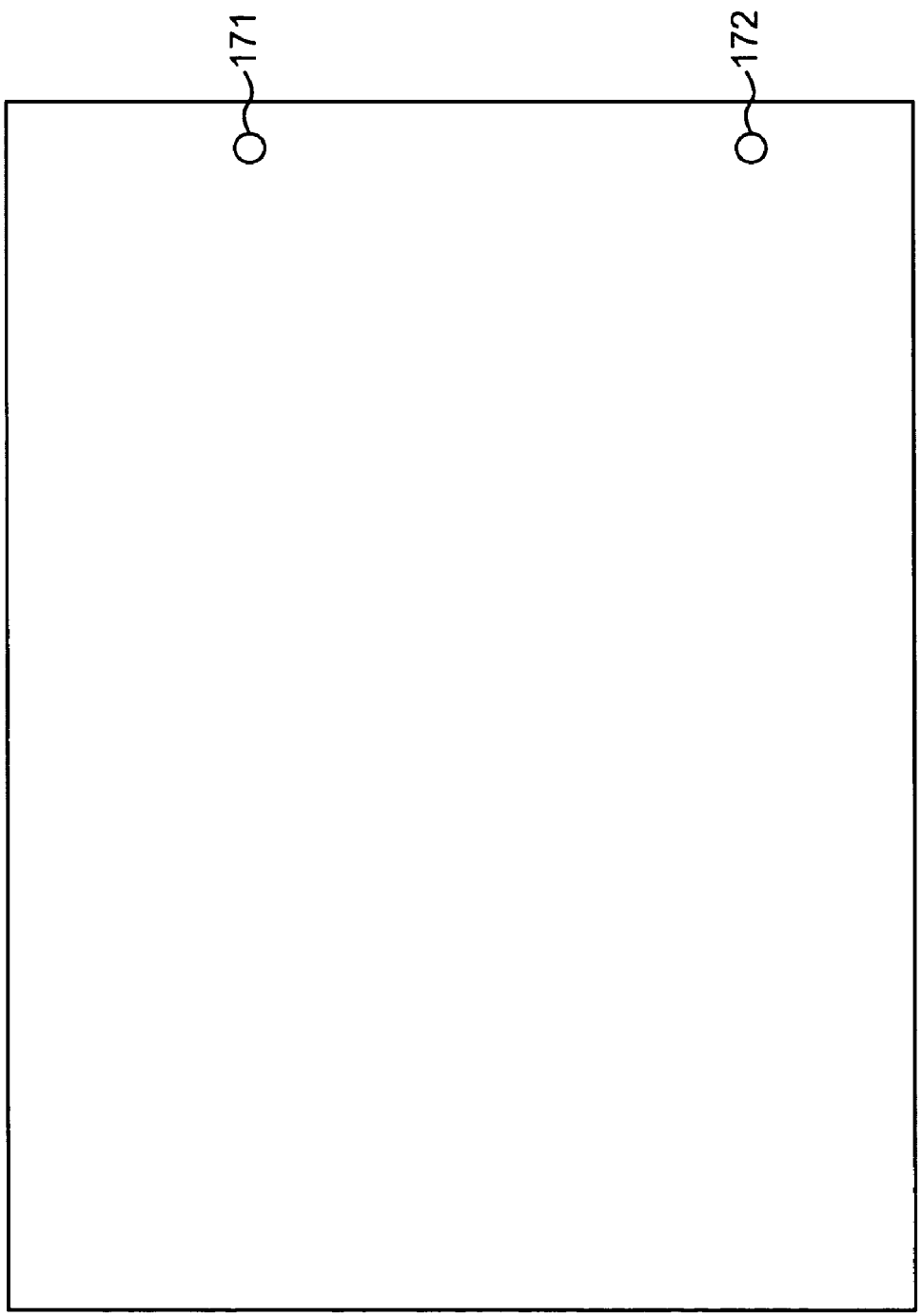

One embodiment of a retention tank which may be used in the present invention is illustrated in FIG. 16. This embodiment uses floating switches 171 and 172, to control the level of water in the tank. Switch 171 indicates when a desired maximum level of water is reached, and controls the flow of water through the system accordingly. When the maximum level of water is reached, switch 171 will switch on and signal pump 129 to stop pumping water to the tank. Switch 172 indicates when a desired minimum level of water is reached. When the minimum level of water is reached, switch 172 will turn on and signal for pump 175 and/or pump 190 to stop pumping water from the tank.

From the retention tank, the water is pumped back to the flushing tank 100 using pump 175. Alternatively, if it is determined that further processing is required to achieve the desired water quality, some or all of the water can be circulated back for reprocessing in the FFS, bio-filtration tank, and/or denitration system 180. In an alternative embodiment, a system called the oxytower, which uses algae to add oxygen, raise the pH, and remove phosphates, sulfates and remaining nitrates from the water, is employed in the system of FIG. 1. The oxytower will be described in greater detail below. As shown in FIG. 1, pump 190 can pump water from retention tank 170 to the oxytower 210. Alternatively, water from bio-filter 160 may flow to an oxytower before flowing to tank 170. In either embodiment, the clean water from the oxytower may flow directly back to retention tank 170.

As shown in FIG. 1, the water from retention tank 170 is returned to tank 100. In one embodiment, the water flows through UV sterilizer 200 before returning to tank 100. The UV sterilizer kills pathogens, such as bacteria and viruses. Additionally, a filter may be added to the system such that the water flows through the filter before the UV sterilizer. The filter may be a mechanical filter, such as a screen.

In a preferred embodiment, anolyte is added to the water in the flushing tank 100 before it flows to the enclosure 110. The presence of anolyte in the flushing tank will help sterilize the water by killing microbes and algae. As the water flows into the enclosure 110, the anolyte will help sterilize the enclosure itself and reduce any odors being emitted. The addition of anolyte will also help prevent any viruses from being passed between pigs. Anolyte is safe to use in this water because of the high level of waste, as the anolyte will be neutralized when it comes in contact with the waste. The anolyte may be used in place of UV sterilizer 200.

In one embodiment, pumps 175 and 190 provide the desired flow through the system. Pump 175 provides the necessary flow rate to adequately supply the flushing tank. Preferably pump 175 supplies a flow rate of 1 to 2 times the flow rate provided by pump 129. Pump 190 provides the desired flow rate from the lagoon to the FFS, bio-filter, denitration system and/or oxytower. Preferably, pump 190 supplies a flow rate of 1 to 10 times the flow rate provided by pump 129.

Water from flushing tank 100 may periodically be released into the environment through overflow stream 102. To minimize the number of contaminants released into the environment, water released from the flushing tank should have a nitrate concentration of 100 ppm or less. In one embodiment, a denitration system 223 is used to remove nitrates from the overflow stream 102, before the water is released into the environment. This nitrate removal system is used either in addition to, or in place of, the nitrate removal system 180. Denitration system 223 may be the same as, or different from, the denitration system 180, described previously. Denitration system 223 may be a Nitrafix system, as described above, or any other denitration system known in the art.

FIG. 1 illustrates one example of how denitration system 223 is employed. In this embodiment, water from flushing tank 102 is flowed to a holding tank 220. A pump 221 circulates water in holding tank 220 through a filter 222 and denitration system 223, thus reducing nitrate levels in the water before it is introduced into the environment. In one embodiment, water flows from tank 220 to tank 224, where the water is treated with anolyte, as shown in FIG. 24. Sufficient anolyte may be added in this step to disinfect the water to a desired degree, before the water is released into the environment.

Although the treated water in the system of FIG. 1 may be used repeatedly to clean the retainer 111, water may still need to be added to the system to replace water which evaporates or is removed with the waste material during processing. In one embodiment, the animal's drinking water, which is excreted in their feces and urine, is added to the water already used in the process, and may be all that is needed to replace the lost water from the system. If it is not enough, then additional water may be added to, for example, the flushing tank.

The systems of FIG. 1 may be controlled by any means known in the art, such as by using a microprocessor or electrical panel to allow remote and/or automatic control of the systems. Alarms may be used to indicate if an unsafe water level in tanks 100, 120, or 170 have been reached in order to prevent overflowing.

The FFS discussed above in the description of FIG. 1 will now be described in greater detail with respect to specific embodiments illustrated in FIGS. 2a to 2j. The FFS comprises a tank 201 for holding the waste water being processed. An oxygen-containing gas is introduced in tank 201, which forms bubbles that collect lighter waste from the water and rise to the surface. Heavier waste in the water settles to the bottom of the chamber. The waste water inside tank 201 preferably flows in a circular motion, to help increase the efficiency with which the waste is separated from the water, for reasons which will be discussed further below.

Tank 201 may potentially have any shape, but preferably has a shape which will enhance a circular motion of water within the FFS. In one embodiment a cylinder, having a conically shaped bottom, as shown in FIG. 2a, may be used. The conically shaped bottom will aid in the collection of waste matter which settles to the bottom of the tank during processing. In one embodiment, the cone shaped bottom may have an incline of 45 degrees or more from horizontal. In a preferred embodiment, the cone shaped bottom has an incline of 60 degrees. In another embodiment, the bottom of tank 201 is flat. Tank 201 may also have other shapes, such as, for example, a polygon shaped tank having 6 or 8 sides or more.

A drain pipe 205 with a valve 206 is placed in the bottom of the tank for removal of the waste matter. In another embodiment, illustrated in FIG. 2k, a two valve drain system may be used to collect solid matter settling to the bottom of the FFS tank, while minimizing water loss from the tank. An upper valve 206a positioned in the drain pipe remains open during normal functioning of the FFS, while a lower valve 206b, remains closed. The space between the valves serves to hold solid settled material and may be an enclosure of various shapes, formed to hold a pre-selected amount of solid settled material before it is removed. A water tube 205b preferably provides a fluid connection between the portion of the drain pipe 205 located between valves 206a and 206b and the open air. When valve 206b is closed and valve 206a is opened, water and settling solids flow into the space below valve 206a and above 206b, and fluid fills water tube 205b to the height of the water in the FFS. After the solids build up in the drain pipe 205a, they may be removed by closing valve 206a and opening valve 206b, which allows the solid matter to drain without draining excess water from tank 101. The fluid in water tube 205b also flows down, assisting in the removal of solids in the space. All or a portion of pipe 205, such as section 205a in FIGS. 2a and 2k, may be clear, so as to allow visual inspection of the level of solid matter collected. Any type of clear pipe may be used, such as, for example, clear PVC. Another two valve drain system which may be used is described in connection with FIG. 22 below.

The size and dimensions of tank 201 may vary according to the amount of waste water to be processed, the limited space of the enclosure in which it may be kept, as well as other considerations. Tall tanks are preferable for increasing contact time of the bubbles with the water. For example, if the shape of tank 201 is a cylinder with a conical bottom, as illustrated in FIG. 2e, the height $H_t$ of the cylindrical part of the tank is preferably 1 to 5 times the diameter D, or greater. Larger $H_t$ to D ratios allow for increased contact time between the gas bubbles and liquid in the FFS for the same amount of power utilized. For example, in certain embodiments, the ratio of $H_t$ to D may be about 2, 3, or 4. Further, the cone portion of the tank of FIG. 2e should be deep enough to allow the heavier waste and sediment to settle to the bottom. The tank may be supported by a stand (not shown) or some other means.

Preferably, one or more jet mixers 204 are placed on the sides of the tank 201. The jet mixers are positioned so as to force the water to flow around the inside of the tank in a circular direction. In one embodiment, two jet mixers 204 are placed on opposite sides of the tank facing opposite directions, as shown in FIG. 2b. The jet mixers are positioned at an angle $\theta_1$, as shown in FIG. 2c, which is defined as the angle between the central longitudinal axis of the jet mixer 204 and a line which is perpendicular to the curved surface of the tank at the point where the central longitudinal axis of pipe 211 intersects the curved surface of the tank. Values for $\theta_1$ range from 0 to 90°, and more preferably from 30° to 60°. In the most preferable embodiment, $\theta_1$ is about 45°. The jet mixers are also positioned slightly upward at an angle $\phi_2$ from horizontal, as shown in FIG. 2d, as well, so that the water flows up as it circles around the inside of the tank. Values for $\phi_2$ range from 0 to 500, and more preferably from 100 to 20°. The jet mixers preferably are mixing eductors, and will be described in further detail below.

Referring to FIG. 2b, tubing 207 connecting the jet mixers to a gas supply is positioned through the sides of the tank 201, for allowing an oxygen-containing gas to be mixed with the water to be supplied to the jet mixers. If the gas is air, then the gas supply may be the open air outside the FFS tank. Referring to FIG. 2a, tubing 207 connects in an airtight manner to tubing 204c of the jet mixers, better illustrated in FIG. 3c, so that the gas flowing from the gas source towards the mixing eductor through tube 207 will flow through tube 204c and into the mixing channel. The diameter $D_i$ of tubing 207 may range from 1 to 10 times the diameter $D_e$ of tubing 204c. In one embodiment, $D_i$ ranges from 3 to 4 times $D_e$. For example, the diameter $D_e$ may range from ⅛ inch to 1 inch, while diameter $D_i$ has a diameter greater than 1 inch. The larger diameter $D_i$ of tubing 207 relative to the diameter $D_e$ of tubing 204c allows for an increased gas flow to the jet mixers and consequently an increased volume of gas bubbles introduced into the water in the FFS tank.

A pump 209 draws waste water from the tank through pipe 208 and circulates it back into the tank by forcing it through piping 211 to the jet mixers at a relatively high pressure. The pipe 208, jet mixers 204, and piping 211 may be placed higher or lower in the tank, as desired. In an alternative embodiment, jet mixers are placed at more than one height in the tank to form multiple levels of jet mixers. For example, the jet mixers may be placed in the lower and/or middle and/or upper portions of the tank. Accordingly, pipe 208 and pipe 211 are positioned to withdraw and circulate water back to various positions within the tank, such as the middle or upper portions of the tank. In another embodiment, water is pumped from a source outside the tank to the jet mixers.

As discussed above, catholyte may be added to the FFS. In one embodiment the catholyte is introduced into the FFS through jet mixers 204, as will be described in detail below.

Referring again to FIG. 2a, water enters FFS tank 201 through inlet 202, which may be located above the level of water in the tank so that flow into the tank will not be restricted by pressure. For example, inlet 202 may be positioned above the desired water level either in the side of tank 101, as illustrated in FIG. 2a, or in the top surface of tank 201, as illustrated in FIG. 2k. Water flows out of the tank through an outlet pipe 203, shown in FIG. 2b, which may preferably be positioned to optimize a circular flow within the tank. In one embodiment, outlet pipe 203 is positioned horizontally, from an opening in the lower half of the tank so that it extends a distance "L" from the side of the tank, as shown in FIG. 2e. The shorter the distance "L", the less the flow inside the tank will be interrupted by water flowing around the pipe. However, due to the coriolis effect, placing the outlet at or near the central longitudinal axis "A" will enhance the circular flow of motion in the tank, as the water drains down the outlet. The value for L ranges from 0, so that the outlet is positioned in the side of the tank wall, to any distance within the tank, but is more preferably a distance ranging from 0 to about ½ D, where "D" is the diameter of the tank, as shown in FIG. 2e. In one embodiment, L ranges from about 1 inch to about ⅓ D, or from about ⅛ D to about ¼ D.

Additionally, the opening of outlet 203 may be adjusted to face any direction within the tank. For, example, FIG. 2f shows an embodiment with the opening in outlet pipe 203 facing down, which helps prevent waste settling to the bottom from being sucked into the opening. In another embodiment, the opening in outlet pipe 203 may face up, which promotes a circular motion of the water, due to the coriolis effect. In yet other embodiments, the opening in the outlet may be angled slightly downward or slightly upward.

The inlet and outlet pipes may be located in other positions in the tank besides those illustrated. For example, the inlet 202 may be located below the surface level of the water, such as in the lower or middle portions of the tank. Outlet 203 may be located anywhere in the bottom half of the tank, including in the conical bottom portion of the tank. Preferably the outlet is located as low as possible in the tank, but not so low as to remove sediment collecting in the bottom of the tank.

In one embodiment, the outlet pipe is adjustable in order to control the water level inside the tank. Referring to FIG. 2f, the portion of the outlet pipe 203 outside of the chamber extends upward from the tank to an elevation H1, which will determine the water level inside the tank. An expansion coupling 203b is used to connect a lower section of the outlet pipe 203a with an upper section 203c, so that the section 203c slides up and down inside the coupling 203b to reduce or increase the height H1. Similarly, the water level may also be controlled in the FIG. 2f embodiment by making pipe 203 adjustable on the inside of the tank.

Figure 2G:
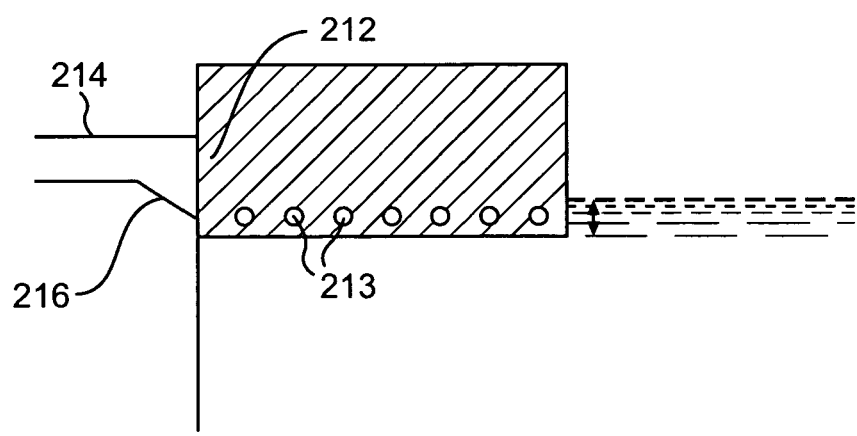

Referring now to FIG. 2g, a collector plate 212 is used to collect foam formed on the surface of the water during operation of tank 201. The collector plate is a flat or curved, rectangular shaped plate extending radially from the inside surface of the tank to the center portion of the tank, as shown in FIG. 2g. The exact positioning of collector plate 212 may be adjusted to optimize collection of foam from the surface of the water. As shown in FIG. 2h, a support arm 215 attached to the tank surface and the plate helps to hold the plate in position. Collector plate 212 is positioned inside the tank so that it extends vertically upward from the surface of the water, the lower edge of the plate being at, or just below, the surface of the water, as shown in FIG. 2g. In one embodiment, holes 213 are formed in the plate to allow water to pass through. A foam outlet 214 is located in the side of the tank just in front of the collector plate 212, as shown in FIG. 2g. In an alternative embodiment, the foam outlet pipe 214 is fitted with a ramped portion 216, which allows easier removal of the foam from the surface of the water. In operation, the foam is pushed by the rotation of the water up ramp 216 to the outlet 214.

Figure 2I:
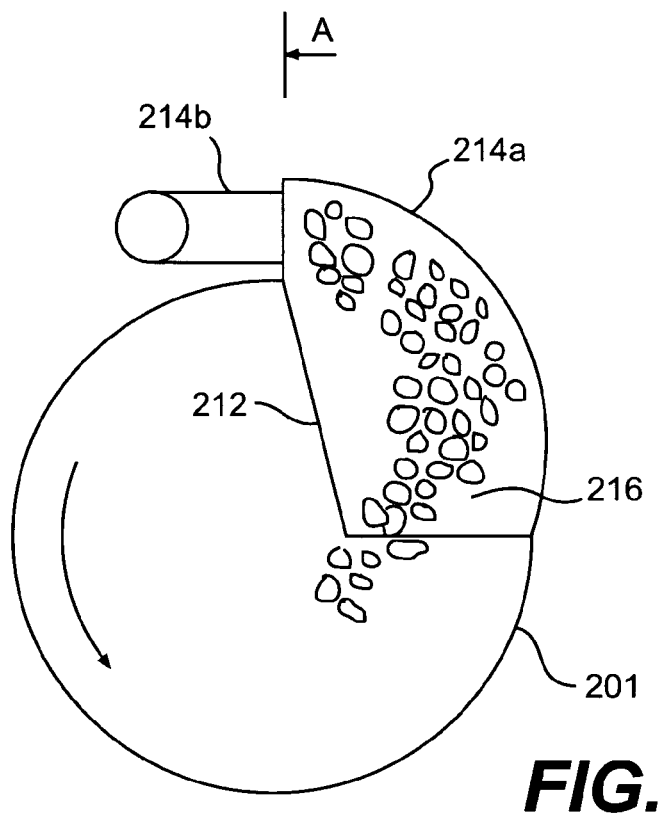
Figure 2J:
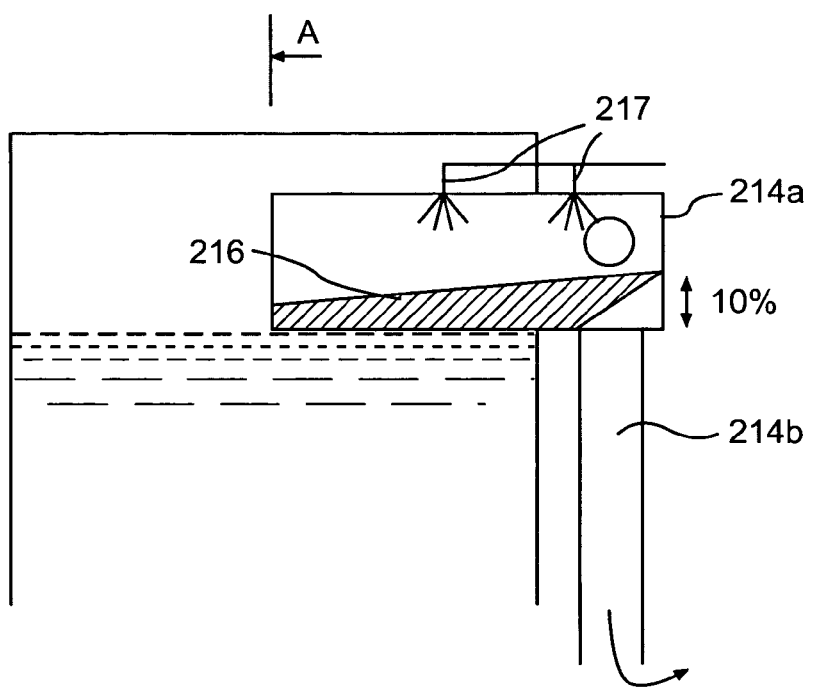
Figure 2K:
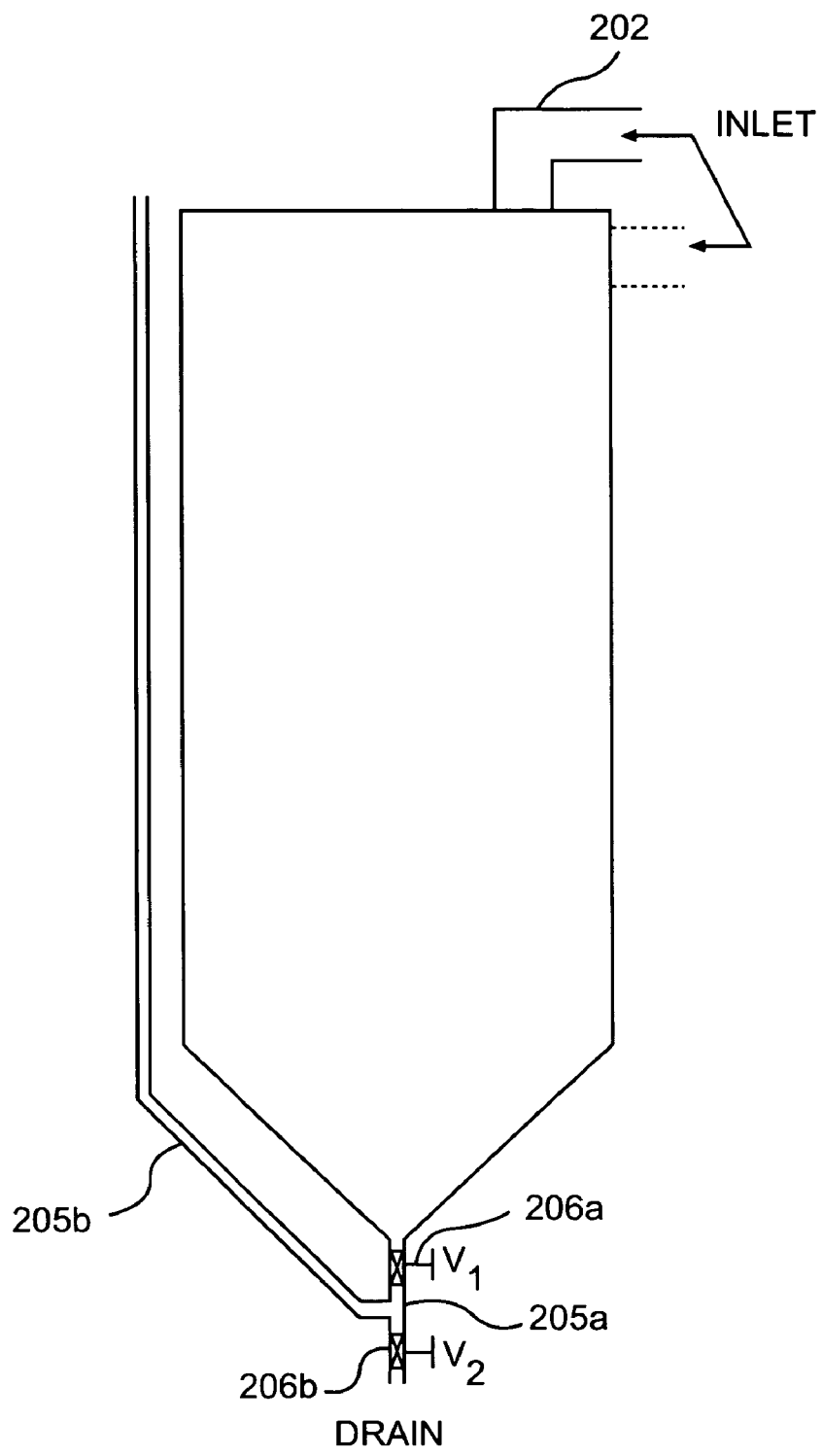
Figure 2L:
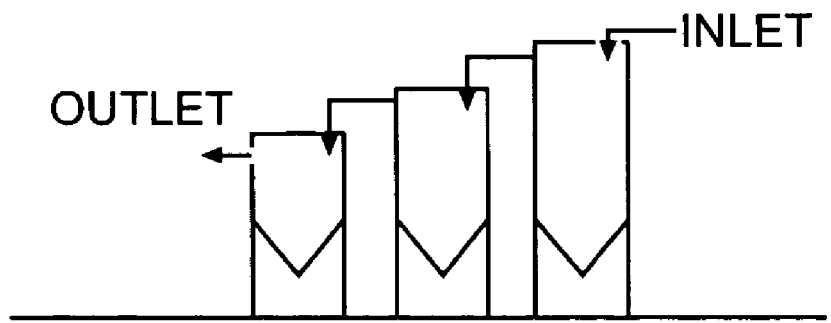
Figure 2M:
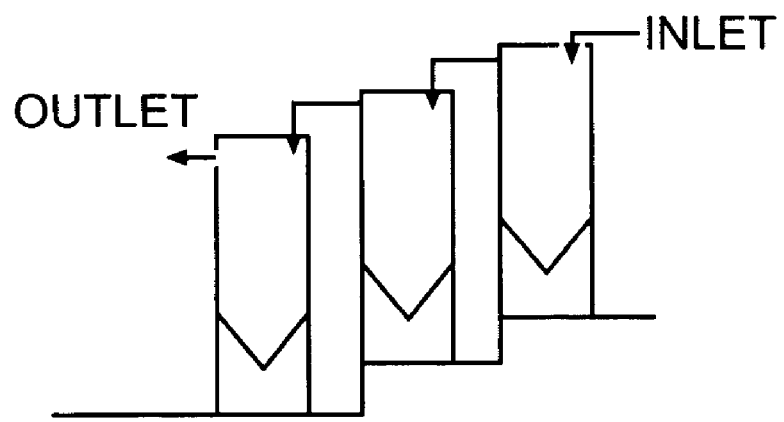

In a preferred embodiment, ramp 216 is positioned between the collector plate 212 and the inside surface of the tank, as illustrated in FIGS. 2i and 2j. The ramp skims the foam off the surface of the water and guides it up through the foam outlet pipe 214b. The ramp may have an incline leading from the surface of the water up to foam outlet 214b of, for example, 1 to 20 percent from horizontal, and more preferably from 1 to 10 percent from horizontal. As further illustrated in FIGS. 2i and 2j, the ramp may include an extended portion 214a that extends out beyond the vertical walls of tank 201 in a manner which allows the outlet pipe 214b to be aligned with the direction of the flow of foam. The alignment of the outlet pipe 214b with the direction of the flow of foam allows for improved flow of the foam out of tank 201.

Additionally, outlet pipe 214b should have a diameter which is large enough to allow the foam to flow relatively easily there through. In one embodiment, the diameter of outlet pipe 214b may be 6 to 8 inches or more.

If desired, a high pressure jet system can be installed in the tank to automatically clean the top inside of the FFS. For example, water jets 217 may be positioned to clean the surface of the ramp 216 and the foam outlet pipe 214. The water jets may be on a timer in order to provide automatic cleaning of the FFS.

The water, which is shown flowing in a counter-clockwise direction in FIG. 2h, may flow through holes 213 in collector plate 212, as shown in FIG. 2g, so that the circular flow of water at the surface is not entirely interrupted. However, the holes 213 are preferably small enough to substantially prevent the foam on the surface of the water from passing through, so that the foam is collected against the surface of the plate and forced out of the tank through foam outlet 214.

In operation, an oxygen-containing gas is introduced into FFS tank 201 through tube 207 and mixes with water in the jet mixers 204 to form tiny bubbles. Examples of oxygen-containing gases which may be used include air, oxygen gas ($O_2$) and ozone ($O_3$). Preferably, ozone is used for oxidizing organic matter and killing bacteria, viruses, and other organisms in the water. Ozone may be supplied by, for example, an ozone generator, and a monitoring system may be used to control the amount of ozone generated by the ozone generator. Such ozone generators and monitoring systems are well known in the art.

Jet mixers 204 force the water and bubble mixture to circulate in a relatively fast circular motion around the inside of the tank. As the bubbles rise up through the water, they trap relatively light contaminants such as dissolved organic compounds (DOC), grease, phenol, particulates, protein, and other waste in the water. The bubbles containing the contaminants form a foam on the surface of the water. The foam is collected by a foam collector plate 212 and removed from the tank, as discussed above.

It is theorized that the circular motion of the water in the tank increases the amount of time it takes for the bubbles to rise to the surface. This increased contact time with the water allows bubbles to trap contaminants, thus increasing the efficiency of the FFS. Additionally, if the water is forced to circulate fast enough around the inside of the tank, the water may form a vortex. The vortex will have a siphoning effect which will suck heavier waste matter, including heavy particulates and larger pieces of sediment and solid waste, towards the center of the vortex and down toward the bottom of the tank where it can be collected and periodically flushed though valve 206. Due to the coriolis effect, the mixing jets are preferably positioned so that the water circulation is clockwise in the Northern hemisphere, and counter clockwise in the Southern hemisphere, in order to obtain a vortex in the chamber.

In one embodiment, the tank 201 is covered to prevent odors from escaping. Additionally, the foam collected from the tank flows through the outlet pipe to a collector tank fitted with an air vent (not shown). In one embodiment, the air vent contains activated carbon to eliminate odors contained in the gas released from the foam. In a preferred embodiment, the foam collected in the collector tank may be mixed with anolyte to eliminate odors.

The components of the FFS, such as the tank, mixing jets, and piping, may be made from any material known in the art for similar applications. For example, various types of plastic or metal may be used. Specific examples of such materials include PVC, polyethylene, polypropylene, methacrylic or acrylic plastic, fiber glass reinforced plastic (FRP), or stainless steel.

The FFS can be used to process fresh, salt, or brackish water with a heavy load of organic matter. Use with other types of liquids is also contemplated. Applications of the present invention, and the various components of the present invention, for all types of waste water treatment, including water from animal farms, fish farms or other aquaculture applications, and human waste treatment (sewage) are contemplated. Other applications, such as drinking water treatment, are also contemplated.

The jet mixers 204 used in the FFS will now be described in greater detail. One preferred embodiment of a jet mixer is shown in FIG. 3a. This particular jet mixer is known as a mixing eductor. Mixing eductor 204 allows for a relatively large amount of gas to be mixed into a liquid using a relatively small amount of power. The mixing channel 204b comprises a flared inlet region 204f and a flared outlet region 204g, which are connected by a generally cylindrical shaped neck region 204e.

Figure 3B:
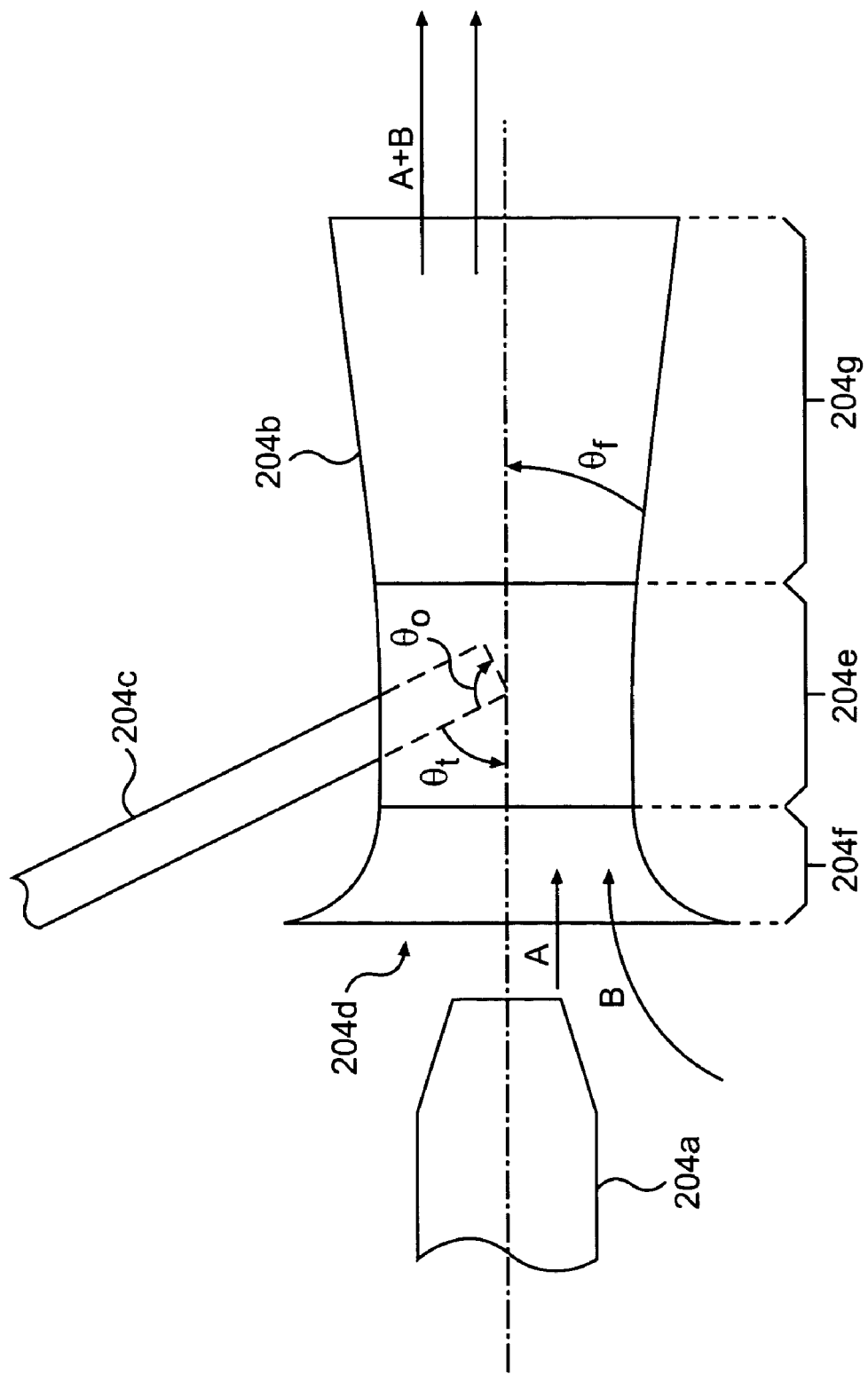
Figure 3C:
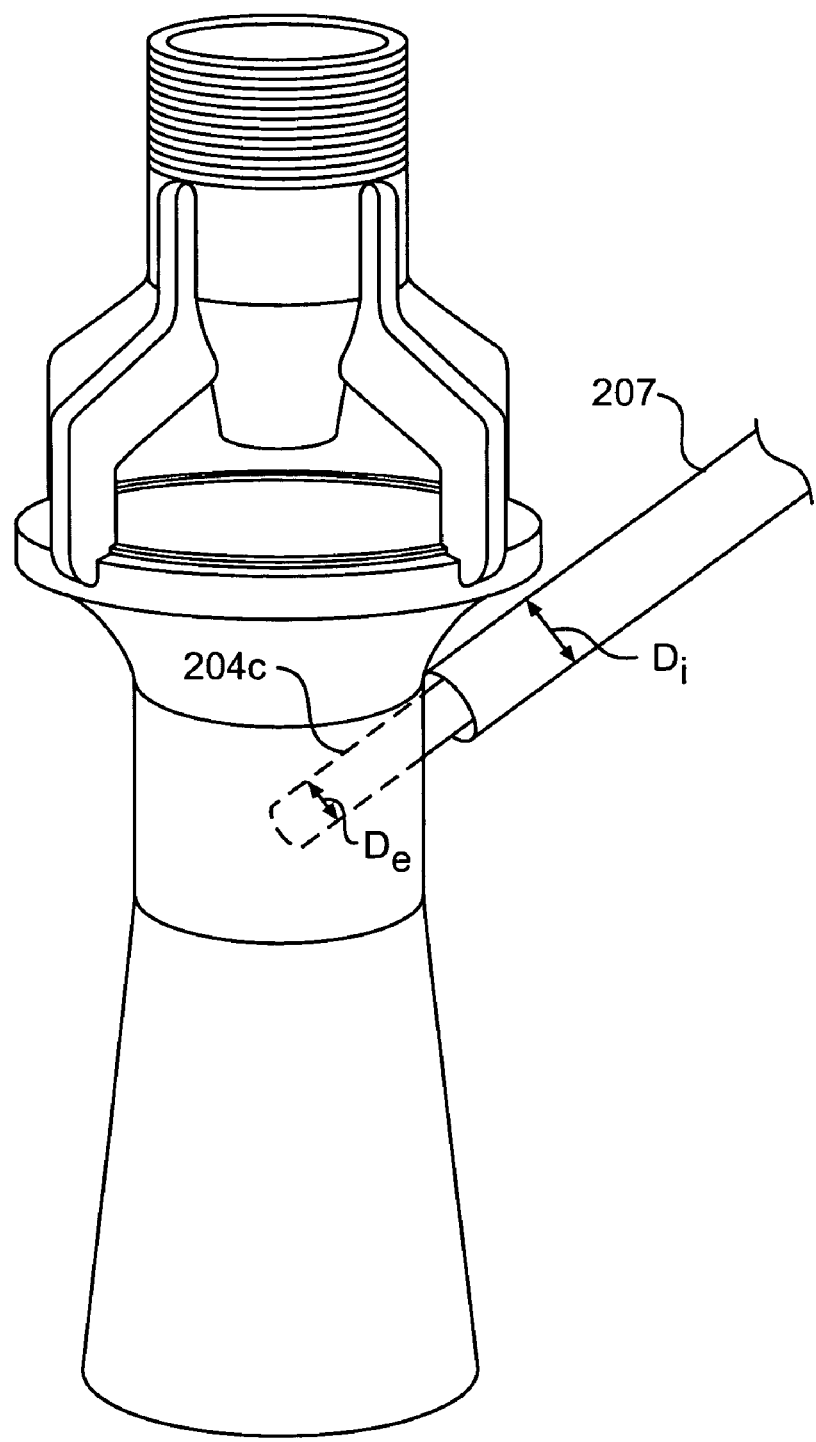

The inlet channel 204a of the eductor, which may be, for example, a nozzle, is located near the flared inlet of the mixing channel 204b, so that a central longitudinal axis of the inlet channel 204a is aligned along the central longitudinal axis of the mixing channel 204b, in a manner which allows water from the FFS tank to be entrained through the opening 204d between the outside of the inlet channel and the inside of the flared inlet region of the mixing channel. To be efficient, the stream of water from inlet 204a preferably entrains a relatively large amount of water from the FFS tank as it flows into mixing channel 204b, so that the flow of water through the channel 204b is significantly greater than the flow from inlet channel 204a. In one embodiment, as illustrated in FIG. 3b, the flow rate "B" of water entrained is 3 to 6 times greater, and is preferably 4 times greater, than the flow rate "A" from inlet channel 204a. The flow rate of water exiting the eductor is thus "A"+"B." In this manner, the use of the eductor in the FFS allows for a relatively large volume of water to be mixed with gas utilizing a relatively small amount of power.

Additionally, the use of the eductor will increase the contact time between the gas bubbles and the liquid by providing improved mixing of the bubbles with the water, which may improve the efficiency of the FFS.

As shown in FIG. 3b, the tubing 204c is positioned in the flow of water through channel 204b at an angle $\theta_t$ from the central longitudinal axis of channel 204b. Adjusting the angle $\theta_t$ has been found to provide for improved entrainment and mixing of the gas with the water. While the angle $\theta_t$ may range, for example, from 0 to 90°, $\theta_t$ preferably ranges from 30 to 60°, and is more preferably about 45°. The angle of the tube opening $\theta_o$, as illustrated in FIG. 3b, may also be adjusted to provide for improved entrainment. For example, the angle $\theta_o$ is preferably adjusted from 90° to 135°. The tubing extends into the flow path of the mixing chamber so that the outlet of tubing 204c is preferably located at or near the central longitudinal axis of the mixing channel 204b. The diameter of the tubing is adjustable to allow more or less gas into the mixing channel, without undesirably interfering with the flow through the channel. Preferably the tubing has a diameter ranging from ⅛ inch to 1 inch. The water flowing past the tubing 204c creates a suction, thus causing the gas in tubing 204c to be sucked from the tubing and into the mixing channel 204b.

The mixing eductor, including the nozzle, mixing chamber, and tubing may be made of various materials, such as plastic or metal. Specific examples of such materials include PVC, polyethylene, polypropylene, methacrylic or acrylic plastic, fiber glass reinforced plastic (FRP), or stainless steel. Any other materials, known in the art for making eductors, may also be used. The mixing eductor is contemplated for use in other applications. For example, rather than a gas, a liquid may be flowed through tubing 204c, so that multiple liquids may be mixed together. In alternative embodiments, more than one tube 204c is positioned in the mixing channel, resulting in mixing eductors having two, three, four or more tubes positioned in the mixing channel in a manner similar to tube 204c.

Figure 3D:
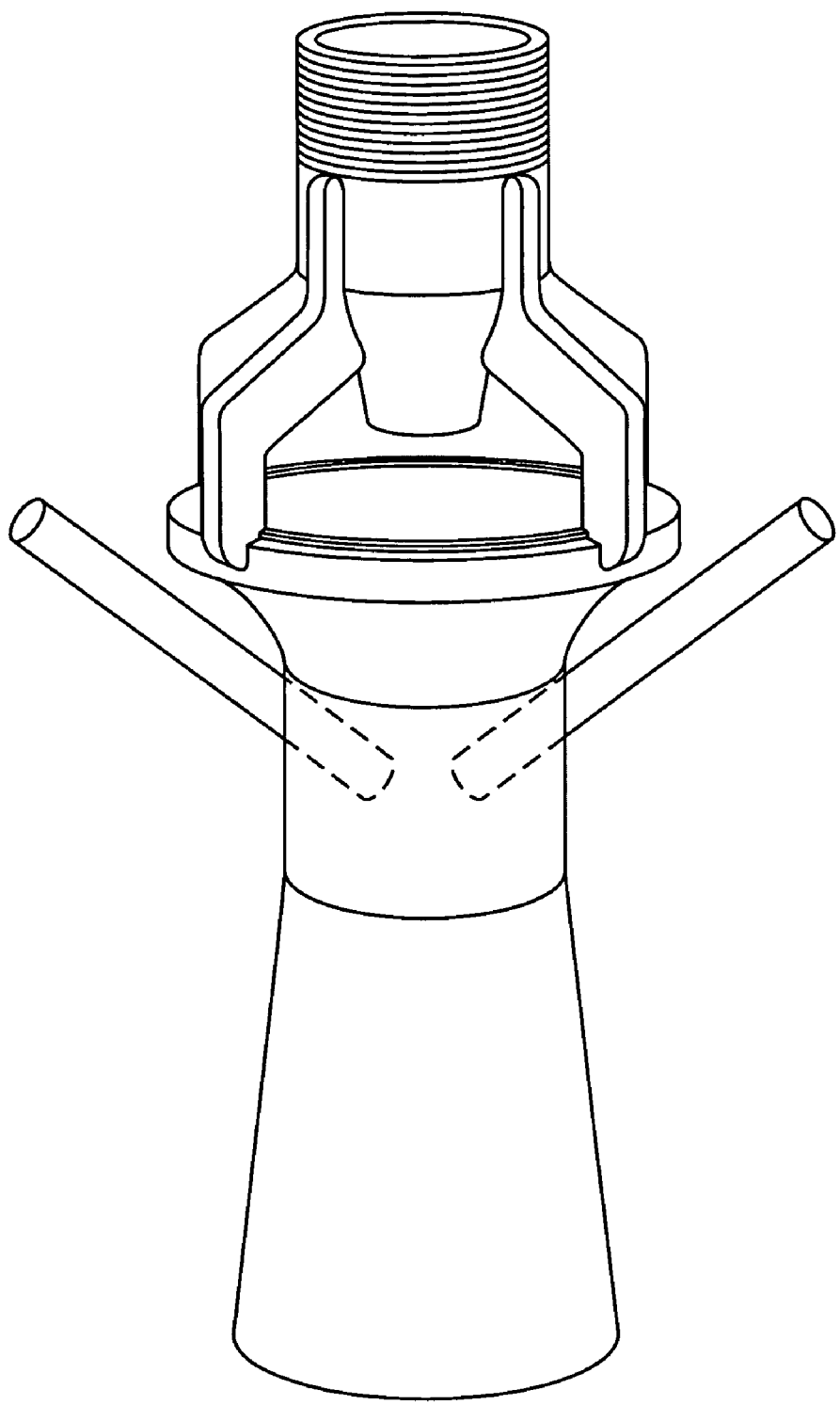

For example, as discussed above, catholyte, in addition to an oxygen-containing gas, may be added to the FFS or bio-filter through jet mixers 204 by utilizing one or more mixing eductors having two tubes positioned in the mixing channel. The gas is then introduced through one of the tubes and catholyte is introduced through the other. An example of an eductor with two tubes positioned in the mixing channel is illustrated in FIG. 3d. The eductor shown in FIG. 3d is used, for example, when catholyte is added to the bio-filter or the FFS in an amount greater than about 10 percent of the volume of the water in the tank, such that the large amount of catholyte is added through a separate tube positioned in the mixing channel of the eductor.

In yet another embodiment, catholyte may be added to the FFS or bio-filter by introducing it through the inlet channel 204a. This could be accomplished by introducing the catholyte through inlets (not shown) in pipes 211 or 208 to the water being recirculated to the jet mixers from tank 201.

In an alternative embodiment, when the amount of catholyte to be added ranges from about 1 to about 10 percent of the total volume of water in the bio-filter or FFS, the catholyte can be added through the same inlet tube used to introduce the oxygen-containing gas to the eductor. The catholyte is dripped into the tube, and will be drawn into the mixing channel by gravity and by suction from the flow of water entrained through the mixing channel. This tube will therefore direct both the oxygen-containing gas and the catholyte into the mixing channel.

The mixing eductors of the present invention may be described in further detail in co-pending application Ser. No. 10/673,634, filed on Sep. 30, 2003, and entitled AUTOTRO- FIC SULFUR DENITRATION CHAMBER AND CALCIUM REACTOR, and Continuation-In-Part Application, filed on Sep. 30, 2004, and entitled AUTOTROFIC SULFUR DENITRATION CHAMBER AND CALCIUM REACTOR, both of which descriptions are herein incorporated by reference.

Figure 4A:
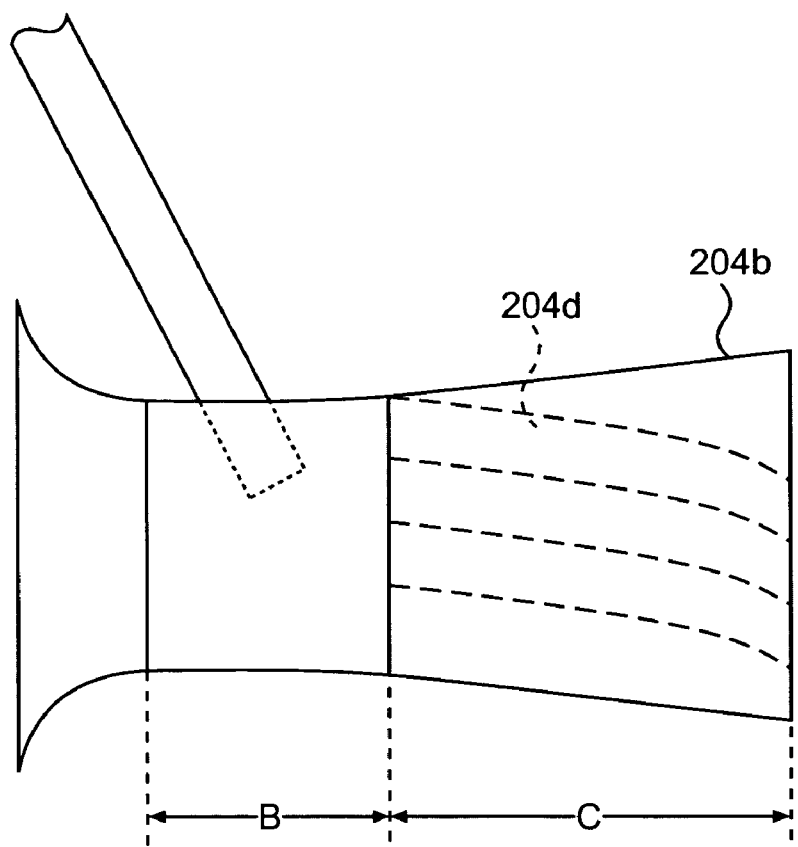
FIGS. 4a-4b are diagrammatic representations of a mixing eductor, according to an embodiment of the present invention.
Figure 4B:
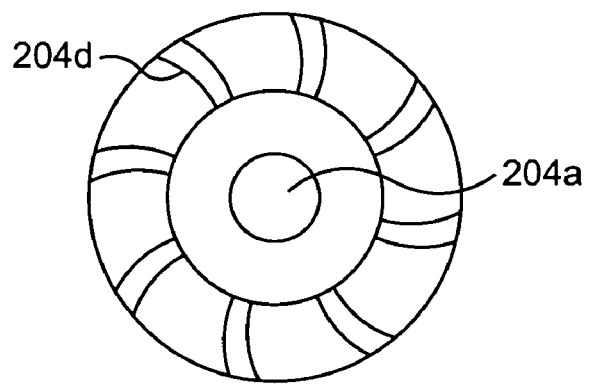

In yet another embodiment, illustrated in FIGS. 4a and 4b, the outlet cone 204b of the eductor is modified by adding wings, or foils, 204d to the inner surface of the outlet cone. The foils rotate around the inside surface of the outlet cone in a manner which act to direct the motion of the water through the cone in a helical path, thus creating a vortex. Such a circular motion increases the contact time of the bubbles with the water, and thereby increase the efficiency of removal of organic matter in the water. The dimensions of the foils may be modified to be any size or shape which will create the desired circular motion. In a preferred embodiment, the foils extend from about 1/16 to about 1 inch from the inner surface of the cone for the entire length, or only a portion of the length, of the outlet cone 204d, and have a width of from about 1/32 to about 1/8 inches.

Other air jets may also be used as the jet mixers 204 in the FFS, instead of the mixing eductor described above. For example, a system known in the art as the Venturi system may be used.

EXAMPLE

Amount of Gas Introduced into Liquid in an FFS

In an FFS employing two mixing eductor air jets, each eductor has a neck region sized to connect with a 1 inch diameter pipe which provides the flow of water through inlet 204a. The jets are powered by a 2 HP centrifuge pool pump, which provides 25 PSI of pressure and results in a flow rate of 33 GPM through each jet and 4 to 7 SCFM of gas introduced into the FFS for each jet.

A more detailed description of the denitration system 180, discussed above in the description of FIG. 1, will now be provided. The various embodiments of the denitration systems which will now be described are known as Nitrafix systems. Additional description of the Nitrafix systems developed by the inventor of the present invention can be found in co-pending application Ser. No. 10/673,634, filed Sep. 30, 2003, and entitled AUTOTROFIC SULFUR DENITRATION CHAMBER AND CALCIUM REACTOR, and co-pending Continuation-In-Part Application, filed on Sep. 30, 2004, and entitled AUTOTROFIC SULFUR DENITRATION CHAMBER AND CALCIUM REACTOR, both of which descriptions are herein incorporated by reference.

Referring to FIG. 5, the process of denitration may comprise an optional filtration step 1, in which the water to be treated passes through a filter, followed by an optional aerobic bacteria processing step 2, and an anaerobic bacteria processing step 3. In one embodiment, a calcium reactor may also optionally be added to the system for maintaining pH and adding calcium in step 4.

Step 1 of the process is an optional filtering step by which particulates or other solid matter are removed from the water to be treated. Removing solid matter from the water helps to prevent clogging of the Nitrafix system. This filtration may be accomplished by using a mechanical filter, such as a screen, or a cartridge filter. Other filters known in the art may also be used. In order to prevent clogging of the Nitrafix system, it is preferred that the filter remove particulates which are 50 microns or larger.

Optional step 2 of the process, shown in FIG. 5, uses aerobic bacteria processing to treat the water. The water to be treated flows through a chamber which contains a support media that preferably has a large surface area on which the aerobic bacteria may colonize. Examples of such media include sand, plastic particles, and similar media. The aerobic bacteria exist and thrive in the water and will colonize on the media within the chamber as the system is operated. The type of aerobic bacteria utilized in step 2 include, for example, *nitrosomonas* and *nitrobacter* bacteria. These naturally occurring bacteria break down ammonia and nitrites in the water and form nitrates. In the process of breaking down the ammonia and nitrites, the aerobic bacteria produce $CO_2$ and reduce the levels of dissolved oxygen in the water. Preferably, the chamber housing the aerobic bacteria, as well as the media in the chamber, are sized so that most, if not all, dissolved oxygen in the water is removed, as the water flows through the chamber. While this chamber preferably breaks down ammonia and nitrites, the chamber could also be designed to use other chemical or mechanical agents that take all or most of the dissolved oxygen out of the water, before it flows to the anaerobic denitration chamber, and still be effective in reducing nitrates from the water.

In one embodiment, sufficient catholyte is introduced into the water of the aerobic chamber to add to the health of the aerobic bacteria. The catholyte may be added by any method known in the art, such as by dripping, spraying, flowing or use of a jet. The catholyte may be added either directly to the water in the chamber or alternatively, may be added to the water upstream of the chamber so that it flows into the chamber through the water inlet.

Figure 17:
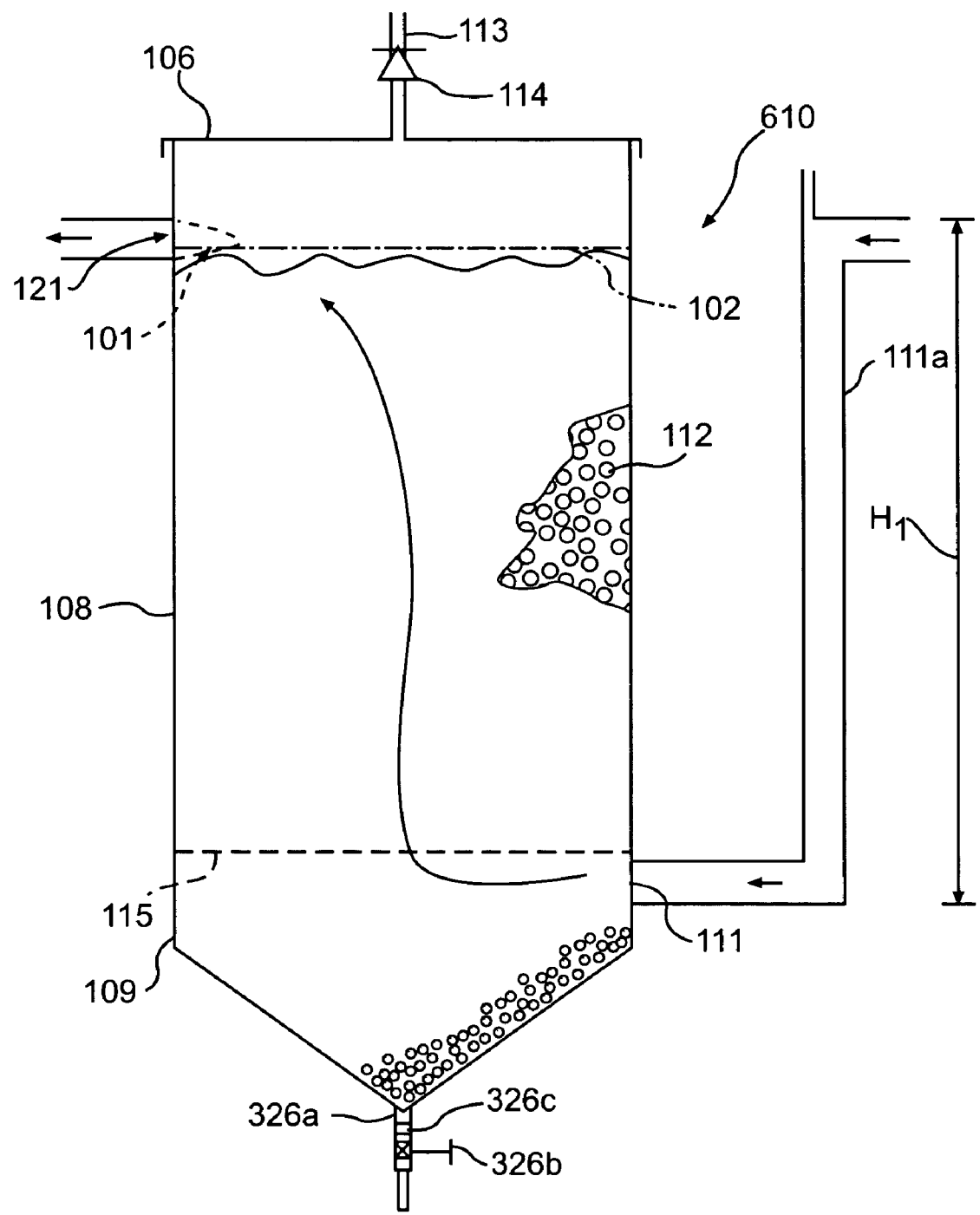
FIG. 17 is a diagrammatic representation of an aerobic chamber capable of being used in the denitration process, according to an embodiment of the present invention.

One embodiment of a novel aerobic chamber compatible with the system of FIG. 5 will now be described with reference to FIG. 17. Chamber 610 comprises a tank 108. The lower portion of tank 108 preferably has a tapered shape to collect sediment which settles to the bottom, although it may have a flat bottom. A drain 326a and valve 326b are preferably included in the bottom of 610, to allow sediment to be periodically removed. If desired, a clear section of pipe 326c may be employed to allow visual inspection of the drain so that sediment buildup may be monitored. A lid 106 is used to cover the tank 108. Chamber 610 should be relatively air tight, so that the level of oxygen in the water may effectively be reduced by the aerobic bacteria. A vent 113 having a check valve 114 allows gases to escape from the chamber, but will preferably not allow substantial amounts of outside air into the chamber.

The chamber has an inlet 111 and an outlet 121 through which water can enter and exit the chamber. A screen 101 may be placed over the outlet and inlet to avoid clogging and contain the media within the chamber. The height H1 of the inlet pipe 111a will control the level of water in chamber 610.

Section 108 of chamber 610 is filled, either partially or completely, with support media 112, which acts as a substrate for the aerobic bacteria. The aerobic bacteria already exist in the water and will readily colonize on the media. The media 112 may be any type of media that can support colonization of aerobic bacteria. While a media having any practical size and shape may be used, media having a high surface area is preferred, including sand, crushed coral and other media having relatively high surface areas.

One preferred form of support media is plastic, which may be in the form of small spheres or tubes, although any shape known in the art may be used. The plastic media is lightweight and may float in the water. It does not clog easily, and provides a large surface area for bacterial colonization. One example of such a plastic media is known as biofilm. One particular type of biofilm is manufactured by Water Management Technologies, Inc. under the name of Kaldnes or Bee-Cell. Other media like Bio-Chem stars from RENA may also be used. If media 112 does not float, a perforated plate or screen 115 may be employed to hold the media above the cone shaped bottom, to allow a space for sediment to settle in the tank.

It is preferable that the process of step 2 substantially reduce the dissolved oxygen content of the water leaving the aerobic bacteria processing chamber, as compared with the level of dissolved oxygen in the water entering the chamber, in an amount sufficient to significantly increase the nitrate reduction in chamber 2 over what it would have been if the step 2 process had not been employed. Thus, it is preferable that the total dissolved oxygen content be reduced to less than 5 ppm, and more preferably, to less than 2 ppm, and still more preferably to about 1.64 ppm or less.

Following the aerobic process of step 2, an anaerobic processing step 3 is next employed to autotrofically reduce the concentrations of nitrates in the water by a process known as sulfur denitration. In the preferred embodiment, sulfur denitration utilizes sulfur oxidizing bacteria such as *Thiobacillus denitrificans*. Under aerobic conditions, these bacteria will use oxygen to oxidize sulfur. However, when insufficient oxygen is present, the bacteria use nitrate to oxidize sulfur to sulfate. Thus, the reduction of oxygen in step 2 permits nitrates existing in the water to be efficiently utilized by the bacteria in an anaerobic type process. In this manner, the concentration of nitrates in the water is reduced in the step 3 process.

In addition to reducing nitrates, the bacteria in the denitration chamber may also reduce other undesirable nitrogen compounds, such as nitrites. The denitration process also decreases the pH of the water. It should also be noted that for the first few days of operation from startup, the denitration chamber may produce nitrite. However, the amount of nitrite produced will thereafter decrease and the chamber will preferably begin to help reduce nitrite levels.

The aerobic process of step 2 helps to insure that the oxygen concentration is sufficiently decreased, while the nitrate concentration is sufficiently increased, in order to maintain an efficient anaerobic sulfur denitration process. Consequently, less support media for the anaerobic bacteria is needed to remove the desired amount of nitrates than if the aerobic process was not used. This allows for a smaller, and significantly lighter weight, denitration chamber for the step 3 process, since the sulfur media used in the chamber can be relatively heavy. Additionally, the reduction in the level of dissolved oxygen in the chamber helps prevent the proliferation of certain undesirable sulfate reducing bacteria, such as *Beggiatoa Alba*. *Beggiatoa Alba* are known to be filamentous, creating a thick, slimy coating on the sulfur media, which could cause the chamber containing the sulfur media to clog.

The aerobic bacteria process of step 2 should preferably occur in line with, and in close proximity to, the denitration step 3, so as to prevent reoxygenation of the water before it enters the denitration chamber.

The applicant believes that it is also possible that carbon dioxide produced by the aerobic bacteria in step 2 allows the bacteria in the denitration chamber to remove nitrates more efficiently. However, it is not intended that the above described mechanisms of the bacteria processes limit the full scope of the invention as defined by the claims.

The denitration step 3 utilizes a media that supports the anaerobic bacteria that break down nitrates in the water. Preferably the media will support the anaerobic bacteria even when there are low concentrations of nitrates in the water. In a preferred embodiment, the media is sulfur and the bacteria is *Thiobacilus denitrificans*. As discussed above, under the proper conditions where oxygen levels are low enough, for example, when the dissolved oxygen content of the water entering the denitration chamber is preferably between 0 to 2 ppm, these bacteria carry out anaerobic respiration, reducing nitrates while oxidizing elemental and/or reduced sulfur to sulfate.

Other conditions, such as the temperature and the pH of the water should also be maintained at healthy levels for the bacteria. For example, if *Thiobacillus denitrificans* are employed, the water in the chamber should preferably have a temperature ranging from 25 to 30 degrees Celsius and a pH ranging from 6 to 8, although the bacteria may function outside of these ranges. In addition, in a preferred embodiment, sufficient catholyte is added to the system, most preferably directly to the denitration chamber, so that the catholyte adds to the health of the anaerobic bacteria. The catholyte may be added by any method known in the art, such as by dripping, spraying, flowing, or use of a jet. While the catholyte is preferably added directly to the water in the denitration chamber, in an alternative embodiment it is added to the water upstream of the chamber so that it flows into the chamber through the water inlet.

Other bacteria which reduce nitrate while oxidizing sulfur may also be used in place of or in addition to *Thiobacilus denitrificans*. Examples of such bacteria which may be acceptable for use in the present invention include *Thiobacillus versutus, Thiobacillus thyasiris, Thiosphaera pantotropha, Paracoccus denitrificans*, and *Thiomicrospira denitrificans*. The scope of the invention includes the application of any anaerobic bacteria that can survive in a media within a chamber and efficiently and effectively perform the denitration process of the present invention on a flow of water having nitrates that must be removed.

The structure enclosing or creating the denitration chamber is preferably opaque so that little or no light enters the chamber. This is because the anaerobic bacteria do not like light. If placed in a lighted environment, the bacteria will move toward the center of the chamber where the environment is darker. This would thereby decrease the efficiency of the bacteria in eliminating or reducing nitrates from the water.

The system 180 may include one or more anaerobic chambers. In one embodiment, a plurality of anaerobic denitration chambers are placed in parallel flow with each other. Alternatively, the chambers may be placed in series, where water flows from one denitration chamber to the next. In either of these embodiments, the chambers might, for example, be cylindrical, having diameters ranging from about 6 inches to about 10 feet and heights ranging from about 8 to about 20 feet. In an alternative embodiment, the chambers are sized so that they can be readily positioned in any desired enclosure or location.

Preferably the denitration chambers either include a degassing material, or provide an outlet for allowing exhaust gases produced during the denitration process to flow to a separate chamber containing degassing material, in order to eliminate the odor from noxious gases, such as hydrogen sulfide, which may be produced during the denitration process. The degassing material may be, for example, activated carbon.

Figure 6:
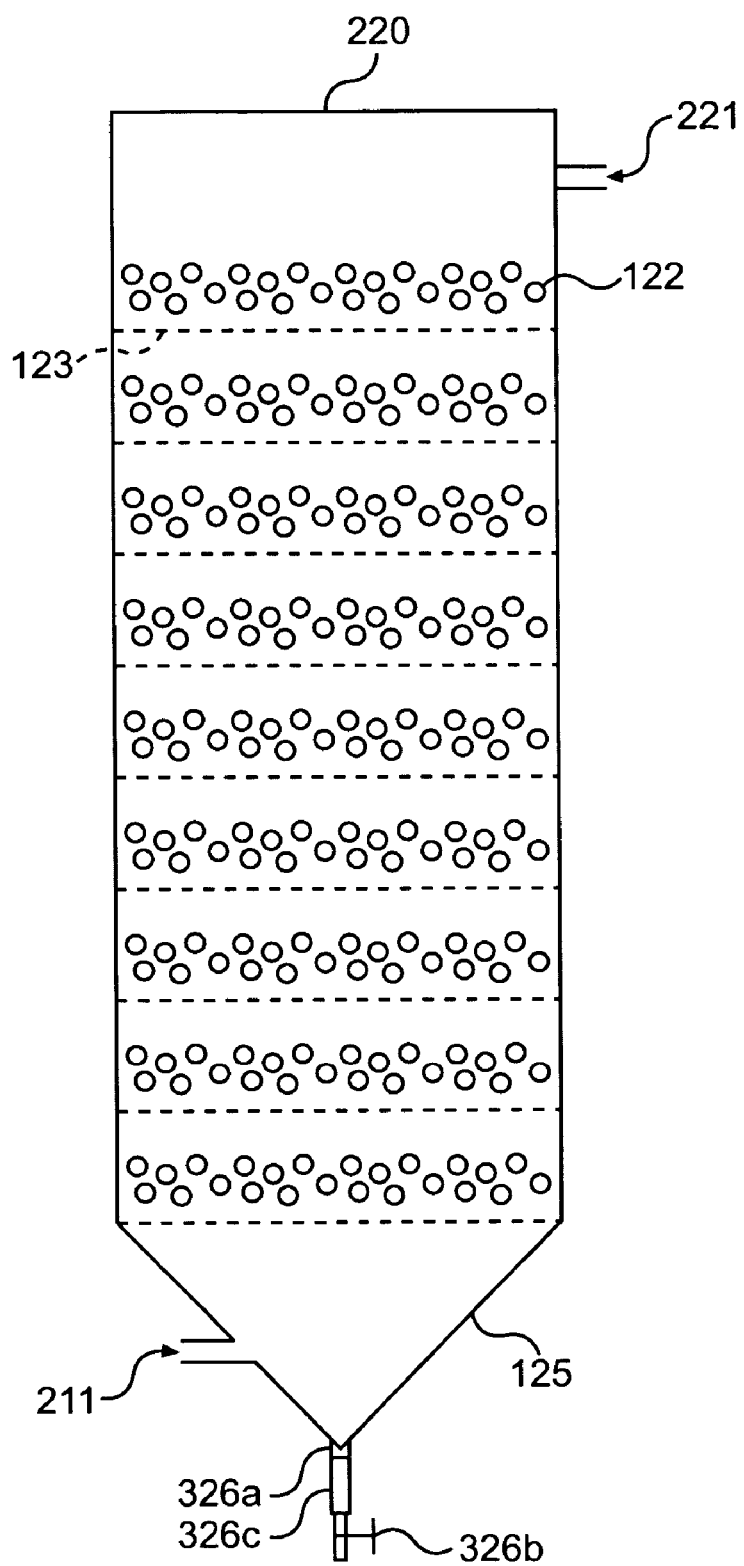
FIGS. 6-8 are diagrammatic representations of chambers used in the denitration process, according to certain embodiments of the present invention.
Figure 8:
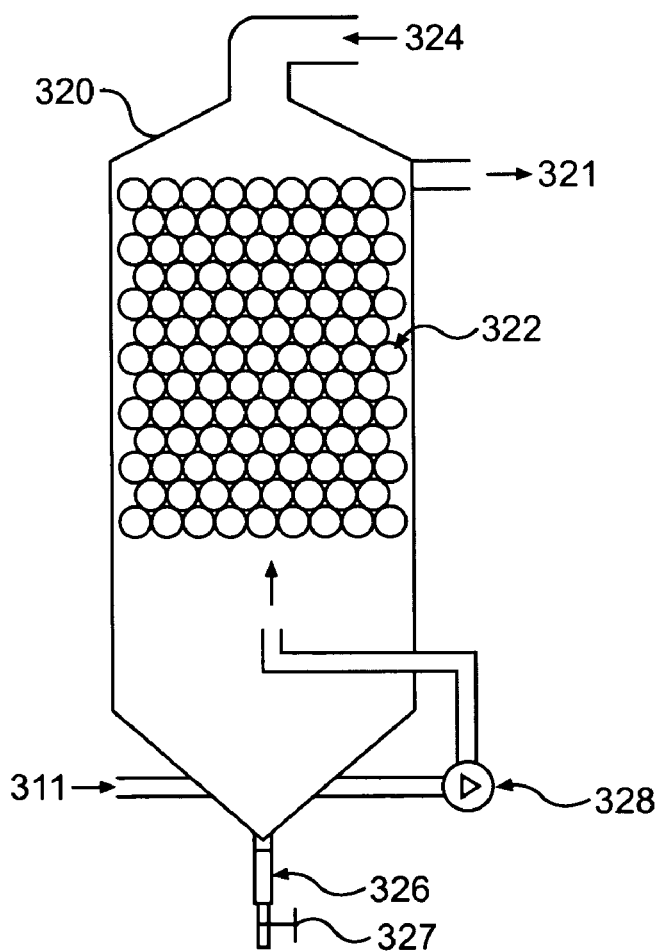

Specific examples of denitration chambers that may be used in the present invention are illustrated in FIGS. 6 and 8 and will now be described. Where large amounts of sulfur media are used to treat the waste water, the sulfur may crush itself by its own weight in the lower parts of the chamber and cause clogging. In order to avoid clogging, as well as to increase the efficiency of the biological system, a denitration chamber 220 according to an embodiment illustrated in FIG.

6 may be used. As shown in FIG. 6, the sulfur media 122 is placed on shelves 123 within the chamber. The shelves are perforated in order to allow water to flow through the chamber. The chamber bottom 125 has a tapered shape to collect sediment. A drain 326a and valve 326b can be included in the bottom of chamber 120, to allow sediment to be periodically removed. If desired, a clear section of pipe 326c may be employed to allow visual inspection of the drain so that sediment buildup may be monitored. The chamber has an inlet 211 and an outlet 221 through which water can enter and exit the chamber.

Figure 7:
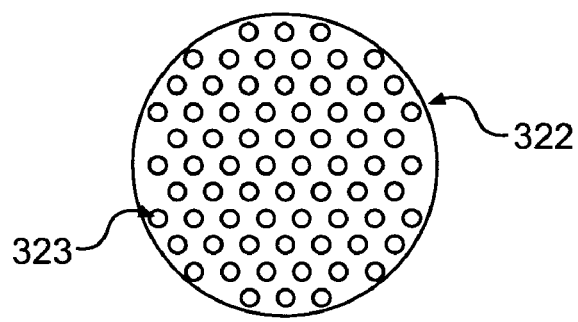

FIG. 8 illustrates another denitration chamber embodiment, which utilizes floating balls comprising sulfur. FIG. 7 shows a floating ball 322 comprising sulfur, according to one embodiment of the present invention. The balls have a density that is less than that of water, and therefore float in the water. Preferably, the balls are hollow plastic or Styrofoam balls which are filled with a mix of sulfur media and plastic or Styrofoam media. Holes 323 in the balls allow water to flow into and out of the balls and contact the sulfur media contained therein. The balls and the media contained in the balls may be any workable size or shape. In one embodiment, the balls have a diameter of 1½ to 3 inches with ⅛ to 5/32 inch diameter holes drilled therein, and the media within the balls has a diameter of, for example, ⅛ inch to ¼ inch.

The floating balls comprising sulfur are placed in a chamber, such as chamber 320 illustrated in FIG. 8, for example. The chamber shown in FIG. 8 is a cylinder has a conical shaped bottom 325, in order to collect sediment. Clear tubing 326 may be placed at the tip of the chamber bottom 325 in order to allow for visual observation of sediment which may be collected. Valve 327 allows the sediment to be drained from the chamber bottom when necessary. Chamber 320 may be made of, for example, PVC, polyethylene, polypropylene, methacrylic or acrylic plastic, fiber glass reinforced plastic (FRP), or stainless steel. One embodiment of the invention comprises an inlet 311 near the bottom of the chamber and outlet 321 near the top, so that the water flows up though the sulfur containing media and exits the chamber through outlet 321. A gas outlet 324 is placed in the top of chamber 320 to allow gases produced in the chamber to escape. The exhaust gases are then flowed through activated carbon or mixed with anolyte, in order to remove hydrogen sulfide gas, before being released into the atmosphere.

Chamber 320 is filled with the floating sulfur media. Preferably, ½ to ¼ of the volume of the tank is filled with the floating sulfur balls 322. In one embodiment, a backwash pump 328 pumps water out of the chamber and then returns it to the chamber through a conduit having an outlet in close proximity to the floating balls to wash the balls. Alternatively, an injector (not shown) may be used to inject carbon dioxide gas into the chamber to wash the balls. Washing the balls helps to remove any particulate matter that can build up on or between the balls. Such build up can undesirably reduce the flow of water through the holes in the balls, as well as through the chamber itself. Additionally, the backwash pump or injector may increase contact time between the sulfur surface area of the balls and the water being treated by increasing the circulation of balls inside the chamber. Additionally, the motion of the balls caused by the backwash pump or injector helps discharge gases that form inside the balls during the process, which allows more water to enter the balls, thus increasing contact time of the sulfur with the water.

The bacteria in the denitration process are more effective if the pH is kept within a healthy range for the particular bacteria being used, as discussed above. Therefore, it may be necessary to adjust the pH of the water in order to maintain a healthy environment for the bacteria. One method for doing this is to add a buffer to the water in the system, such as calcium carbonate. In addition, it is thought that calcium may aid the anaerobic bacteria employed in the Nitrafix in reducing nitrate. Thus, in closed systems, where the water is continually recirculated through the Nitrafix system, adding calcium carbonate to maintain the proper pH and add calcium to the system can help to make the denitration process more effective.

In order to adjust the pH of the water to the desired range, as well as to add calcium to the water, the process of FIG. 5 includes an optional step 4, in which the water leaving the denitration chamber is flowed over one or more calcium sources. Acceptable sources of calcium include limestone, dolomite, aragonite, calcite, crushed coral, as well as other known sources. As water from the denitration chamber flows over the calcium sources, they dissolve to add beneficial amounts of the calcium to the water, in addition to increasing the pH of the water. In one embodiment, the pH of the water is increased by the addition of catholyte, in addition to or instead of using calcium.

Figure 18:
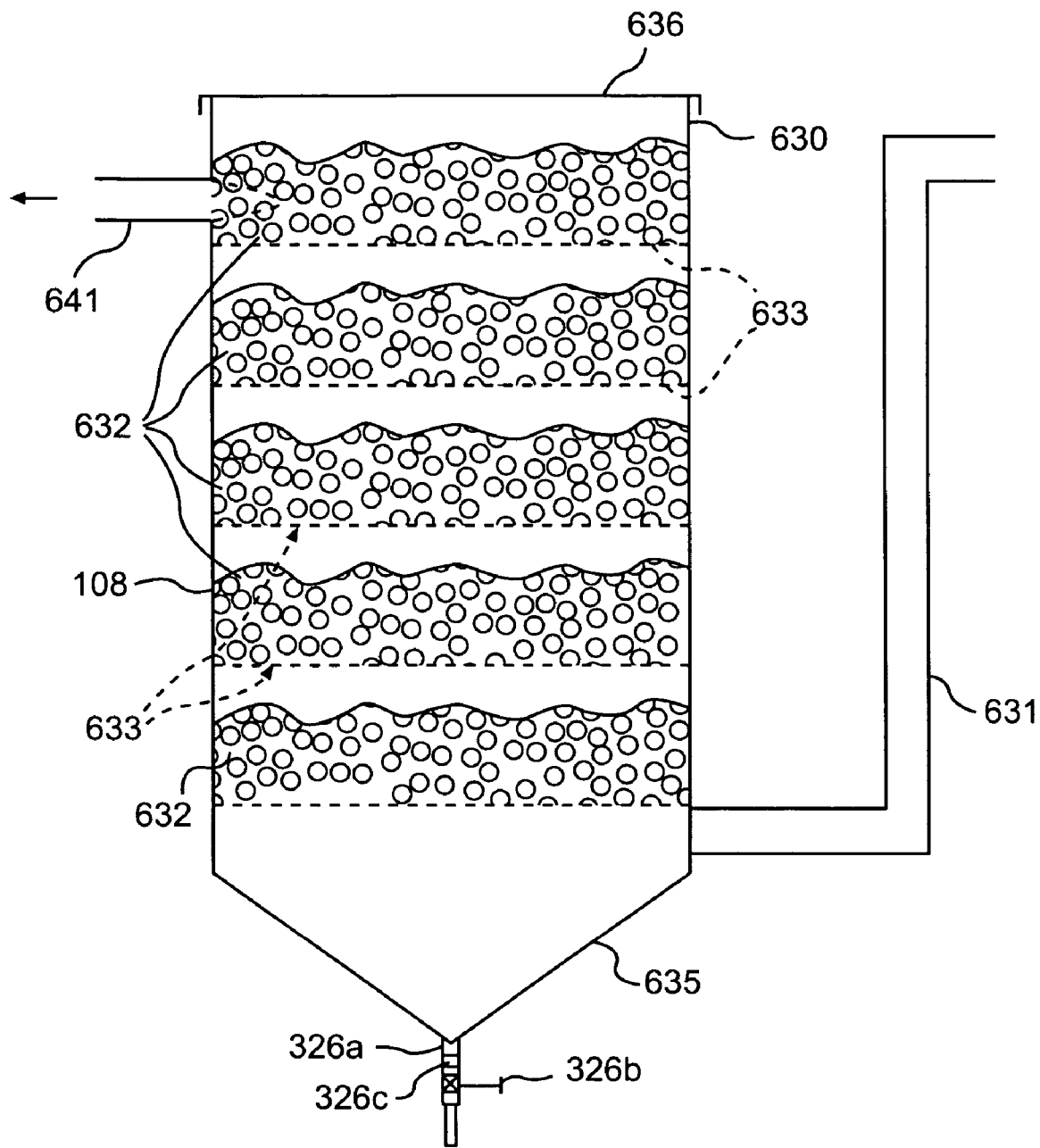
FIG. 18 is a diagrammatic representation of a calcium chamber useful in the process steps for treating waste water, according to an embodiment of the present invention.

One example of a calcium chamber which may be used in the system of FIG. 1 will now be described in connection with FIG. 18. Where large amounts of calcium media are used to treat water, the calcium may crush itself by its own weight in the lower parts of the chamber and cause clogging. In order to avoid clogging, as well as to increase the efficiency of the system, a calcium chamber 630 according to the embodiment illustrated in FIG. 18 may be used. As shown in FIG. 18, the calcium media 632 is placed on shelves 633 within the chamber. Various sources of calcium may be used, such as aragonite, calcite and dolomite, as described above in connection with the other embodiments of the Nitrafix. If multiple sources of calcium are used, it may be preferable to place the harder to dissolve calcium on the bottom shelves and the more easily dissolved calcium on the upper shelves, in order to extend the life of the calcium media. The size of the media may be any practical size known in the art. For example, the size may range from 3 to 10 mm in diameter.

The shelves are perforated in order to allow water to flow through the chamber. The chamber bottom 635 preferably has a tapered shape to collect sediment and small particles of calcium which fall through the perforations in shelves 633, although it may have a flat bottom. A drain 326a and valve 326b can be included in the bottom of chamber 630, to allow sediment and calcium to be periodically removed. If desired, a clear section of pipe 326c may be employed to allow visual inspection of the drain so that sediment buildup may be monitored. The chamber has an inlet 631 and an outlet 641 through which water can enter and exit the chamber. A lid 636 may be used to cover the chamber.

As discussed above, other designs for the Nitrafix may also be used depending on the amount of water to be treated and the needs of the system. For example, a system called the N-500, and similar systems, described in co-pending application Ser. No. 10/673,634, filed on Sep. 30, 2003 and entitled AUTOTROFIC SULFUR DENITRATION CHAMBER AND CALCIUM REACTOR, the description of which is hereby incorporated by reference, may be used as the denitration system 223 for denitration of the overflow from tank 100.

A more detailed description of the bio-filter discussed above will now be provided. Bio-filter 160 uses aerobic bacteria processing to treat the water to reduce ammonia to nitrite and nitrite to nitrate. The water to be treated flows through a chamber which contains a support media on which the aerobic bacteria may colonize. A gas comprising oxygen is introduced into the chamber to improve the efficiency of the aerobic bacteria process.

Figure 19:
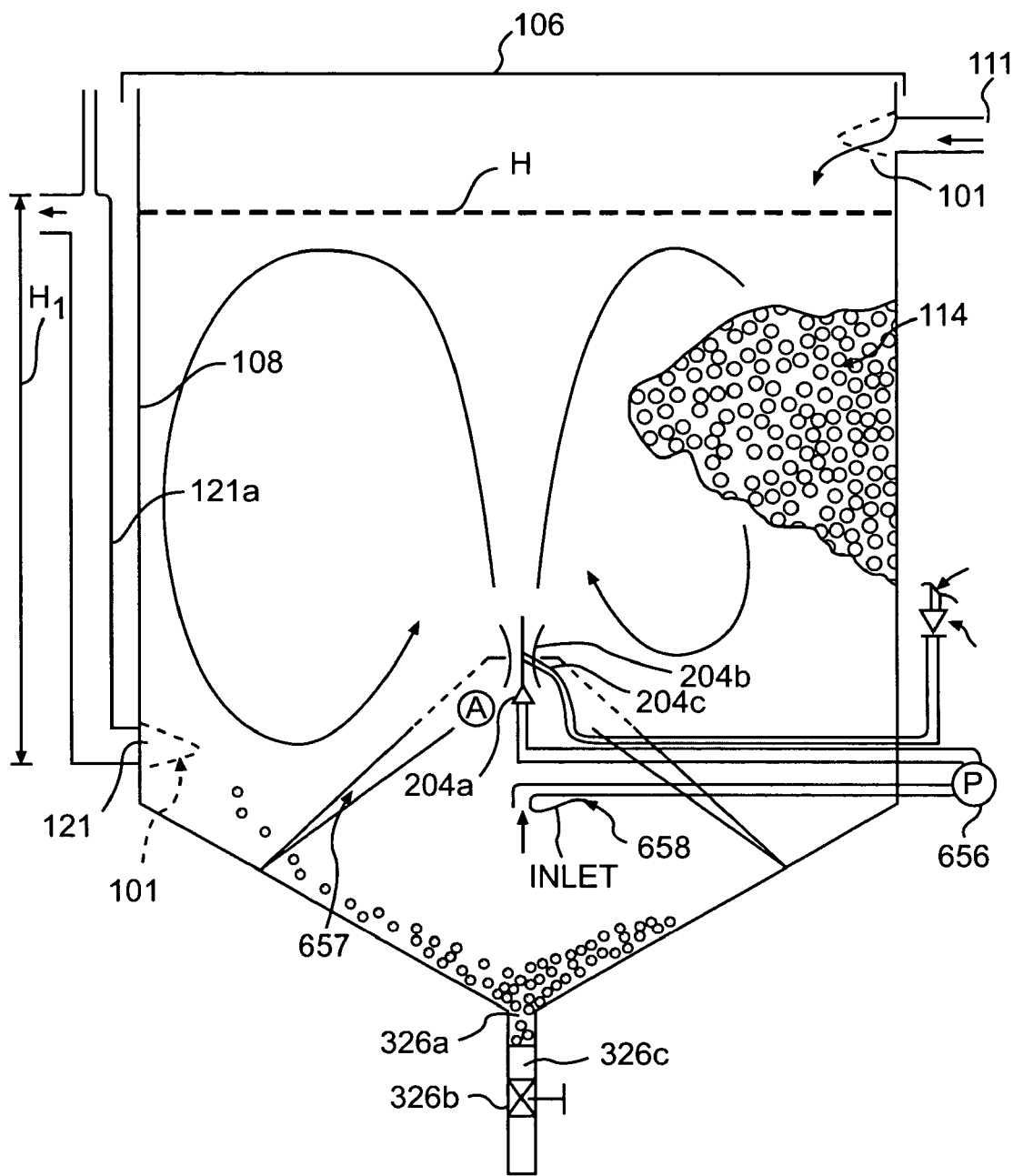
FIGS. 19 and 23 are diagrammatic representations of bio-filters useful in the process steps for treating waste water, according to embodiments of the present invention.

One embodiment of a bio-filter which may be used is illustrated in FIG. 19. In this embodiment, bio-filter 160 comprises a tank 108. Preferably the lower portion of which has a tapered shape to collect sediment which settles to the bottom, although it may have a flat bottom. For example, tank 108 may be in the shape of cylinder with a cone shaped bottom. A drain 326a and valve 326b are included in the bottom of tank 108, to allow sediment to be periodically removed. If desired, a clear section of pipe 326c may be employed to allow visual inspection of the drain so that sediment buildup may be monitored. A lid 106 may be used to cover the tank 108.

Figure 22:
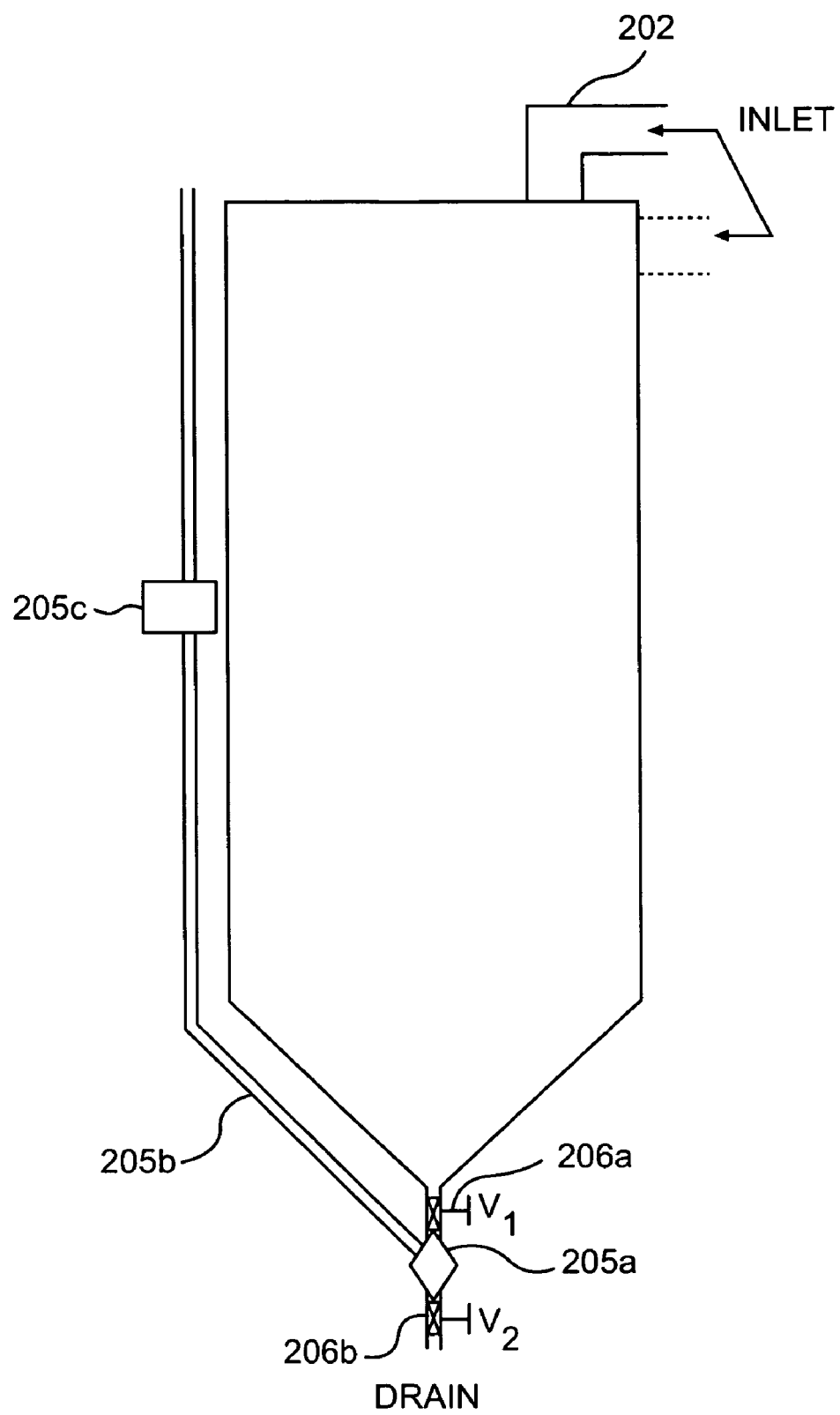
FIG. 22 is diagrammatic representation of a chamber having a sediment collection and drainage system, according to an embodiment of the present invention.

In another embodiment, illustrated in FIG. 22, a two valve drain system may be used to collect solid matter settling to the bottom of the tank, in a way that minimizes water loss from the tank. An upper valve 206a positioned in the drain pipe remains open during normal functioning of the tank, while a lower valve 206b, remains closed. This allows the waste settling to the bottom of the tank to move through the drain pipe and collect in sediment collector 205a. Collector 205a can be the shape of a diamond or similar enlarged chamber.

When tank 206a is opened, water from the tank flows through upper valve 206a and into water tube 205b, which provides fluid connection between the collector 205a located between valves 206a and 206b and the open air. After solids build up in the collector 205a, they are removed by closing valve 206a and opening valve 206b. The solids will drain through valve 206b, and the water from water tube 205b will flush any remaining solids from the walls of collector 205a. This allows the solid matter to be removed without draining excess water from tank 101, instead using only the water in water tube 205b. Water tube 205b extends to at least the height of the tank itself, and therefore water will fill the water tube until it reaches a level that is in equilibrium with the level of water in the tank. In an alternative embodiment, water tube 205b contains a tank 205c to provide a larger volume of flushing water than the volume of the tube alone.

All or a portion of collector 205a may be clear so that the level of solids collected in the pipe section may be visually monitored, and valves 206a and 206b may be opened and closed manually. Alternatively, valves 206a and 206b can be controlled electronically, so that they open and close automatically. In this embodiment, a sensor could be used to determine the level of solid in the collector, and send a signal to the valves to open and close as necessary to drain the pipe section. Any sensors and automatic valves known in the art can be used with this embodiment of the present invention.

This embodiment is not limited to use with the bio-filter discussed above. Indeed it is compatible with most of the tanks discussed according to the present invention.

Referring again to FIG. 19, the bio-filter chamber has an inlet 111 and an outlet 121 through which water can enter and exit the chamber. A screen 101 may be placed over the outlet and inlet to avoid clogging and contain the media within the chamber. The height H1 of the outlet pipe 121a will control the level of water in the bio-filter 160.

In one embodiment, catholyte is added to the bio-filter such that catholyte is dripped directly into tank 108. In another embodiment, catholyte is added to the water upstream of tank 108 and then flows into bio-filter 160 through inlet 111. In yet another embodiment, as discussed above, the catholyte is added through the mixing eductor. The addition of catholyte in the bio-filter will improve the health of the bacteria and will help the bacteria grow. The improved health of the bacteria will in turn improve the water quality and allow for more efficient filtration.

Bio-filter 160 may be partially or completely filled with support media 112, which acts as a substrate for the aerobic bacteria. The aerobic bacteria already exist in the waste water will readily colonize on the media. The media 112 may be any type of media that can support colonization of aerobic bacteria. While a media having any practical size and shape may be used, a media having a high surface area is preferred. For example, sand, crushed coral, and other media having relatively high surface areas may be used. One preferred form of support media is plastic, which may be in the form of small spheres or tubes, although any shape known in the art may be used. The plastic media is lightweight and may float in the water. It does not clog easily, and provides a large surface area for bacterial colonization. One example of such a plastic media is known as biofilm. Examples of biofilm which may be used include Kaldnes and Bee-Cell, which are manufactured by Water Management Technologies, Inc. Other media like Bio-Chem stars from RENA may also be used.

A mixing eductor 204, is used to eject an oxygen-containing gas or a liquid into the tank. The bubbles are well mixed with the water in the tank by mixing eductor 204, comprising an inlet channel 204a, a mixing chamber 204b, and a tubing 204c. A pump 656 circulates water from bio-filter 160 through pipe 658 to the inlet channel 204a, where the water is forced through the mixing chamber 204b and mixed with the gas or liquid from tubing 204c and additional water entrained by the mixing eductor from the bio-filter. In an alternative embodiment, the water going to eductor inlet channel 204a is supplied from a source outside the bio-filter chamber, such as from tank 170. Mixing eductor 204 and its operation are described above in more detail with reference to FIGS. 3a to 4b.

Catholyte may also be added to the bio-filter through the eductor, as discussed above. In one embodiment, catholyte is added to the bio-filter 160 through a second tubing (not shown) which is positioned in the eductor mixing channel in a manner similar to tube 204c, used to add the oxygen to the bio-filter. By this method both oxygen and catholyte are forced through the mixing chamber of the eductor and mixed with the water in the chamber. In another embodiment, where smaller amounts of catholyte are added, the catholyte and oxygen-containing gas are both added through tube 204c.

Figure 20A:
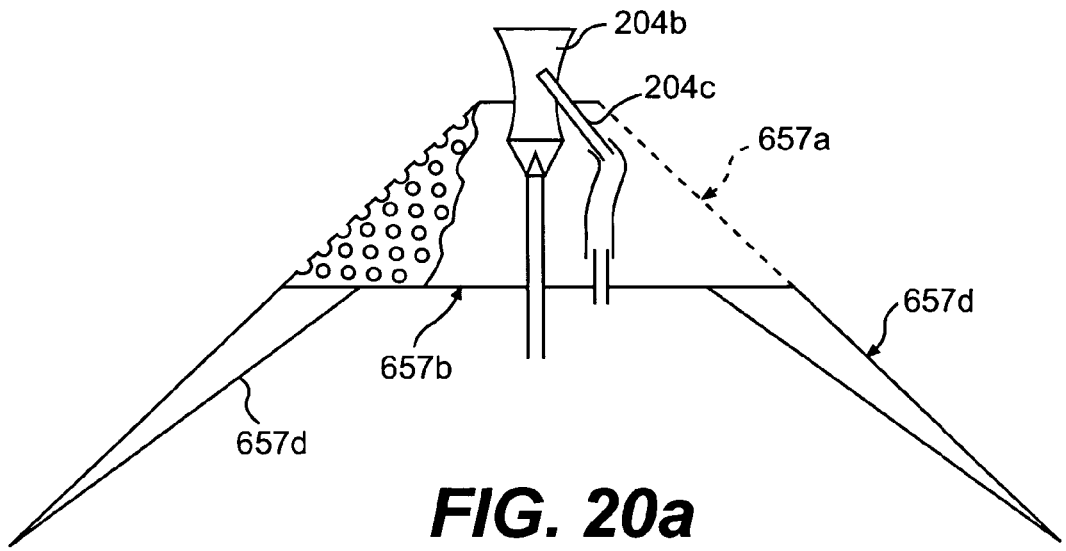
FIGS. 20a and 20b are additional diagrammatic representations of the bio-filter of FIG. 19, according to embodiments of the present invention.
Figure 20B:
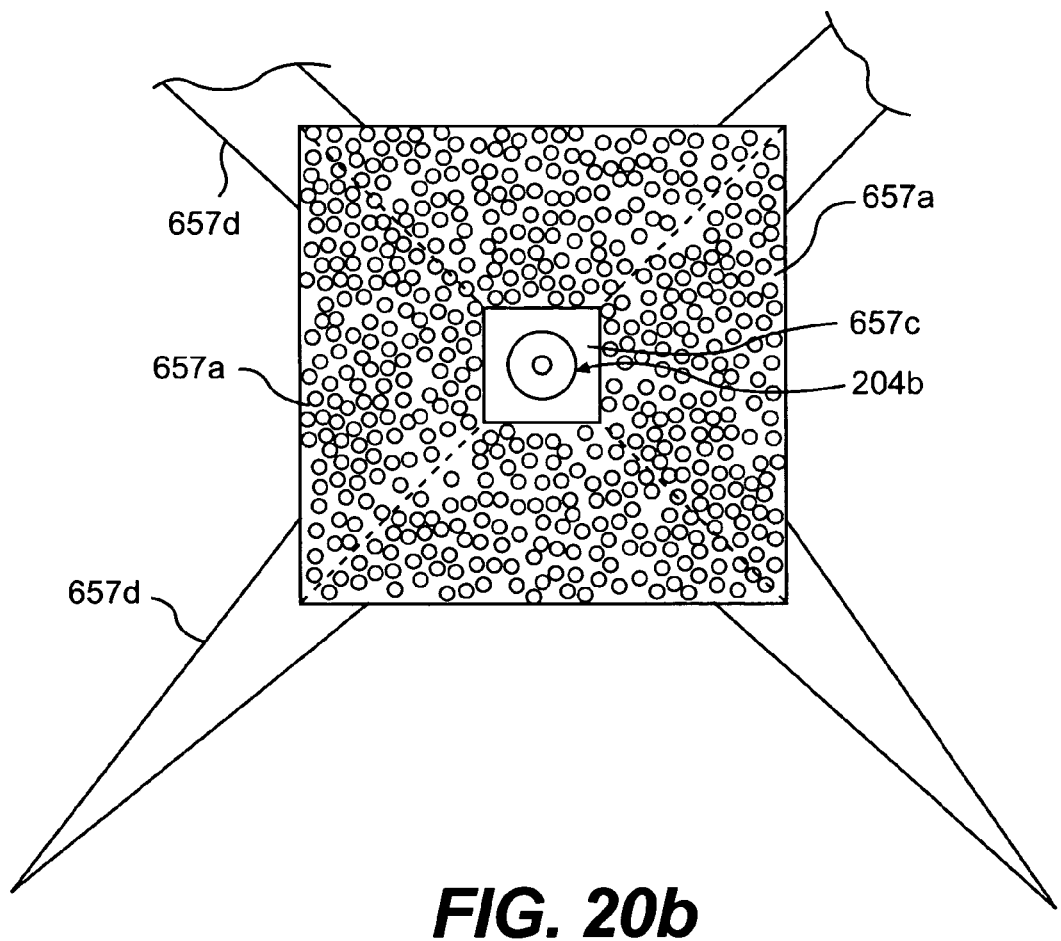

In one embodiment, mixing eductor 204 is supported inside bio-filter 160 by a support 657, in the manner illustrated in FIGS. 20a and 20b. As shown in FIG. 20b, the mixing channel 204b is supported by a plate 657c, so that the inlet cone of the mixing eductor is contained inside a small chamber composed of perforated plates, or screens, 657a, the top plate 657c and a bottom plate 657b. Water flowing through the perforated plates or screens 657a is entrained into the inlet cone of mixing chamber 204c. Tubing 204c may be connected to the gas supply 145 (shown in FIG. 1) by any means for connecting gas supply tubing known in the art.

Figure 23:
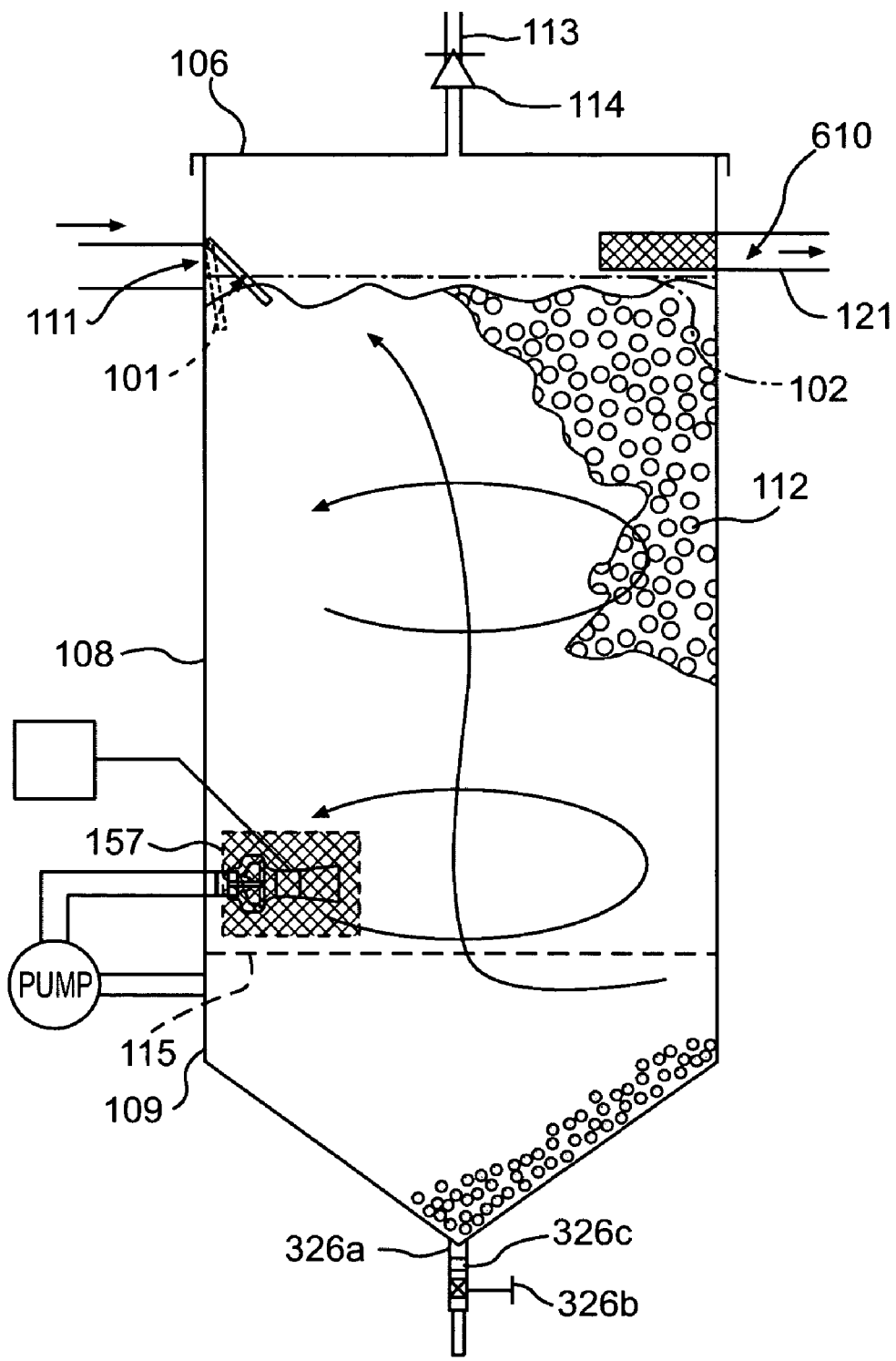

In a preferred embodiment of the bio-filter chamber, as shown in FIG. 23, both the inlet 111 and outlet 121 are located towards the top of the tank. The inlet is fitted with a check valve 101, sometimes referred to in the art as a swing check valve, that opens only to allow water to flow into the bio-filter chamber, and closes once the inlet flow of water stops. This prevents the biomedia from flowing back through the inlet 111 and into another chamber of the water treatment system. The outlet is fitted with a screen to prevent any media from escaping. The lower portion of the tank has walls that slope downward at an angle that ranges from about 5 to about 60 degrees from horizontal. Preferably, the walls slope downward at an angle of 5 degrees from horizontal. The mixing eductor 204 is positioned along the inner surface of the tank to force the water to flow around the inside of the tank in a circular direction. Additionally, a strainer 157 is placed around the eductor to prevent it from becoming clogged. In this embodiment, the circular flow of water through the media provides for longer contact time, and thus better filtration.

The aerobic bacteria exist and thrive in the water and will colonize on the media within the bio-filter chamber as the system is operated. The type of aerobic bacteria utilized in bio-filter 160 may include, for example, *nitrosomonas* and *nitrobacter* bacteria. These naturally occurring bacteria break down ammonia and nitrites in the water and form nitrates.

A more detailed description of the oxytower 210, used above in the system of FIG. 1, will now be given. The oxytower operates to remove nitrates, nitrites, phosphates, carbon dioxide, and heavy metals from the water, as well as to add oxygen to the water. By oxygenating the water, the pH will remain more stable than water that is oxygen deficient. Further, the oxytower will also help to cool the water by evaporation.

Figure 12A:
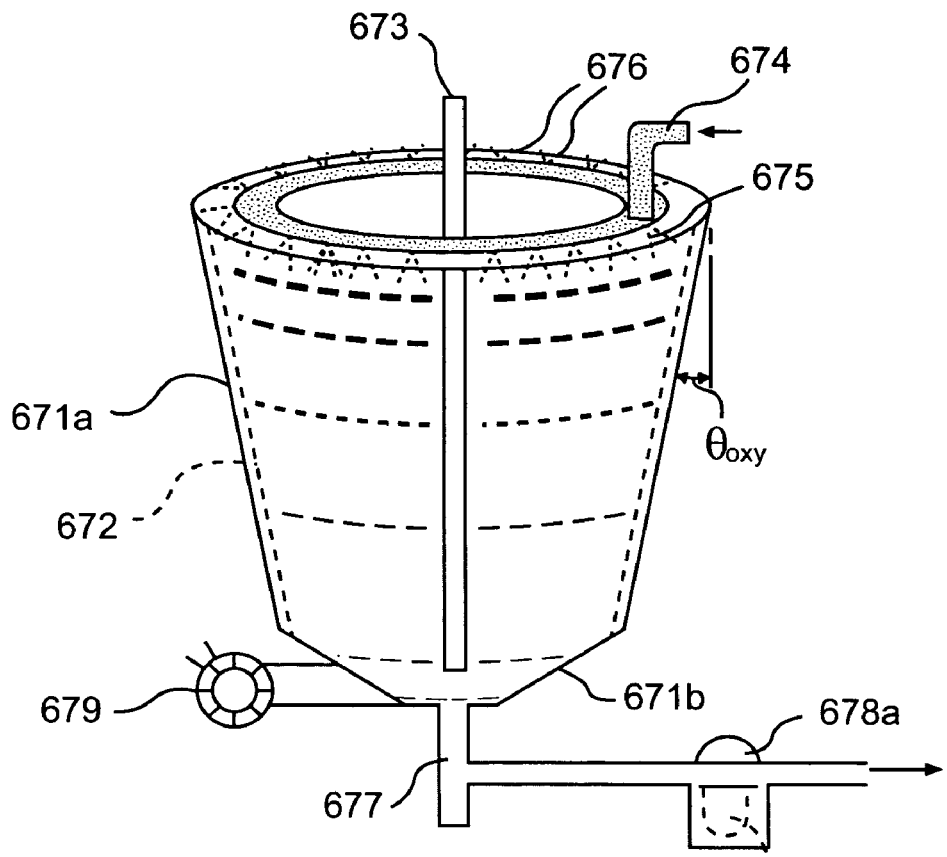
FIGS. 12a-12c and 13a-13d are diagrammatic representations of the oxytower, according to an embodiment of the present invention.
Figure 12B:
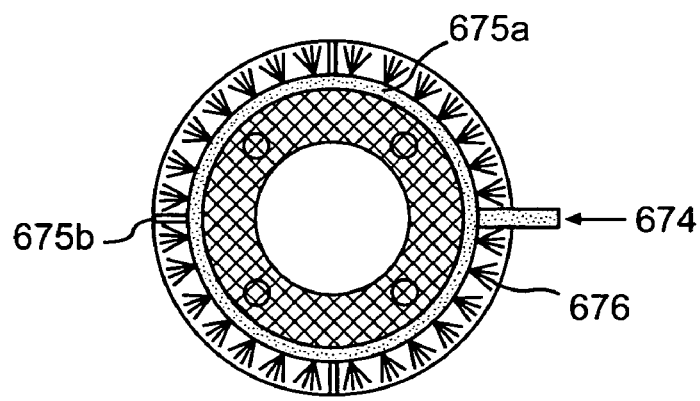

One embodiment of the oxytower is illustrated in FIGS. 12*a* and 12*b*. As shown in FIG. 12*a*, the oxytower of the present invention is in the shape of an inverted cone, having side walls 671*a* that slope inward at an angle $\theta_{oxy}$ of, for example, 5 to 45 degrees, and more preferably 10 to 20 degrees, as shown in FIG. 12*a*. A medium, such as a screen 672, is placed on the inner surface of the cone and serves as a support for the growth of algae in the oxytower. A pipe 675*a* or other means, such as a gutter, for channeling water is located along the top inner circumference of the oxytower chamber. The pipe 675*a* has a plurality of outlets 676, such as holes or jets, located along its outer circumference through which water may be dripped or sprayed along the top surface of the screen. The pipe 675*a* is connected onto the wall of the oxytower by supports 675*b*, as shown in FIG. 12*b*. An artificial light 673 is applied to support photosynthesis by the algae growing on the screens. Alternatively, the oxytower may be placed so it is exposed to sunlight during the day.

During operation of the oxytower, water flows into pipe 675*a* through inlet 674, and is dripped or sprayed from outlets 676 onto the top of the screens 672. The water then drips down the screens by force of gravity.

Figure 12C:
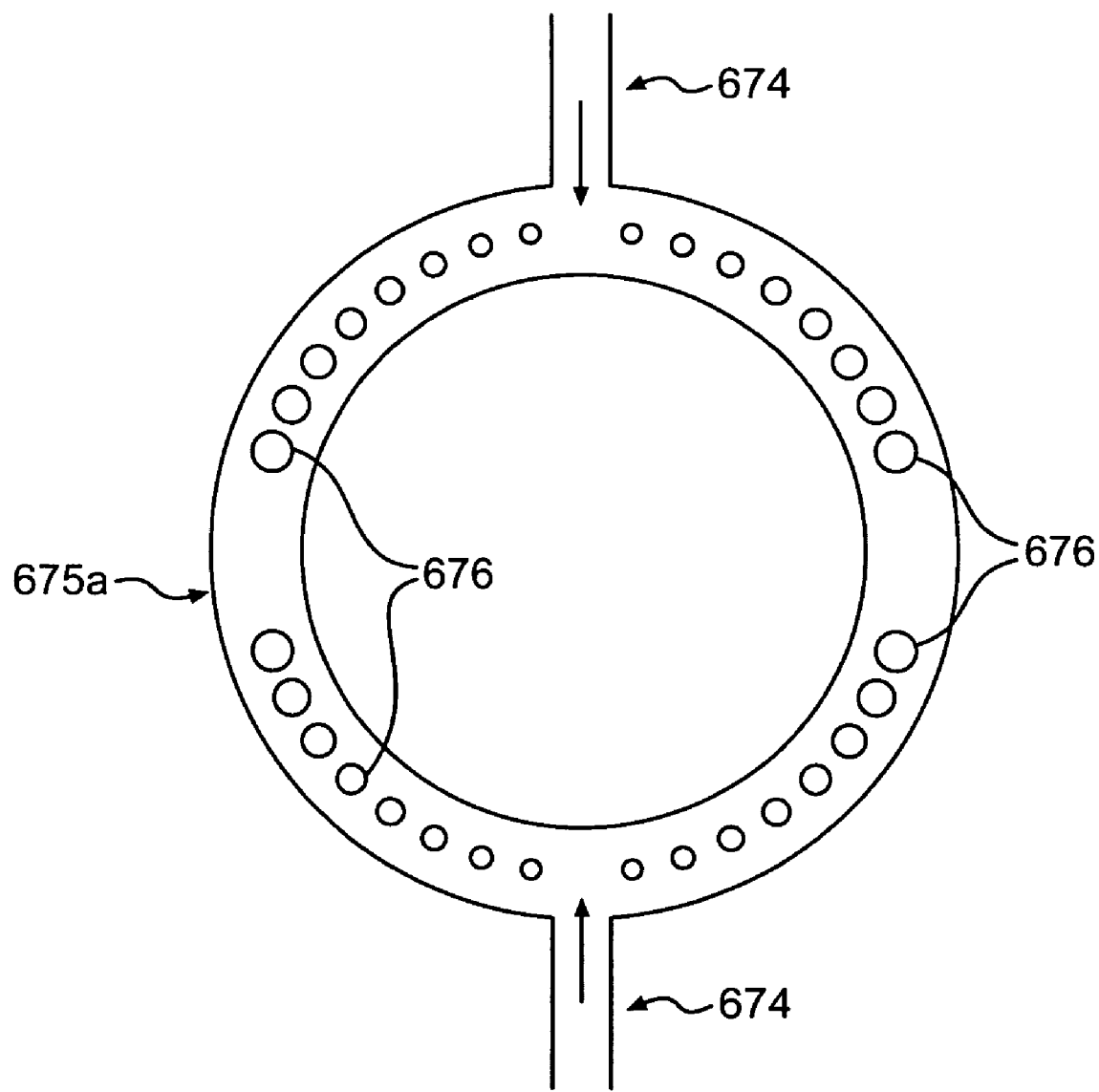

In one embodiment, shown in FIG. 12*c*, the oxytower has two inlets 674, positioned at opposite ends of the chamber, which feed water into pipe 675*a*. The diameter of each outlet 676 varies, with smaller outlets positioned closer to the inlets, and larger outlets positioned further away from the inlets along the circumference of the pipe. In this fashion, the largest outlets are at the two positions along the circumference of the pipe equidistant from the two inlets. The arrangement of outlets from smallest to largest allows water to be distributed more evenly over the screens than if the outlets were all the same size. For example, this embodiment can distribute up to 300 gallons or more of water per minute evenly over the screens.

As the water drips down the screen surface, the screen will break up the water and cause an increase in surface area which will allow for the water to be effectively degassed. Additionally, algae growing on the screens will remove unwanted contaminants in the water, such as phosphates, nitrates, nitrites, and heavy metals, which the algae uses for nutrients as it grows. The water then flows out of the tower through outlet 677. Water from the outlet may be passed through strainer or mechanical filter 678*a* to remove debris from the water. As shown in FIG. 12*a*, a trap basket may be used for holding the removed debris.

The flow of water through the tower may vary. For the oxytower to be effective, it is preferable that the volume of water being treated pass through the oxytower 2.5 times per day. It is more preferable that the volume of water being treated pass through the oxytower once per hour.

While the walls of the oxytower are preferably inclined, as shown in FIG. 12*a*, in an alternative embodiment, the walls, as well as the screens supported by the walls, are vertical, so that the oxytower has a cylindrical shape. The walls of the oxytower can be made of any neutral plastic (i.e., a plastic that is minimally reactive, or non-reactive, with the water being treated) that is safe for aquatic life. Examples of suitable materials include PVC, polyethylene, polypropylene, methacrylic or acrylic plastic, fiber glass reinforced plastic (FRP), or stainless steel. The oxytower may have a diameter of up to 8 feet or more, and may have any practical height.

The screen 672 may be made from any material which is safe for aquatic life and which is resilient and will not corrode in saltwater. For example, the screen may be made of soft nylon or fiberglass material. The screen may be one continuous piece, but is preferably in multiple pieces for easy cleaning. For example, the screen may have 4, 6, or 8 sections. The screen may have various shapes, sizes and hatching patterns. In a preferred embodiment, the screen has a diamond shape cross hatching that is 3/16 inch to 1/4 inch in length for each leg of the diamond. The screen, or screen sections are attached to a pre-formed plastic support. The plastic support is then attached to the inside of the tower. Alternatively, a medium other than screens may be used which will accomplish a similar function as the screens. For example, carpet may be used in place of the screens.

During operation of the oxytower, the screens should periodically be cleaned in order to promote the optimal growth of algae for removing contaminants from the water. It is preferable that the entire surface area of the screen not be cleaned at one time. For example, in an embodiment where there are 4 sections of screen, it is preferable that more than 2 sections not be cleaned at one time. For best results, the screens are cleaned periodically on a rotating bases, where one screen is cleaned, and then after the algae begins to grow on the cleaned screen, another screen is then cleaned. The cleaning of the screens should be done carefully so as not to remove the roots of the algae. If the roots are removed, the algae will grow poorly and slowly. Preferably, the screens should not be bleached, pressure cleaned or cleaned with chemicals, so as not to harm the algae.

In one embodiment, catholyte is added to the oxytower. Preferably, the catholyte is added to the water as it passes through inlet 674, before it flows into pipe 675*a*. This way, the catholyte is mixed into the water before it flows out of outlets 676. The catholyte can be added from an external source by any means known in the art, such as by dripping the catholyte into inlet 674.

The light source 673 may be any light source which will provide the necessary light for photosynthesis and algae growth. The light source may be natural or artificial light and may be provided either directly or indirectly to the algae. In an embodiment where the surface of the screen is 2 square inches per gallon of water to be treated, and the flow of water is 0 to 0.02 gal/min/square inch of screen surface, the light source preferably provides at least 0.75 watts per 10 $in^2$ of screen surface, such as, for example 1 watt per 10 $in^2$ of screen surface. Examples of light sources which may be used include natural sunlight, a power compact tube, a high output (HO) or very high output (VHO) fluorescent bulb with a spectrum of 4000 K to 10,000 K. A metal halide bulb may also be used. In one embodiment, light bulbs are mounted vertically and continuously along the height of the oxytower. The light source 673 should be placed a distance from the screens which will be effective for promoting photosynthesis and growth of the algae. For example, where the above HO or VHO fluorescent bulbs are used in the embodiment of FIG. 12a, the tower preferably has a maximum diameter of from 4 to 8 feet, in order to optimize the distance from the screens to the light. For larger units, metal halide bulbs may be used with or without reflectors. It is preferable that the light remains on 24 hours per day continuously for optimal algae growth.

Figure 13A:
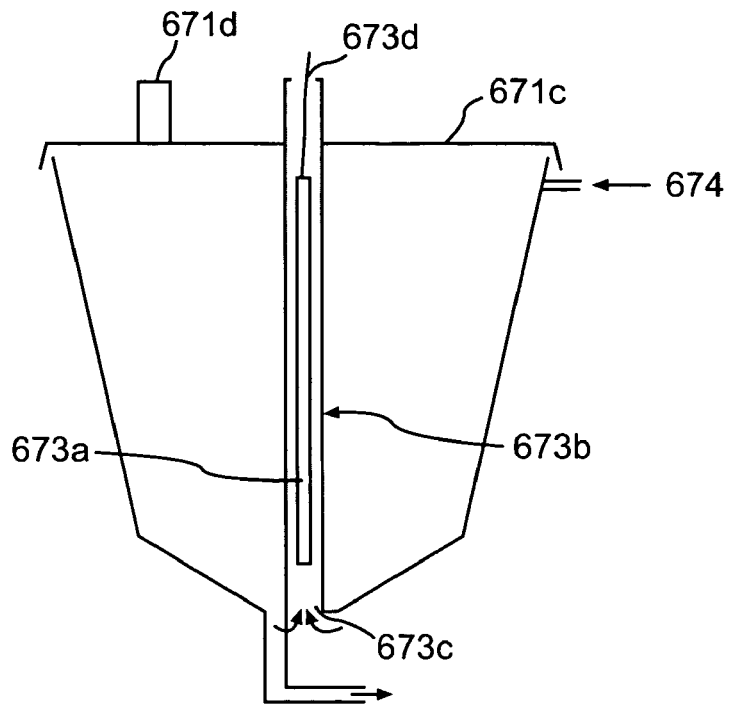

The bulbs can be covered with a translucent acrylic or glass covering to protect them from water. For one embodiment shown in FIG. 13a, for use in larger units, the protective covering 673b will preferably extend all the way through the unit and will have openings 673c and 673d to allow for improved ventilation. The heat produced from the light will rise, which will cause an elevated air current to suck in cool air from the bottom opening 673c of the protective covering 673b and cool the light bulb 673a. An apparatus for moving air, such as a fan (not shown), can be added to further ventilate the light to make cooling more efficient.

Figure 13B:
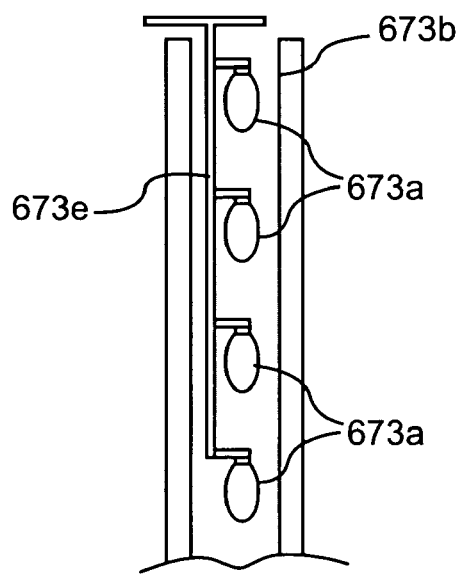

In another embodiment, illustrated in FIG. 13b, a bar 673e, which may be made, for example, from stainless steel, is used to support multiple bulbs 673a. In this embodiment, the number of lights is chosen to optimize the amount of light for improved algae growth and contaminant removal from the water.

Figure 13C:
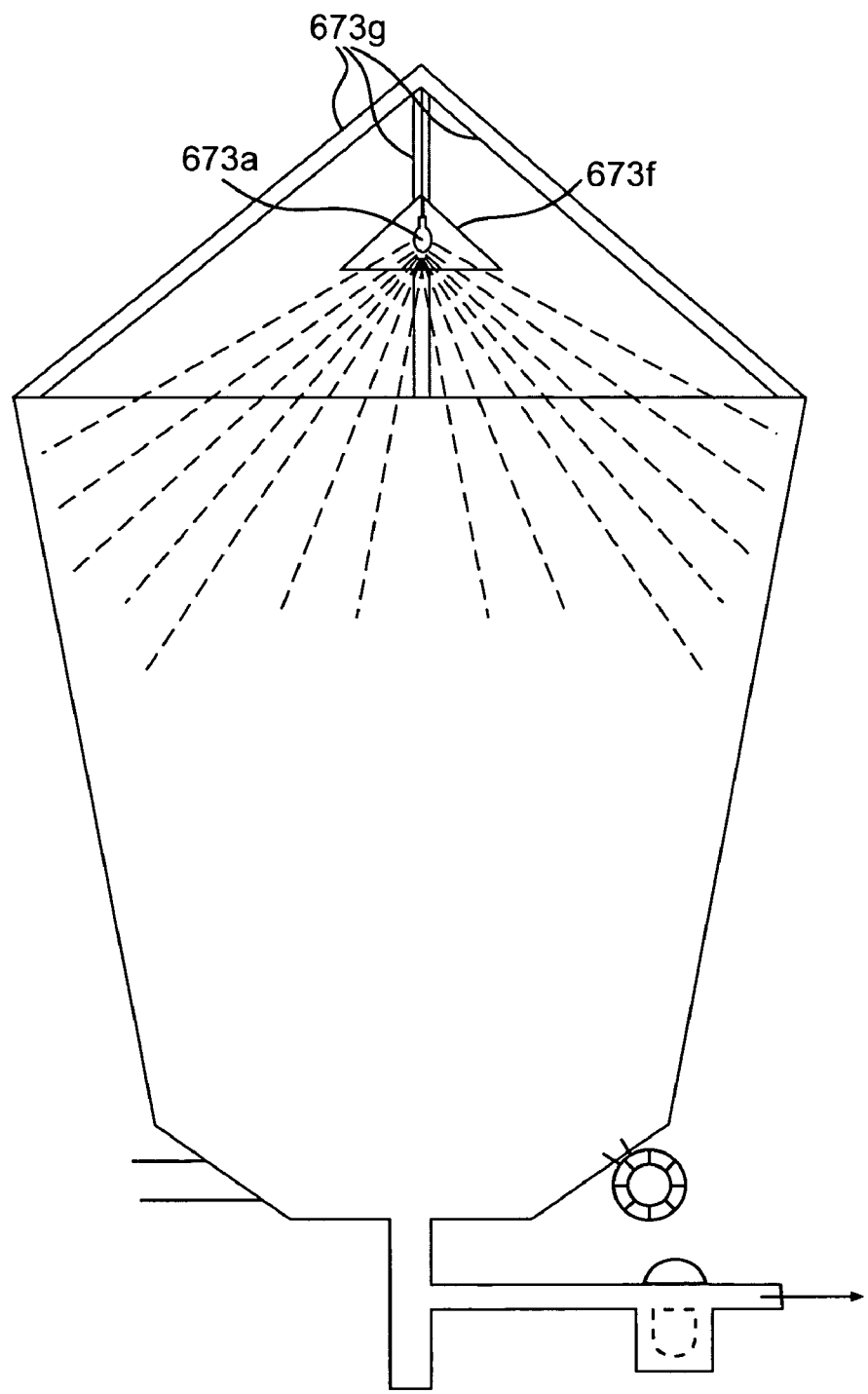
Figure 13D:
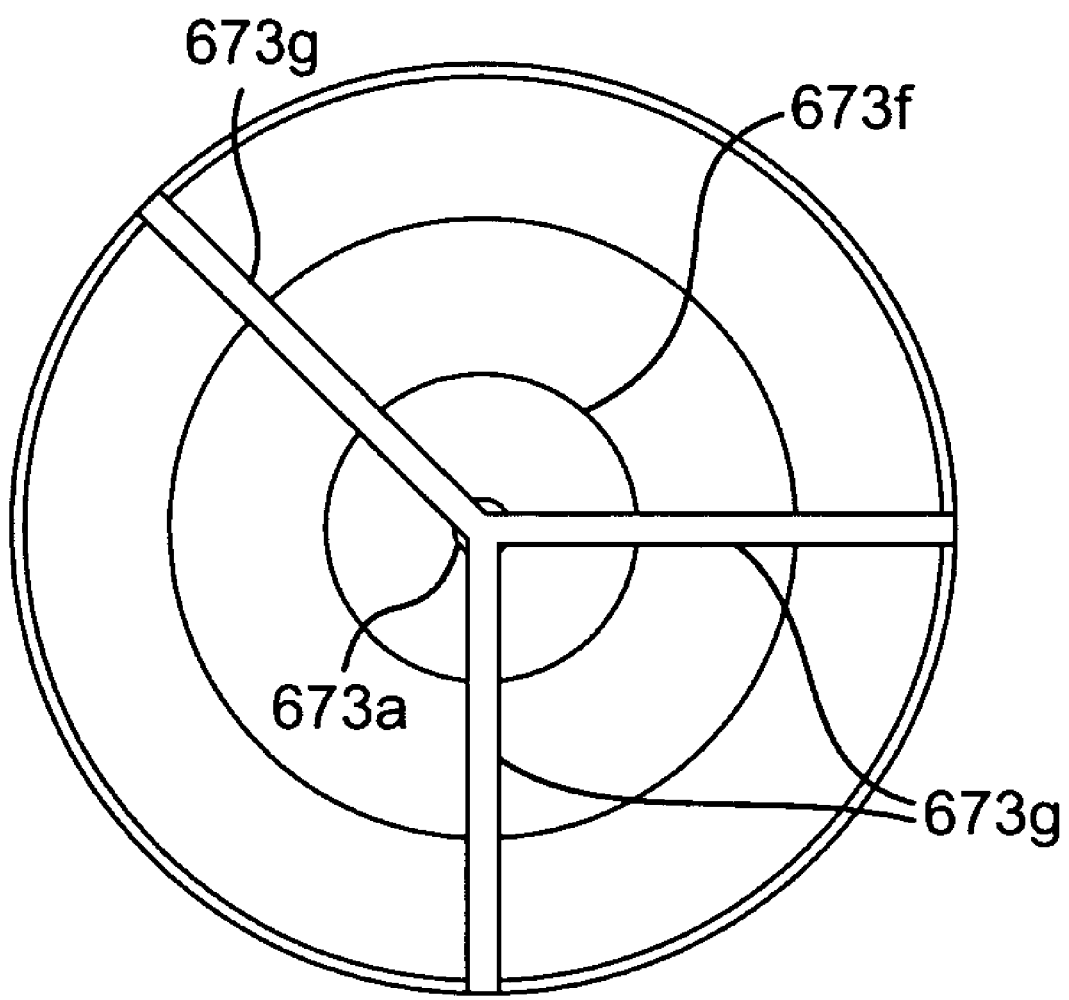

In a preferred embodiment, shown generally in FIG. 13c, the oxytower contains 673f in the shape of a cone. The reflective material 673f may be positioned inside the oxytower by any means known in the art. In one embodiment, the reflective material 673f is suspended from a support made from three members 673g attached to the oxytower chamber at one end, and with the opposite end rising above the oxytower to intersect at a point along the central axis of the tower. This embodiment is more clearly illustrated in FIG. 13d, which shows a top view of the oxytower. A light bulb 673a is placed in the space between the reflective material, and the oxytower chamber, and the reflective material is preferably positioned such that all of the light from the bulb is reflected on the screens containing the algae within the oxytower. The spectrum of light used should be as close to natural sunlight as possible, ranging from 5000 K to 15,000 K, preferably 6000 K to 10,000 K.

In one embodiment, the light bulb is a 1000 watt light bulb, the diameter of the oxytower is 6 feet, 6 inches, and the walls of the oxytower have a slope of 50 degrees, thereby providing 70 square feet of surface area of screen on which the algae can grow, and the footprint of the entire system is only 34 square feet. In this embodiment, the distance from the bulb to the algae is almost the same at all points along the screen. This allows for the maximum luminescence of light to be distributed per square inch of screen throughout the oxytower requiring minimal energy. By comparison, in order to match this distribution of such intense light in a typical system having a footprint of 34 square feet, one would have to use four times the number of bulbs as used in this embodiment.

In another embodiment, the oxytower contains a top cover 671c, to prevent unwanted debris from getting inside. Preferably, the cover is transparent to allow light, such as natural sunlight, into the chamber, and has a chimney 671d through which gas emissions from the oxytower are collected and/or vented. For example, the chimney may be filled with activated carbon, which may be used to adsorb hydrogen sulfide gas.

The bottom of the chamber 671b may be flat, or it may be conically shaped as shown in FIG. 12a. The conical shaped bottom 671b is better for collecting detritus.

In yet another embodiment, a blower 679 is used to blow air into the oxytower, which will increase evaporation in the tower and cool the water, as well as help to degas the water. If a blower is to be used to cool the water, it is preferable that the tower be insulated for improved cooling efficiency. Additionally, carbon dioxide may also be blown into the oxytower to raise oxygen levels in the water through increased respiration and production of oxygen by the algae.

The oxytower is contemplated for use in a broad range of other applications, such as for use in treating water in aquariums and aquaculture, human waste water treatment, drinking water purification, and other applications where it would be helpful to remove contaminants using algae.

As discussed above, the embodiments of the present invention can be used to clean lagoons, such as, for example, lagoons of a previously existing hog farm, and convert them into clean water ponds. When used in conjunction with such lagoons, the systems of the present invention can help reduce contaminants in the lagoons to produce clean fresh water ponds and help reduce odors and water runoff pollution produced from the existing lagoons.

Figure 9:
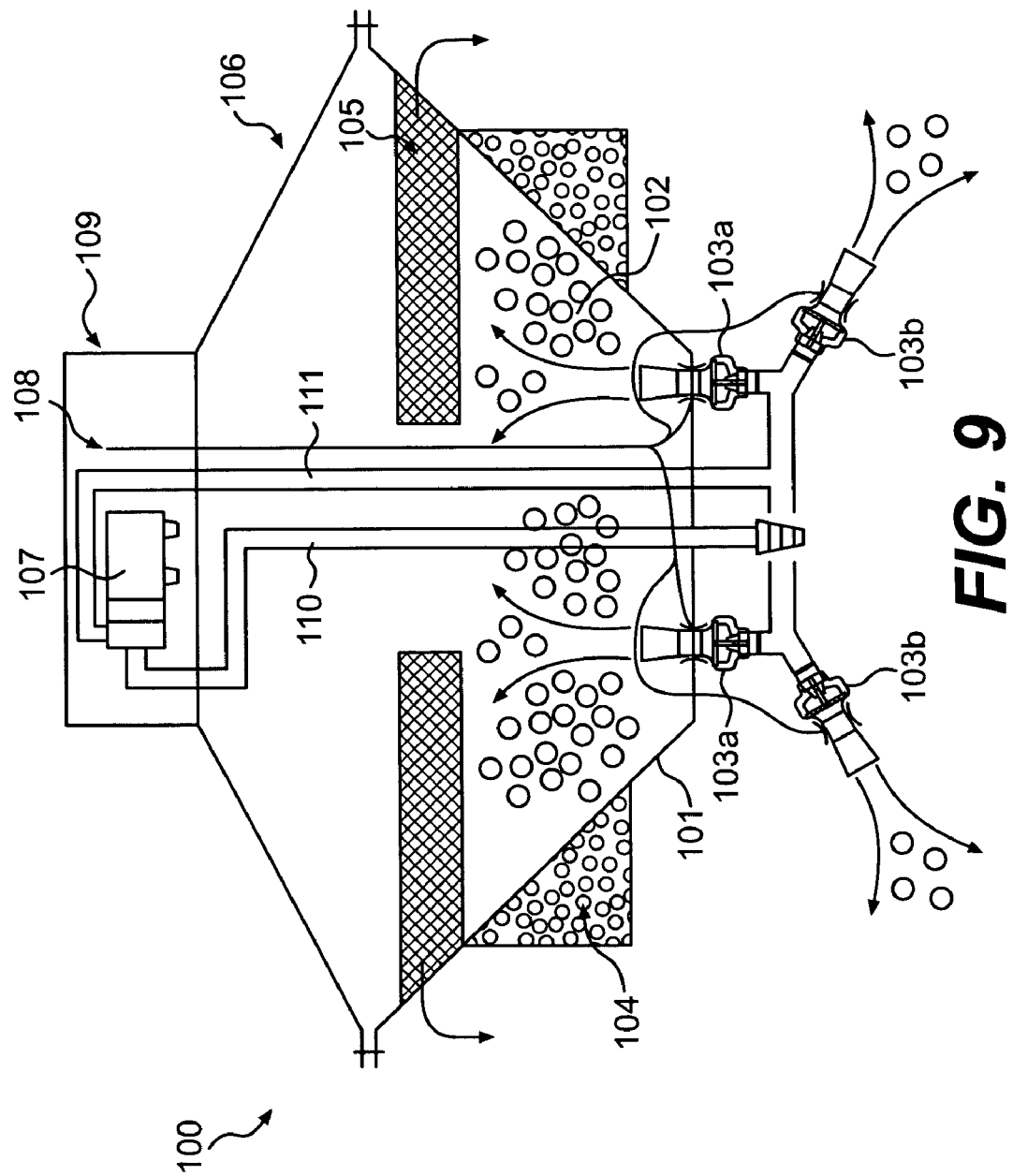
FIGS. 9-11 are diagrammatic representations of a floating bio-filtration system, according to an embodiment of the present invention.

One embodiment of the present invention, preferably for use if retention tank 170 is a lagoon, pond, or above ground tank is a floating bio-filtration system. One embodiment of a floating bio-filtration system 100 (also known as a floating bio-filter) is shown in FIG. 9. The floating bio-filter could replace system 160, so that the flow from the FFS 140 goes directly to retention tank 170, where the floating bio-filter is employed, as well as to denitration system 180, and optionally oxytower 210. Alternatively, the floating bio-filter may be used in addition to bio-filter 160, which may allow for bio-filter 160 to have a reduced size. In yet other embodiments, the floating bio-filter is used alone to reduce contaminants in existing wastewater lagoons. Additionally, the floating bio-filter is contemplated for use in other applications, such as for reducing contaminants in aquaculture, such as in shrimp and catfish farms.

Figure 11:
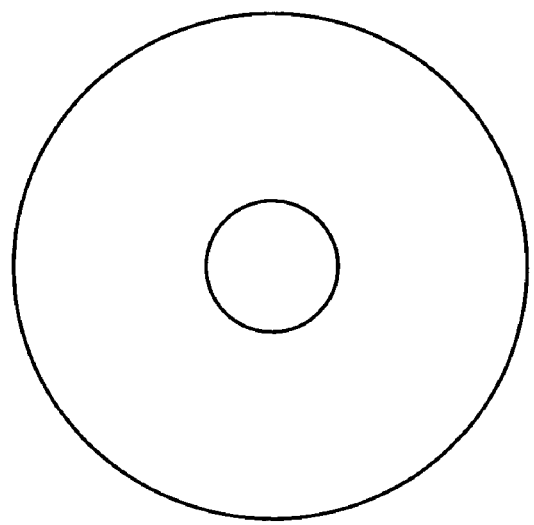
Figure 10:
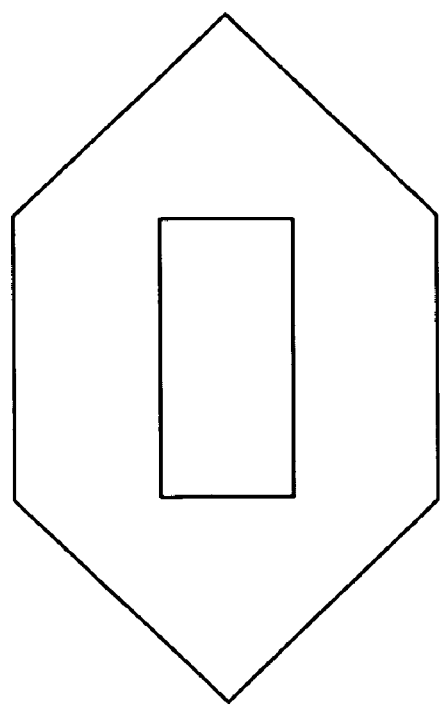

Referring to FIG. 9, bio-filter 100 comprises a tank 101 which contains a media 102 for supporting aerobic bacteria. The aerobic bacteria reduces TAN to nitrate, as in bio-filter 160 described above with respect to FIG. 1. The tank 101 may be made of any suitable material known in the art. Examples of suitable materials include PVC, polyethylene, polypropylene, methacrylic or acrylic plastic, fiber glass reinforced plastic (FRP), and stainless steel. The tank may have any desired shape, although a shape which allows it to be stable in the water is preferred. FIGS. 10 and 11 show examples of a possible shapes of the filtration system, as seen from above. Other shapes include a diamond shape or a hull shape.

The media 102 may be any media known in the art for supporting aerobic bacteria. One preferred form of support media is plastic, which may be in the form of small spheres or tubes, although any shape known in the art may be used. The plastic media is lightweight and may float in the water. It does not clog easily, and provides a large surface area for bacterial colonization. One example of such a plastic media is known as biofilm. Examples of biofilm which may be used include Kaldnes or Bee-Cell, both of which are manufactured by Water Management Technologies, Inc. Other media like Bio-Chem stars from RENA may also be used.

A pump 107 draws water from the lagoon though pipe 110 and pumps through pipe 111 so that it flows through mixing eductors 103a and into the tank 101. An oxygen-containing gas is also supplied to mixing eductors 103a through tubing

108 from a gas supply source (not shown). The oxygen-containing gas is mixed with the water being pumped through the eductors. The gas increases the oxygen content of the water, which aids the bacteria in reducing ammonia and nitrites. The gas and water mixture then exits tank 101 through opening 105, which may be covered by a grating or screen to contain the media within the tank. The gas may be chosen from, for example, air, oxygen gas, and/or ozone.

In another embodiment, mixing eductors 103b are positioned to jet the oxygen and water mixture down into the lagoon, as shown in FIG. 9. This will increase the oxygen level in the lagoon, which will aid bacteria in breaking down the waste in the lagoon.

Buoys 104 are placed so as to allow system 100 to float in the water. The buoys may be composed of Styrofoam, or some other buoyant material. In one embodiment, buoys 104 comprise a hollow container which may be filled with buoyant material, such as air or Styrofoam balls. Balls may be added or removed from the hollow container through an opening in the container, in order to allow the filtration system 100 to float higher or lower relative to the surface of the water. The more Styrofoam balls which are added, the higher the filtration system will float in the water.

A tank cover 106 and pump cover 109 may be used to enclose and protect the system 100 from the elements.

The size and number of floating filtration systems employed will depend on the density of the water and the desired reduction in contaminants.

The floating filtration system helps re-oxygenate the water in the lagoon and reduce TAN. It is also contemplated for use in other applications, such as for aquaculture, sewage treatment, and other waste water treatment applications.

Other systems are also contemplated for aerating lagoons. For example, FIG. 21 illustrates one embodiment of a system for aerating lagoons. As shown in FIG. 21, this aeration system comprises one or more mixing eductors 204. Water from the lagoon is removed from the lagoon by a pump, and circulated back to the lagoon through the eductors, which add an oxygen-containing gas from a gas supply pipe 207 to the lagoon. Aerating the lagoon in this manner will allow aerobic bacteria in the lagoon to break down TAN in the water more efficiently than if the lagoon was not aerated. The number of mixing eductors may be chosen according to the size and waste levels in the lagoon. The oxygen-containing gas may be chosen from, for example, air, oxygen gas, or ozone.

The aeration system of FIG. 21 may be used with or without the systems of FIG. 1. In addition, this system is contemplated for use in any application which requires the mixing of a gas with a liquid or for mixing multiple liquids together. For example, such a mixing eductor system may be used to mix juice concentrate with water by flowing the juice concentrate through tubing 204c while recirculating water through nozzle 204a in a mixing tank.

The systems and processes disclosed in this application may sometimes produce unpleasant odors. In order to reduce such odors, the gases in the systems and chambers of the present invention may be filtered through a material which will absorb the odors. For example, the gases may be vented through a chimney containing activated carbon.

While the system of FIG. 1 has been used to illustrate the principles of the present invention, other flow arrangements and combinations of systems are contemplated. For example, the systems of the present invention may be employed in parallel rather than in-line. For example, the flow from the FFS may be split, so that a portion flows to the bio-filter 160 and the remaining portion flows to the denitration system 180. In yet another embodiment, the bio-filter, denitration chamber and oxytower may all be arranged in parallel, so that the flow from the FFS is split three ways, a portion going directly to each of the bio-filter, denitration chamber, and oxytower. Furthermore, more than one of any of the processing devices, such as the FFS, bio-filter, denitration system, oxytower, retention tank, flushing tank, animal enclosure, etc., may be used. This may be beneficial, as it may be lest costly to employ multiple smaller processing devices in place of a single large device. The systems may be placed in-line or parallel with each other.

For example, in one embodiment, two smaller FFS systems are used in place of the single FFS 140 in FIG. 1. The FFS systems are arranged in parallel, so that the flow going to FFS 140 in FIG. 1 is split between them. In another more preferred embodiment, the two FFS systems are arranged in-line with each other, so that the flow from the first FFS goes to the second FFS. A oxygen-containing gas, such as ozone, is introduced into the first FFS to help reduce TAN, and gas without significant amounts of ozone, such as air or oxygen gas, is introduced into the second FFS. Using the air or oxygen gas in the second FFS helps to degas the water and thereby reduce the amount of ozone which flows to the bio-filter, so that the bacteria in the bio-filter are not harmed by ozone. Alternatively, any type of degassing device may be placed in-line between the FFS and bio-filter. For example, protein skimmers which employ mixing eductors are described in co-pending application Ser. No. 10/673,346, filed on Sep. 30, 2003, and entitled AUTOTROFIC SULFUR DENITRATION CHAMBER AND CALCIUM REACTOR, and in co-pending Continuation-In-Part Application, filed on Sep. 30, 2004, and entitled AUTOTROFIC SULFUR DENITRATION CHAMBER AND CALCIUM REACTOR. The descriptions of the protein skimmers in both applications are hereby incorporated by reference. Other degassing chambers which are known in the art may also be used.

In yet another embodiment, two or more bio-filters 160 may be used in place of single bio-filter 160 in FIG. 1. The bio-filters are placed in-line, so that the flow from the first bio-filter goes to the next bio-filter and so on. In another more preferred embodiment, the two or more bio-filters are placed in parallel, so that the flow from FFS 140 is split between them. It is thought that the parallel configuration is more efficient than an in-line configuration since the waste water flow going to each chamber will not have been depleted of TAN by a previous bio-filter, which insures the bacteria in each chamber have a sufficient food supply.

Still other flow arrangements are also possible. In one embodiment, a portion of the water from retention tank 170 flows to the denitration chamber 180 and a portion of the water flows to the bio-filter 160, as indicated by the dotted lines in FIG. 1.

The systems of FIG. 1 are mobile, and may be built on the site where it is to be used. Alternatively, one or more of systems 130, 140, 160, 180 and 210 may be assembled in a compact manner on a single support, known as a "skid." This would allow the system to be manufactured and assembled off-site and then shipped to the aqua tank location ready to be used. Such an integrated system would also likely cost less than a system built on site.

The use of catholyte and anolyte to treat solid waste will now be described in more detail. As discussed above, solid waste is separated from the water waste by the solid separator 130 and by the FFS 140. The solids separated from the manure and water mixture may be collected in a waste collector 150, as illustrated in FIG. 1. Inside the waste collector 150, the waste may be further processed to separate any remaining liquid from the solid waste, if desired.

In order to be used as fertilizer, the ammonia in the dry waste must be converted into nitrogen compounds that are not toxic to plants. Under normal conditions, this process may take three to eight weeks. Mixing catholyte into the dry waste will improve the growth of the bacteria within the waste that is responsible for this conversion. Preferably, the catholyte and waste are thoroughly mixed in a mechanical process. The resultant improved growth and health of the bacteria will result in the solid waste being safe for use in a shorter period of time, as compared to the three to eight week period required when using traditional methods. Additionally, the exterior of the solid waste, or a bag or other container holding the solid waste, can be sprayed with anolyte to reduce the odor and emission of microbes into the environment, and to make handling the waste less toxic.

Mixing the catholyte with the solid waste may be carried out by conventional methods for mixing solid waste with a solution, such as the mixer and mixing tanks described above.

In one embodiment, after the solid waste is mixed with catholyte, portions of the catholyte/solid waste mixture are placed in sealed containers, such as bags. The container may be sprayed with anolyte to sterilize it. The containers are then set aside for a certain period of time to allow the ammonia to transform into nitrogen compounds that are not toxic to plants. This embodiment allows for a safer and more transportable form of fertilizer. After the desired amount of time has passed, the containers may be opened, and the contents can be safely used as fertilizer.

While the invention has been disclosed herein in connection with certain embodiments and detailed descriptions, it will be clear to one skilled in the art that modifications or variations of such details can be made without deviating from the general concept of the invention. Thus the invention is to be limited by the claims, and not by the embodiments and detailed description provided above.

What is claimed is:

1. A process for treating waste from an animal farm including a waste retainer for collecting the wastes of animals, the process comprising:
    applying water and anolyte to the waste retainer to clean waste away from the waste retainer and thereby create a waste water;
    flowing the waste water from the retainer to a separation system for separating at least some of the solid waste from the waste water;
    flowing the waste water from the separation system to a system for introducing gas bubbles into the waste water to separate contaminants from the waste water and to increase the level of dissolved oxygen in the waste water;
    applying aerobic bacteria to the waste water to reduce ammonia to nitrate in the waste water;
    flowing at least a portion of the waste water to a denitration system to reduce nitrate levels in the waste water; and
    flowing the water to a retention tank.

2. The process of claim 1 wherein at least a substantial portion of the water applied to the waste retainer is the water treated by the treatment steps of claim 1.

3. The process of claim 1 wherein anolyte is sprayed onto animal waste in the waste retainer.

4. The process of claim 3 where anolyte is sprayed in the air in the environment proximate to the waste retainer.

5. The process of claim 1 wherein the waste water is held in a lagoon for a period of time.

6. The process of claim 1 wherein the waste water is held in a closed container for a period of time.

7. The process of claim 1 further comprising the step of automatically applying the water and anolyte to the waste retainer at periodic intervals.

8. The process of claim 7 wherein the water and anolyte are applied at least three times per hour.

9. The process of claim 7 wherein the water and anolyte are applied at least once every four hours.

10. The process of claim 7 wherein the application of water and anolyte is controlled by a timer and at least one sensor that measures the level or flow of waste water.

11. The process of claim 1 wherein the separation system includes a mixing tank equipped with an apparatus for mixing the fluid and materials in the tank.

12. The process of claim 11 comprising the additional step of adding an oxygen-containing gas into the mixing tank.

13. The process of claim 1 further comprising at least one pump for effecting a forced flow of water and waste water.

14. The process of claim 13 wherein the pump is a screw pump.

15. The process of claim 14 wherein the flow of waste water created by the pump is about 0.15 to 3.0 L/kg Animal/hour.

16. The process of claim 1 wherein the separation system further comprises a tank containing a mechanism for separating solids and liquids.

17. The process of claim 16 wherein the mechanism for separating solids and liquids is selected from the group consisting of: a gravity screen, a disk screen, a drum, a belt, a screw press screen, or a filter system.

18. A process for treating waste from an animal farm including a waste retainer for collecting the wastes of animals, the process comprising:
    applying water to the waste retainer to clean waste away from the waste retainer and thereby create a waste water;
    adding catholyte to the waste water;
    flowing the waste water from the retainer to a separation system for separating at least some of the solid waste from the waste water;
    flowing the waste water from the separation system to a system for introducing gas bubbles into the waste water to separate contaminants from the waste water and to increase the level of dissolved oxygen in the waste water;
    applying aerobic bacteria to the waste water to reduce ammonia to nitrate in the waste water;
    flowing at least a portion of the waste water to a denitration system to reduce nitrate levels in the waste water; and
    flowing the water to a retention tank.

19. The process of claim 18 wherein the amount of catholyte added ranges from about 1 to about 30 percent of the volume of water applied to the waste retainer.

20. The process of claim 18 wherein the system for introducing gas bubbles comprises a first chamber for holding the waste water, and at least one jet mixer to mix an oxygen-containing gas with the waste water.

21. The process of claim 20 wherein the system for introducing gas bubbles further comprises a collector plate to collect contaminants that accumulate within the apparatus in the form of foam.

22. The process of claim 20 wherein the oxygen-containing gas is ozone.

23. The process of claim 20 wherein the jet mixer is a mixing eductor comprising an inlet channel for introducing a forced flow of water, a mixing channel connected to the inlet channel and defining a flow path for entraining water from within the chamber, and tubing, connected to the mixing channel, and adapted to accept the flow of an oxygen-containing gas or a liquid, the mixing eductor in operation mixing the forced flow of water, the entrained water, and the gas or liquid within the chamber.

24. The process of claim 23 wherein the mixing eductor tubing comprises two sections of tube such that the first can accept the flow of an oxygen-containing gas and the second can accept the flow of a liquid.

25. The process of claim 24 wherein the liquid is catholyte.

26. The process of claim 23 wherein the mixing eductor tubing comprises a single tube section that can accept the flow of both an oxygen-containing gas and a liquid.

27. The process of claim 26 wherein the liquid is catholyte.

28. The process of claim 18 wherein the step for applying aerobic bacteria occurs in a chamber containing a media which supports aerobic bacteria and an apparatus for mixing a liquid or a gas with the waste water in the chamber.

29. The process of claim 28 further comprising the step of adding an oxygen-containing gas into the chamber to improve the efficiency of the aerobic bacteria process.

30. The process of claim 29 wherein the catholyte is added to the waste water inside the chamber.

31. The process of claim 30 wherein the amount of catholyte added ranges from about 1 to about 20 percent of the volume of water inside the chamber.

32. The process of claim 28 wherein the aerobic bacteria comprise at least one bacteria chosen from *nitrosomonas* and *nitrobacter* bacteria.

33. The process of claim 18 wherein the denitration system for maintaining nitrate levels in the waste water comprises an apparatus for substantially reducing the oxygen concentration of the waste water and an apparatus containing anaerobic bacteria for substantially reducing the level of nitrates in the water.

34. The process of claim 33 wherein the apparatus for substantially reducing the oxygen concentration of the waste water comprises a chamber containing a media supporting sufficient aerobic bacteria to substantially reduce the oxygen content in the water as the water flows through the chamber.

35. The process of claim 34 wherein the chamber reduces the oxygen content of the water to a level of less than 5 ppm.

36. The process of claim 34 wherein the catholyte is added to the chamber.

37. The process of claim 36 wherein the amount of catholyte added ranges from about 1 to about 20 percent of the volume of water in the chamber.

38. The process of claim 33 wherein the apparatus containing anaerobic bacteria comprises a chamber containing a media of sulfur which supports sufficient anaerobic bacteria to substantially reduce the nitrate content in the water, as the water flows through the chamber.

39. The process of claim 38 wherein the anaerobic bacteria comprise *Thiobadllus denitrificans* bacteria.

40. The process of claim 38 wherein the aerobic bacteria comprise at least one bacteria chosen from *nitrosomonas* and *nitrobacter* bacteria.

41. The process of claim 38 wherein the anaerobic bacteria comprise at least one bacteria chosen from *Thiobacillus denitrificans, Thobacillus versutus, Thiobacillus thyasiris, Thiosphaera pantotropha, Paracoccus denitrificans*, and *Thiomicrospira denitrificans*.

42. The process of claim 18 further comprising the additional step of flowing the water to an oxytower apparatus comprising an enclosure for accepting a flow of water, the enclosure having side walls that slope inward at an angle $\theta_{oxy}$ from vertical, having a medium that is placed on the inner surface of the enclosure that serves as a support for the growth of algae, such that the water flows down the walls of the enclosure and contacts the algae in a manner which allows the algae to effectively remove contaminants from the water and raise the pH of the water.

43. The process of claim 42 wherein the catholyte is added to the oxytower apparatus.

44. The process of claim 43 wherein the amount of catholyte added ranges from about 1 to about 20 percent of the volume of water flowing through the oxytower.

45. A process for treating waste water containing solid waste and other impurities, comprising:
adding catholyte to the waste water;
introducing the waste water into a solid/liquid separation system for separating at least a portion of the solid waste from the waste water to form waste water having a reduced solids content;
flowing the waste water having a reduced solids content to a first holding area;
removing a first waste product from the waste water in the form of a foam by introducing gas comprising oxygen into the waste water in the holding area to form bubbles in the waste water, wherein the bubbles collect the first waste product from the water and rise to the surface of the waste water in the tank to form the foam; and
removing a second waste product from the waste water by allowing the second waste product to sink to the bottom of the tank where it is collected and later removed.

46. The process of claim 45 wherein the gas is introduced by at least one mixing eductor having a mixing channel, wherein the waste water and the gas comprising oxygen are first mixed inside the mixing channel and then flowed from the mixing channel in a circular direction.

47. The process of claim 45 wherein the oxygen-containing gas is chosen from air, oxygen and ozone.

48. The process of claim 45, wherein the catholyte is introduced into the solid/liquid separation system.

49. The process of claim 45, further comprising the step of flowing waste water from the solid/liquid separation system to a bio-filter having a chamber containing a media supporting aerobic bacteria.

50. The process of claim 49, wherein the bio-filter contains a mixing eductor and wherein a gas comprising oxygen is introduced into the bio-filter through the mixing eductor.

51. The process of claim 50, wherein the catholyte is introduced into the bio-filter.

52. The process of claim 49, further comprising the step of flowing the waste water from the bio-filter to a denitration system containing a media supporting anaerobic bacteria which remove nitrate from the waste water.

53. The process of claim 52, wherein the catholyte is introduced into the denitration chamber.

54. The process of claim 49, further comprising the step of flowing the water to an oxytower having a medium supporting algae, wherein the water is flowed over the surface of the algae.

55. A process for treating solid waste removed from waste water runoff from an animal farm, comprising adding anolyte to the solid waste.

56. A process for reducing odors and bacteria in an animal enclosure, comprising the step of treating the animal enclosure with anolyte.

57. A process for safely forming fertilizer from the solid waste of animals comprising:
mixing solid waste with catholyte to encourage rapid decomposition;
applying anolyte to the exterior of the waste; and allowing the waste mixture to decompose for a sufficient amount of time to remove the harmful ammonia from the waste.

58. The process of claim 18 wherein the separation system includes a mixing tank equipped with an apparatus for mixing the fluid and materials in the tank.

59. The process of claim 58 comprising the additional step of adding an oxygen-containing gas into the mixing tank.

60. The process of claim 59 further comprising the step of adding the catholyte into the mixing tank.

61. The process of claim 60 wherein the amount of catholyte added to the mixing tank ranges from about 1 to about 30 percent of the volume of water in the mixing tank.

* * * * *

UNITED STATES PATENT AND TRADEMARK OFFICE
CERTIFICATE OF CORRECTION

| | |
|---|---|
| PATENT NO. | : 7,481,935 B2 |
| APPLICATION NO. | : 10/956041 |
| DATED | : October 28, 2008 |
| INVENTOR(S) | : Laurent Olivier |

Page 1 of 1

It is certified that error appears in the above-identified patent and that said Letters Patent is hereby corrected as shown below:

Claim 39, Col. 35, line 52, "Thiobadllus" should read --Thiobacillus--.

Claim 41, Col. 35, line 58, "Thobacillus" should read --Thiobacillus--.

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

PATENT NO.         : 7,481,935 B2
APPLICATION NO.    : 10/956041
DATED              : January 27, 2009
INVENTOR(S)        : Laurent Olivier It is certified that error appears in the above-identified patent and that said Letters Patent is hereby corrected as shown below:

Claim 39, Col. 35, line 52, "Thiobadllus" should read --Thiobacillus--.

Claim 41, Col. 35, line 58, "Thobacillus" should read --Thiobacillus--.

This certificate supersedes the Certificate of Correction issued March 31, 2009.

Signed and Sealed this

Twenty-first Day of April, 2009

JOHN DOLL
*Acting Director of the United States Patent and Trademark Office*